(12) United States Patent
Michiyama et al.

(10) Patent No.: US 8,474,799 B2
(45) Date of Patent: Jul. 2, 2013

(54) FLUID FILLED TYPE VIBRATION DAMPING DEVICE

(75) Inventors: Wakako Michiyama, Owariasahi (JP); Kei Okumura, Kakamigahara (JP)

(73) Assignee: Tokai Rubber Industries, Ltd., Komaki-shi (JP)

( * ) Notice: Subject to any disclaimer, the term of this patent is extended or adjusted under 35 U.S.C. 154(b) by 1162 days.

(21) Appl. No.: 12/292,840

(22) Filed: Nov. 26, 2008

(65) Prior Publication Data
US 2009/0140476 A1 Jun. 4, 2009

(30) Foreign Application Priority Data

Nov. 30, 2007 (JP) ................................ 2007-311749
Mar. 19, 2008 (JP) ................................ 2008-071209

(51) Int. Cl.
*F16F 13/10* (2006.01)
*F16F 5/00* (2006.01)
*F16F 7/00* (2006.01)
*F16F 9/00* (2006.01)

(52) U.S. Cl.
USPC ........ 267/140.13; 267/35; 267/121; 267/136; 267/140.11; 267/140.12; 267/294

(58) Field of Classification Search
USPC .................... 267/121, 140.11–140.15, 141.1, 267/140.13
IPC .............................................. F16F 13/00,5/00
See application file for complete search history.

(56) References Cited

U.S. PATENT DOCUMENTS

| 4,645,189 | A | 2/1987 | Quast |
| 4,781,362 | A | 11/1988 | Reuter et al. |
| 7,306,210 | B2 | 12/2007 | Happou et al. |
| 2002/0158389 | A1* | 10/2002 | Yoshida et al. ........... 267/140.11 |
| 2003/0080483 | A1* | 5/2003 | Umemura et al. ........ 267/140.13 |
| 2006/0097436 | A1* | 5/2006 | Yamamoto ................ 267/140.12 |
| 2006/0157902 | A1* | 7/2006 | Sakata ...................... 267/140.13 |
| 2007/0085249 | A1* | 4/2007 | Happou et al. ............ 267/140.13 |

FOREIGN PATENT DOCUMENTS

| DE | 43 07 148 A1 | 9/1994 |
| EP | 1 069 339 A1 | 1/2001 |
| JP | A-61-286631 | 12/1986 |
| JP | A-62-228726 | 10/1987 |
| JP | A-2007-120563 | 5/2007 |

* cited by examiner

*Primary Examiner* — Robert A Siconolfi
*Assistant Examiner* — San Aung
(74) *Attorney, Agent, or Firm* — Oliff & Berridge, PLC

(57) ABSTRACT

A fluid filled type vibration damping device including: a partition member having a communication passage connecting a pressure receiving and equilibrium chambers; an obstructing rubber elastic plate juxtaposed against the communication passage from a pressure receiving chamber side, adapted to obstruct the communication passage, and arranged to be exposed to pressure of the pressure receiving and the equilibrium chamber at both faces; and a constraining member provided for retaining an outer peripheral section of the obstructing rubber elastic plate in contact against the partition member at multiple locations. The constraining member provides an opening/closing control member operated to induce the obstructing rubber elastic plate to push against the partition member and close off the communication passage, and to induce elastic deformation of the obstructing rubber elastic plate to be separated from the partition member.

5 Claims, 30 Drawing Sheets

FLUID FILLED TYPE VIBRATION DAMPING DEVICE

INCORPORATED BY REFERENCE

The disclosure of Japanese Patent Application No. 2007-311749 filed on Nov. 30, 2007 and No. 2008-071209 filed on Mar. 19, 2008, each including the specification, drawings and abstract are incorporated herein by reference in their entirety.

BACKGROUND OF THE INVENTION

1. Field of the Invention

The present invention relates to a vibration damping device adapted for installation between components to be provided with vibration damped linkage, and particularly to a fluid filled type vibration damping device that utilizes vibration damping action based on the flow action of a sealed therein.

2. Description of the Related Art

In the field of vibration damping devices such as vibration damping linkages or vibration damping supports designed for installation between components that make up a vibration transmission system, one type of known device is a fluid filled type vibration damping device that utilize vibration damping action based on the flow action of a fluid sealed inside. Such a fluid filled type vibration damping device has a first mounting member and a second mounting member linked by a rubber elastic body. To the inner peripheral side of the second mounting member, there is defined a pressure receiving chamber whose wall is partially constituted by the main rubber elastic body, and an equilibrium chamber whose wall is constituted by a flexible film. The chambers are filled with a non-compressible fluid, and the pressure receiving chamber and the equilibrium chamber communicate with each other through an orifice passage.

Based on the flow action of a fluid induced to flow between the pressure receiving chamber and the equilibrium chamber through the orifice passage, excellent vibration damping action can be produced against vibration in a specific targeted frequency range. The application of such fluid filled type vibration damping devices in automotive engine mounts, body mounts, and suspension mounts for example, is a topic of ongoing research.

In the fluid filled type vibration damping device of this kind, while excellent vibration damping effect may be attained at times of input of vibration in frequency range to which the orifice passage has been pre-tuned, it may suffer from the problem effective vibration damping action will not be attained upon input of in other frequency ranges. Since a fluid filled type vibration damping device will in some instances experience simultaneous input of vibration in multiple frequency ranges, and particularly given the current increasingly higher requirements for vibration damping capabilities, there accordingly exists a need for a fluid filled type vibration damping device that is capable of exhibiting effective vibration damping effect against vibration over a wider frequency range.

Moreover, fluid filled type vibration damping devices also have the problem of noise and vibration being produced at times of sudden input of large impact load. Specifically, where a fluid filled type vibration damping device is employed as an automotive engine mount for example, if the car happens to drive over a grooved roadway having grooves and ridges, in some instances the noise and vibration will be sufficient to be noticeable to passengers.

A phenomenon known as cavitation, produced by sharp pressure fluctuations within the pressure receiving chamber, may be cited as a cause of such noise and vibration. Specifically, with sudden input of large impact load, the main rubber elastic body that defines a wall of the pressure receiving chamber will experience appreciable elastic deformation and produce a marked drop in liquid pressure within the pressure receiving chamber, whereupon air bubbles known as cavitation will be formed. Water hammer pressure created as the bubbles burst will be transmitted to the vehicle via the vibration damping device, producing noise and vibration of an extent posing problems within the cabin.

In order to prevent the occurrence of such noise and vibration caused by cavitation, there has been proposed, for example, in U.S. Pat. No. 4,781,362, a fluid filled type vibration damping device having a structure with a slit formed in a rubber film that has been disposed so as to partition the pressure receiving chamber and the equilibrium chamber which are filled with non-compressible fluid. Specifically, in the fluid filled type vibration damping device disclosed in U.S. Pat. No. 4,781,362, when excessive negative pressure arises in the pressure receiving chamber, the rubber film will be suctioned towards the pressure receiving chamber side and undergo elastic deformation, causing the slit that was formed in the rubber film to open up, so that the pressure receiving chamber and the equilibrium chamber communicate with each other through the slit. The negative pressure in the pressure receiving chamber is quickly dispelled thereby, preventing noise and vibration caused by cavitation.

However, the fluid filled type vibration damping device disclosed in U.S. Pat. No. 4,781,362 still leaves a number of problems unsolved. First, if a slit is made in the rubber film separating the pressure receiving chamber and the equilibrium chamber as taught in U.S. Pat. No. 4,781,362, the slit will open up not only at times when negative pressure acts on the pressure receiving chamber, but also when positive negative pressure acts on the pressure receiving chamber, thus creating a risk of short circuiting of the pressure receiving chamber and the equilibrium chamber through the slit. Consequently, even at times of input of ordinary load of the kind that has been targeted for vibration damping, escape of pressure from the pressure receiving chamber to the equilibrium chamber may reduce the amount of fluid induced to flow through the orifice passage, with the risk that the intended vibration damping effect may not be produced on the basis of the flow action of the fluid.

One conceivable means for solving such problems would be to increase the rigidity of the rubber film, e.g. by making it thicker, so as to limit elastic deformation of the film and make it harder for the slit to open up. However, if the rigidity of the rubber film is increased to a sufficient extent, while the desired vibration damping effect will be attained, there is also a risk that the slit will fail to open by a sufficient amount at times when excessive negative pressure necessitating opening of the slit arises, thus diminishing the effect of reducing noise and vibration as discussed above.

Another conceivable approach would be to make the slit smaller in size to make it harder for the slit to open up, so as to attain the required vibration damping capability at times of input of ordinary load. However, making the slit smaller poses the risk of inability to effectively obtain the negative pressure dispelling effect that will be needed when excessive negative pressure arises in the pressure receiving chamber. That is, in instances where the input load is abnormally large and a very high level of negative pressure has arisen in the pressure receiving chamber, the negative pressure within the pressure receiving chamber will not be dispelled sufficiently, due to insufficient opening area of the slit, thus posing the risk of occurrence of noise and vibration caused by cavitation.

That is, according to the fluid filled type vibration damping device disclosed in U.S. Pat. No. 4,781,362, it was difficult to effectively achieve both the aim of reducing or eliminating noise and vibration caused by cavitation, and the inherent vibration damping capabilities required of the vibration damping device.

Depending on a structure for a fixation of the rubber film, etc., the rubber film may be exposed to excess pressure. As a result, the fixation position of the rubber film may be dislocated, or the rubber film may fail to restore its initial shape, making it impossible for exhibiting desired vibration damping effect and for reducing noises, with stability.

SUMMARY OF THE INVENTION

It is therefore one object of this invention to provide a fluid filled type vibration damping device of novel construction, that at times of input of ordinary vibration targeted for vibration damping will exhibit the required vibration damping effect over a wide frequency range; while at times of input of sudden impact load sufficient to cause cavitation, will be able to dispel excessive negative pressure in the pressure receiving chamber as rapidly as possible so as to reduce the occurrence of noise and vibration caused by cavitation.

The above and/or optional objects of this invention may be attained according to at least one of the following modes of the invention. The following modes and/or elements employed in each mode of the invention may be adopted at any possible optional combinations. It is to be understood that the principle of the invention is not limited to these modes of the invention and combinations of the technical features, but may otherwise be recognized based on the teachings of the present invention disclosed in the entire specification and drawings or that may be recognized by those skilled in the art in the light of the present disclosure in its entirety.

A principle of the present invention provides a fluid filled type vibration damping device comprising: a rubber elastic body elastically connecting a first mounting member and a second mounting member; a partition member supported on the second mounting member; a pressure receiving chamber whose wall is partly defined by the rubber elastic body; an equilibrium chamber whose wall is partly defined by a flexible film; the pressure receiving chamber and the equilibrium chamber being filled with a non-compressible fluid, and the pressure receiving chamber and the equilibrium chamber communicating with each other through an orifice passage, a partition member that partitions the pressure receiving chamber and the equilibrium chamber being provided with a communication passage that connects the pressure receiving chamber and the equilibrium chamber; an obstructing rubber elastic plate being juxtaposed against the communication passage from a pressure receiving chamber side, being adapted to obstruct the communication passage, and being arranged such that pressure of the pressure receiving chamber acts upon a first face of the obstructing rubber elastic plate while pressure of the equilibrium chamber acts on another face thereof; and a constraining member being provided for retaining an outer peripheral section of the obstructing rubber elastic plate in a state of localized contact against the partition member at multiple locations on a circumference, wherein the constraining member provides an opening/closing control member such that positive pressure of the pressure receiving chamber acting on the obstructing rubber elastic plate induces the obstructing rubber elastic plate to push against the partition member and close off the communication passage, whereas negative pressure of the pressure receiving chamber acting on the obstructing rubber elastic plate induces zones situated in an outer peripheral section of the obstructing rubber elastic plate but away from retained sections by the constraining member to undergo elastic deformation in a direction of separation from the partition member, and open up the communication passage.

In the fluid filled type vibration damping device of construction according to the present invention, when negative pressure arises in the pressure receiving chamber, the obstructing rubber elastic plate will undergo elastic deformation under the action of the negative pressure of the pressure receiving chamber, causing the communication passage to open up. The sealed fluid will thereby be caused to flow between the pressure receiving chamber and the equilibrium chamber through the communication passage so that the excessive negative pressure in the pressure receiving chamber will be dispelled as rapidly as possible. Consequently, noise and vibration attributable to an excessive pressure drop in the pressure receiving chamber can be effectively prevented.

As the communication passage opens up due to the drop in pressure of the pressure receiving chamber and the negative pressure in the pressure receiving chamber is dispelled by fluid flow through the communication passage, the substantial wall spring rigidity of the pressure receiving chamber will experience change. The tuning of the orifice passage will thus experience change, so that excellent vibration damping action based on flow action of the fluid may be attained against input vibration over a wider frequency range.

In another possible mode of the fluid filled type vibration damping device according to the invention, the obstructing rubber elastic plate is fastened at the center section thereof to the partition member.

Fastening the center section of the obstructing rubber elastic plate to the partition member in this way has the effect of limiting elastic deformation of the center section of the obstructing rubber elastic plate, thus preventing excessive absorption of internal pressure of the pressure receiving chamber by deformation of the obstructing rubber elastic plate.

In yet another possible mode of the fluid filled type vibration damping device according to the invention, the obstructing rubber elastic plate is furnished with a reinforcing member having a plurality of spoke-shaped portions that extend radially towards the outer peripheral section from the center section; and the constraining member includes the reinforcing member.

By furnishing the obstructing rubber elastic plate with such a reinforcing member having a plurality of spoke-shaped portions that extend radially towards the outer peripheral section from the center section, there can be constituted the constraining member whereby the outer peripheral section of the obstructing rubber elastic plate will be retained in a state of contact against the partition member at multiple locations on the circumference. With this arrangement, when a high level of negative pressure acts on the pressure receiving chamber, zones situated in the outer peripheral section of the obstructing rubber elastic plate but away from sections where the reinforcing member is attached will undergo elastic deformation, and negative pressure dispelling action will be effectively achieved by fluid flow through the communication passage. Consequently, noise and vibration caused by cavitation can be prevented.

Moreover, by providing the obstructing rubber elastic plate with a plurality of radially-extending spoke-shaped portions, the level of elastic deformation in zones of the obstructing rubber elastic plate situated between these spoke-shaped portions will adjust appropriately depending on the level of negative pressure. Escape of internal pressure of the pressure receiving chamber to an extent any more than necessary can be prevented thereby, and the wall spring rigidity of the pressure receiving chamber will experience change according to the aperture area of the communication passage, so that the tuning of the orifice passage adjusts automatically in response to input vibration. Consequently, the intended vibration damping action can be effectively achieved against input of vibration in a wider frequency range that includes vibration of lower frequency than the original tuning frequency of the orifice passage.

A possible reason why this function of adjusting the aperture area of the communication passage is achieved is that since the spoke-shaped portions extend radially, the zones situated between the spoke-shaped portions have progressively smaller effective free length in the circumferential direction moving towards the center in the diametrical direction, and become progressively more resistant to deformation. Thus, in instances where excessive negative pressure acts on the pressure receiving chamber, the communication passage can be prevented from opening any more than necessary; and as the level of negative pressure acting on the pressure receiving chamber increases, the zones situated away from sections where the reinforcing member is attached will experience progressive elastic deformation towards the inner peripheral side, thus ensuring that the aperture area of the communication passage will not exceed that needed to dispel the negative pressure. Consequently, negative pressure acting on the pressure receiving chamber will be able to escape sufficiently through the communication passage so that noise and vibration caused by cavitation may be effectively limited, while at the same time preventing escape of internal pressure of the pressure receiving chamber any more than necessary, so that vibration damping effect based on fluid flow through the orifice passage is achieved over a wider frequency range.

In a preferred mode of the fluid filled type vibration damping device according to the invention, where an obstructing rubber elastic plate provided with a reinforcing member is employed, the reinforcing member has a construction wherein split rim portions that extend in the circumferential direction of the obstructing rubber elastic plate are integrally provided at the outside peripheral distal end sections of the spoke-shaped portions.

By employing such a reinforcing member that is provided with split rim portions at the outside peripheral distal end sections of the spoke-shaped portions, the sections in the outside peripheral edge part of the obstructing rubber elastic plate which have been provided with the split rim portions can be held securely in contact against the partition member. Thus, the communication passage can more advantageously be maintained in the closed state at times of input of normal vibration, making it possible to ensure that a large amount of fluid flows through the orifice passage. Consequently, the desired vibration damping effect of the vibration damping device can be effectively achieved.

In another possible mode of the fluid filled type vibration damping device according to the invention, where a construction having a reinforcing member is employed, the reinforcing member may be composed of a plate spring, with the plate spring partially fastened to the partition member.

Where the reinforcing member is composed of a plate spring, excessive deformation of the obstructing rubber elastic plate will be effectively prevented by the plate spring. Thus, pressure fluctuations of the pressure receiving chamber can be prevented from escaping to the equilibrium chamber any more than necessary, a sufficient flow of fluid through the orifice passage can be assured, and vibration damping effect based on flow action of fluid induced to flow through the orifice passage can be more effectively achieved. Consequently, the desired vibration damping action can be exhibited over a wider range of frequencies.

Furthermore, where the reinforcing member is composed of an elastically deformable plate spring, elastic deformation of the obstructing rubber elastic plate will be allowed in the section thereof where the reinforcing member is disposed. Thus, in the event that a very high level of negative pressure should act on the pressure receiving chamber, the section of the obstructing rubber elastic plate where the plate spring is attached will undergo elastic deformation, allowing the communication passage to open up with a larger aperture area. Consequently, noise and vibration caused by cavitation can be reduced more effectively.

In another possible mode of the fluid filled type vibration damping device according to the invention, where a construction having a reinforcing member is employed, the reinforcing member may be a rigid body.

By making the reinforcing member a rigid body that experiences substantially no deformation, the level of deformation of the obstructing rubber elastic plate can be effectively limited. In particular, by preventing deformation of the obstructing rubber elastic plate in sections thereof where the spoke-shaped portions are disposed, the aperture area of the communication passage can be adjusted with higher accuracy utilizing the variation in diametrical direction of the distance separating the plurality of spoke-shaped portions in the circumferential direction, and hence of the effective free length of the obstructing rubber elastic plate in the circumferential direction.

In another possible mode of the fluid filled type vibration damping device according to the invention, the obstructing rubber elastic plate is retained by the constraining member at the retained sections in the outer peripheral section thereof, and the retained sections undergo elastic deformation in the direction of separation from the partition member through action of a negative pressure greater than a negative pressure of the pressure receiving chamber inducing elastic deformation in zones away from the retained sections, causing the communication passage to open up.

With such an arrangement, sections retained by the constraining member will experience deformation in the direction of separation from the partition member so that when the communication passage opens up under the action of negative pressure of the pressure receiving chamber, the aperture area of the communication passage will change in multiple stepwise fashion depending on the extent of negative pressure of the pressure receiving chamber. Thus, the effect of reducing pressure exerted on the pressure receiving chamber will take place in multiple stepwise fashion, so as to more effectively achieve both prevention of cavitation in the event that excessive negative pressure should arise in the pressure receiving chamber, and effective vibration damping action in a wide frequency range at times of input of normal vibration.

In particular, by designing the opening/closing control member to operate in multiple stepwise fashion, the level of liquid pressure of the pressure receiving chamber that will escape to the equilibrium chamber through the communication passage can be varied in stepwise or continuous fashion. Consequently, vibration damping action based on the flow action of fluid flowing through the orifice passage can be exhibited over an even wider range of frequencies.

In another possible mode of the fluid filled type vibration damping device according to the invention, wherein the constraining member is formed such that a plurality of thick retaining portions extending in a circumferential direction are formed at a plurality of locations on the outer peripheral section of the obstructing rubber elastic plate, and the obstructing rubber elastic plate is attached to the partition member with grip portions that are provided on the partition member and that sandwich the thick retaining portions from either side in a thickness direction and retain outside peripheral faces thereof in a state of contact, wherein the opening/closing control member comprises elastic deformation zones adapted to undergo elastic deformation on a basis of pressure differential between the pressure receiving chamber and the equilibrium chamber to cause the communication passage to open up, and being defined circumferentially between the thick retaining portions that are adjacently situated in the circumferential direction, and wherein open windows that extend further towards the outer peripheral section of the obstructing rubber elastic plate beyond outside peripheral edges of the elastic deformation zones are formed in the partition member in sections thereof that cover a pressure receiving chamber side of the elastic deformation zones.

In such a fluid filled vibration damping device of construction according to the present invention, thick retaining portions are formed at a plurality of locations on the circumference at the outside peripheral edge of the obstructing rubber elastic plate which has been arranged so as to partition the pressure receiving chamber and the equilibrium chamber. Also, the elastic deformation zones that permit elastic deformation are formed circumferentially between thick retaining portions that are adjacently situated in the circumferential direction, whereby in the event that pressure in the pressure receiving chamber drops sharply due to input of a large jarring load, the elastic deformation zones of the obstructing rubber elastic plate (which has been juxtaposed against the communication passage from the pressure receiving chamber side) will experience elastic deformation, thus causing the communication passage to open up. Flow of fluid will thereby be produced between the pressure receiving chamber and the equilibrium chamber through the communication passage, and negative pressure acting on the pressure receiving chamber will be dispelled as rapidly as possible. Consequently, formation of cavitation bubbles caused by excessive negative pressure in the pressure receiving chamber can be suppressed, and associated noise and vibration can be reduced or prevented.

Furthermore, the open windows have been formed in the partition member so as to extend to the outside peripheral side beyond the outside peripheral edges of the elastic deformation zones of the obstructing rubber elastic plate, and thus even if the elastic deformation zones of the obstructing rubber elastic plate have experienced appreciable elastic deformation, the open windows can be prevented from being obstructed by the obstructing rubber elastic plate, so that the open windows remain in stable communication. Thus, even if a high level of negative pressure arises in the pressure receiving chamber, the pressure receiving chamber and the equilibrium chamber will remain in stable communication through the communication passage and the open windows so that the negative pressure will be effectively dispelled.

Moreover, in the fluid filled vibration damping device according to the present invention, a plurality of thick retaining portions are formed at the outside peripheral edge of the obstructing rubber elastic plate, with these thick retaining portions being sandwiched from either side in the thickness direction by grip portions that have been disposed on the partition member, and with the outside peripheral faces of the thick retaining portions retained in a state of contact by the grip portions. By so doing, even in the event that extreme negative pressure acts on the pressure receiving chamber and causes the obstructing rubber elastic plate to undergo elastic deformation, the obstructing rubber elastic plate will be prevented from shifting out of its installed location, so that the desired vibration damping effect and negative pressure reducing effect may be consistently achieved, and so that stick-slip or other type noise caused by elastic deformation of the obstructing rubber elastic plate may be prevented, effectively improving vehicle quietness.

Furthermore, in the fluid filled vibration damping device according to the present invention, the obstructing rubber elastic plate will preferably be of circular planar shape.

By employing such an obstructing rubber elastic plate whose planar shape is circular, it will be easier to attach the obstructing rubber elastic plate to the partition member. Additionally, it will be possible to avoid localized stress concentration during deformation of the obstructing rubber elastic plate, so that improved durability can be achieved. Furthermore, since contact of the grip portions against the outside peripheral face of the obstructing rubber elastic plate has the effect of dispersing stress bearing on the obstructing rubber elastic plate, improved durability may be advantageously achieved.

Moreover, in the fluid filled vibration damping device according to the present invention, there may also be employed a configuration wherein the orifice passage is formed so as to extend in the circumferential direction through an outside peripheral section of the partition member, while an housing space is formed in a center section of the partition member, with the obstructing rubber elastic plate being housed in the housing space; the grip portions for retaining the plurality of thick retaining portions of the obstructing rubber elastic plate are defined at a plurality of locations on a circumference of an outside peripheral section of the housing space; and the open windows are formed in a wall of a pressure receiving chamber side of the partition member at locations circumferentially between the grip portions while facing the elastic deformation zones of the obstructing rubber elastic plate.

Where this sort of construction is employed as well, the desired vibration damping effect and cavitation noise reducing effect will be consistently produced. Furthermore, because the open windows are formed at locations facing the elastic deformation zones that have been formed at multiple locations on the circumference, through appropriate adjustment of the aperture area etc. of the open windows it will be possible to utilize the open windows as high-frequency wave filter orifices, so that vibration damping effect based on the liquid pressure-absorbing action created by elastic deformation of the obstructing rubber elastic plate can be more effectively achieved as well.

Additionally, in the fluid filled vibration damping device according to the present invention, thick reinforcing ribs may be integrally formed on the obstructing rubber elastic plate, so as to extend towards the center from the thick retaining portions.

By forming such reinforcing ribs on the obstructing rubber elastic plate, it will be possible to avoid excessive deformation of the obstructing rubber elastic plate and to improve durability of the obstructing rubber elastic plate, as well as to more consistently prevent the obstructing rubber elastic plate from shifting position, etc.

Moreover, in the fluid filled vibration damping device according to the present invention, a thick center retaining portion may be integrally formed in the center section of the obstructing rubber elastic plate, and this center retaining portion held compressed by the partition member in the thickness direction of the obstructing rubber elastic plate.

With this arrangement, the center retaining portion will be held clasped in the thickness direction at the diametric center section of the obstructing rubber elastic plate and the thick retaining portions will be held clasped in the thickness direction at the outside peripheral edge of the obstructing rubber elastic plate, so that the obstructing rubber elastic plate will be held stably positioned even in the event that extreme negative pressure acts on the pressure receiving chamber.

BRIEF DESCRIPTION OF THE DRAWINGS

The foregoing and/or other objects, features and advantages of the invention will become more apparent from the following description of a preferred embodiment with reference to the accompanying drawings in which like reference numerals designate like elements and wherein.

DETAILED DESCRIPTION OF PREFERRED EMBODIMENTS

Figure 1:
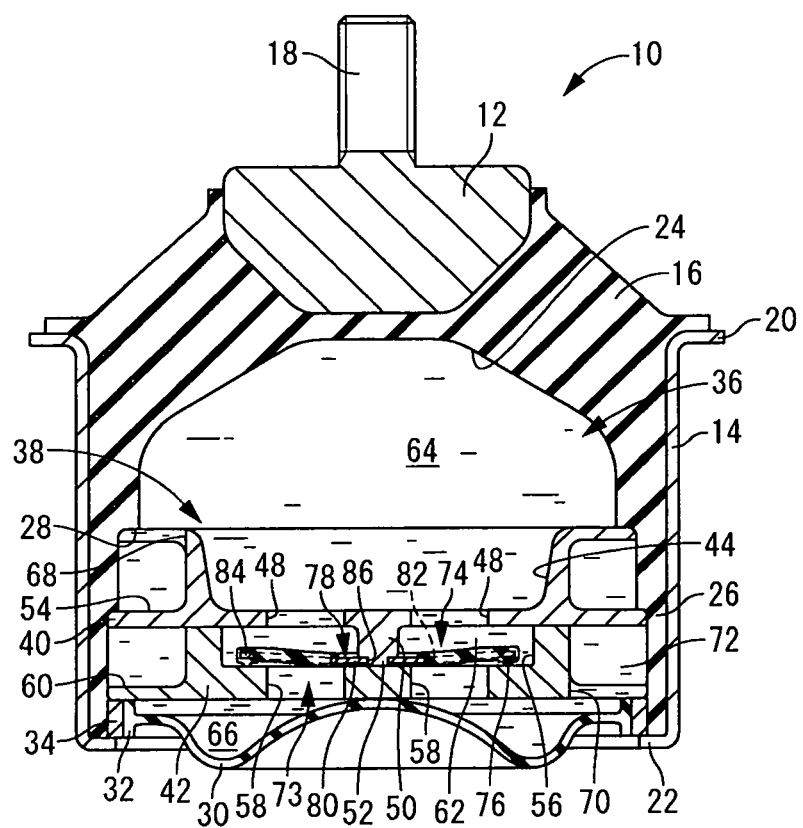
FIG. 1 is a fluid filled type vibration damping device in the form of an engine mount of construction according to a first embodiment of the present invention, taken along line 1-1 of FIG. 2.
Figure 2:
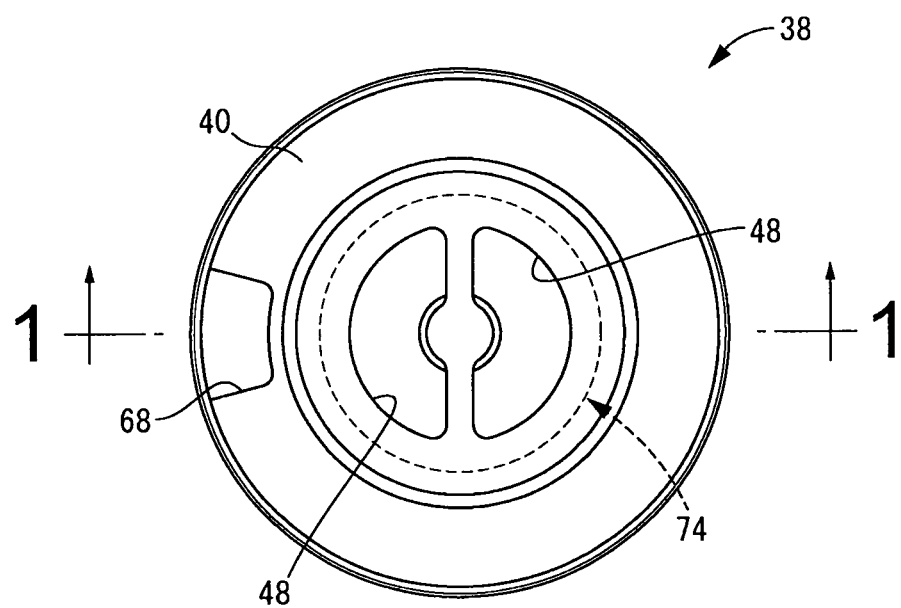
FIG. 2 is a top plane view of a partition member of the engine mount of FIG. 1.

Referring first to FIG. 1, there is depicted an automotive engine mount 10 as one embodiment of the fluid filled type vibration damping device according to the present invention. This engine mount 10 has a construction in which a first mounting member 12 of metal and a second mounting member 14 of metal are connected to one another by a main rubber elastic body 16. The first mounting member 12 is then mounted onto the power unit of the automobile, not shown, which is one of the components making up a vibration transmission system, while the second mounting member 14 is mounted onto the body of the automobile, not shown, which is the other component making up the vibration transmission system, thereby providing vibration damped linkage of the power unit and the car body via the engine mount 10. In the description hereinbelow, the vertical direction refers to the axial direction of the engine mount 10, and also to the vertical direction in FIG. 1, which is coincident with the direction of primary vibration input. In FIG. 1, the engine mount 10 is depicted prior to installation in a vehicle; through installation in a vehicle, the distributed support load of the power unit will be exerted in the axial direction of the engine mount 10.

To describe in greater detail, the first mounting member 12 is a rigid member formed from iron, aluminum alloy or the like, and has a round block shape. An upwardly projecting mounting bolt 18 is integrally formed at the upper end of the first mounting member 12. The first mounting member 12 is attached to the power unit (not shown) by screw fastening the mounting bolt 18 to the power unit.

The second mounting member 14 is a high-rigidity component made of material similar to the first mounting member 12, and has a thin, large-diameter, generally round tube shape. A flanged portion 20 is integrally formed at the upper end of the second mounting member 14, and a swaging piece 22 is formed at the lower end. The second mounting member 14 will be mounted onto the vehicle body side through the agency of a bracket fitting (not shown) or the like fastened about the outside.

The first mounting member 12 and the second mounting member 14 are arranged spaced apart on the same center axis, with the first mounting member 12 situated above the second mounting member 14, and with the fittings linked together by the main rubber elastic body 16.

The main rubber elastic body 16 is formed from a thick rubber elastic body having generally frustoconical shape, with a large-diameter recess 24 formed at its large-diameter end. The large-diameter recess 24 is a recess of inverted, generally bowl or semispherical shape opening downward. In the main rubber elastic body 16, the rim of the opening of the large-diameter recess 24 projects downward.

The first mounting member 12 is inserted from above and vulcanization bonded to the small-diameter end of the main rubber elastic body 16, while the inside peripheral face of the second mounting member 14 is vulcanization bonded to the outside peripheral face of the large-diameter end of the main rubber elastic body 16, whereby the first mounting member 12 and the second mounting member 14 are elastically linked through the main rubber elastic body 16. The main rubber elastic body 16 according to this embodiment is provided as an integrally vulcanization molded component that incorporates the first mounting member 12 and the second mounting member 14.

A seal rubber layer 26 is integrally formed with the main rubber elastic body 16. This seal rubber layer 26 is a rubber elastic body of thin-walled, large diameter, generally round tubular shape extending downward from the lower end of the main rubber elastic body 16, and is anchored to the inside peripheral face of the second mounting member 14. The seal rubber layer 26 is larger in inside diameter than the lower end of the main rubber elastic body 16, with a shoulder portion 28 having continuous annular contours in the circumferential direction formed in the boundary section between the main rubber elastic body 16 and the seal rubber layer 26. The seal rubber layer 26 in this embodiment is thinner to the lower side of its axially medial section than to the upper side, with a shoulder formed in the axially medial section of the seal rubber layer 26 on its inside peripheral face. The inside peripheral face of the second mounting member 14 is sheathed over substantially its entire axial length by the main rubber elastic body 16 and the seal rubber layer 26.

As the flexible film, a diaphragm 30 is disposed at the lower end of the second mounting member 14. The diaphragm 30 is a rubber film of thin, generally round disk shape or circular dome shape having ample slack in the axial direction. A fastener portion 32 of annular shape is integrally formed in the outside peripheral edge part of the diaphragm 30.

A fastener fitting 34 is juxtaposed against and fastened to the outside peripheral face of the fastener portion 32. The fastener fitting 34 is a fitting of generally annular shape, and is a rigid body formed of material similar to the first and second mounting members 12, 14. The fastener portion 32 which has been integrally formed with the diaphragm 30 is juxtaposed against and vulcanization bonded to the inside peripheral face of the fastener fitting 34. The diaphragm 30 in this embodiment is provided as an integrally vulcanization molded component that integrally incorporates the fastener fitting 34.

This diaphragm 30 is attached to the second mounting member 14. Specifically, the fastener fitting 34 which has been fastened about the outside peripheral edge of the diaphragm 30 is juxtaposed, via the intervening seal rubber layer 26, against the lower end of the second mounting member 14, and the second mounting member 14 is then subjected to a diameter reduction process such as 360-degree radial compression to fasten the fastener fitting 34 in a state of intimate contact against the second mounting member 14. In this embodiment, the lower end of the second mounting member 14 is bent peripherally inward to place it in abutment against the lower end face of the fastener fitting 34, thus preventing the fastener fitting 34 from becoming dislodged in the axial direction.

By thusly attaching the diaphragm 30 to the second mounting member 14, there will be defined between the axially opposed faces of the main rubber elastic body 16 and the diaphragm 30 to the inner peripheral side of the second mounting member 14 a fluid chamber 36 that is isolated from the outside and that is filled with a non-compressible fluid. While no particular limitation is imposed on the sealed non-compressible fluid filling the fluid chamber 36, it would be favorable to use water, an alkylene glycol, a polyalkylene glycol, a silicone oil, a some mixture of these for example. In order to effectively achieve vibration damping effect based on flow action of the fluid (discussed later) a low-viscosity fluid having viscosity of 0.1 Pa·s or lower is preferred.

Additionally, a partition member 38 is disposed housed within the fluid chamber 36. The partition member 38 in this embodiment includes an upper partition fitting 40 and a lower partition fitting 42. The upper partition fitting 40 is made of metal such as aluminum alloy, and has a generally round disk shape overall. A center recess 44 of circular shape opening upward is formed in the diametrical center section of the upper partition fitting 40.

Upper communication windows 48 are formed in the base wall part of the center recess 44 of the upper partition fitting 40. The upper communication windows 48 are formed so as to pass through the base wall part of the center recess 44 in its medial section in the diametrical direction. In this embodiment, two such upper communication windows 48 having generally semicircular contours viewed in the axial direction are provided, situated in opposition a prescribed distance apart in the diametrical direction.

A support projection 50 is integrally formed on the base wall part of the center recess 44 of the upper partition fitting 40. The support projection 50 is of small-diameter, generally round post shape, and projects downward from the diametrical center of the upper partition fitting 40. An insert projection 52 is integrally formed at the distal end section of the support projection 50. The insert projection 52 is a round projection of smaller diameter than the support projection 50, and projects downward from the center section at the distal end of the support projection 50.

An upper circumferential groove 54 is formed on the outside peripheral edge of the upper partition fitting 40. The upper circumferential groove 54 is a slot that opens onto the outside peripheral face of the upper partition fitting 40, and that extends for a prescribed length short of full circle in the circumferential direction.

Meanwhile, the lower partition fitting 42, like the upper partition fitting 40, is made of metal such as aluminum alloy, and has a generally round disk shape overall. A housing recess 56 of circular shape opening upward is formed in the diametrical center section of the lower partition fitting 42.

As communication passages, lower communication windows 58 are formed in the base wall part of the housing recess 56 of the lower partition fitting 42. The lower communication windows 58, like the upper communication windows 48 have generally semicircular contours viewed in the axial direction. Two such lower communication windows 58 are situated in opposition a prescribed distance apart in the diametrical direction.

A lower notched portion 60 is formed at the outside peripheral edge of the lower partition fitting 42. The lower notched portion 60 opens onto the outside peripheral face and upper face of the lower partition fitting 42, and extends for a prescribed length short of full circle in the circumferential direction.

The upper partition fitting 40 and the lower partition fitting 42 having the construction described above are juxtaposed top to bottom along the same center axis. The upper partition fitting 40 and the lower partition fitting 42 are positioned in the circumferential direction with respect to one another so that the upper communication windows 48 and the lower communication windows 58 are positioned overlapping in axial projection view. Thus, the ends of the upper circumferential groove 54 and the ends of the lower notched portion 60 are positioned overlapping in axial projection view.

Also, with the upper partition fitting 40 and the lower partition fitting 42 assembling by being juxtaposed together, the upper face opening of the lower notched portion 60 that was formed in the lower partition fitting 42 will be covered by the outside peripheral edge part of the upper partition fitting 40, giving the lower notched portion a grooved contour opening towards the outside peripheral side. Additionally, at a first circumferential end of the mutually aligned upper circumferential groove 54 and lower notched portion 60, a connecting passage is formed in the lower face of the upper circumferential groove 54. The upper circumferential groove 54 and lower notched portion 60 are thereby connected in series to form a circumferential groove of helical shape that extends for a length short of twice around the circumferential direction.

Furthermore, by assembling together the upper partition fitting 40 and the lower partition fitting 42, the opening of the housing recess 56 that was formed in the center section of the lower partition fitting 42 will be covered by the base wall part of the center recess 44 that was formed in the upper partition fitting 40, thus defining a housing space 62 between the upper partition fitting 40 and the lower partition fitting 42.

The partition member 38 having the above construction will be positioned housed within the fluid chamber 36 as discussed above. Specifically, the partition member 38 will be inserted into the second mounting member 14 (to which the diaphragm 30 is not yet attached), by inserting it from the opening on the side opposite the opening to which the main rubber elastic body 16 was attached (the lower opening in FIG. 1). The diaphragm 30 will then be inserted into the second mounting member 14 from below the partition member 38. The second mounting member 14 will then be subjected to a diameter reduction process so that the partition member 38 and the diaphragm 30 are supported by the second mounting member 14.

With the partition member 38 thusly installed in the second mounting member 14, the outside peripheral face of the partition member 38 will be disposed in intimate contact against the second mounting member 14 via the intervening seal rubber layer 26, dividing the fluid chamber 36 into upper and lower parts to either side of the partition member 38. Specifically, to one side of the partition member 38 (the upper side in FIG. 1) there will be formed a pressure receiving chamber 64 whose wall is partly defined by the main rubber elastic body 16 and that gives rise to pressure fluctuations at times of input of vibration. Meanwhile, to the other side of the partition member 38 (the lower side in FIG. 1) there will be formed an equilibrium chamber 66 whose wall is partly defined by the diaphragm 30 and that is adapted to readily change volume. A non-compressible fluid fills the pressure receiving chamber 64 and the equilibrium chamber 66.

The outside peripheral opening of the circumferential groove that was formed on the outside peripheral edge of the partition member 38 is blocked off by the second mounting member 14 via the intervening seal rubber layer 26, forming a tunnel-like passage. At one circumferential end of tunnel-like passage there is formed an upper connecting passage 68 that passes through the upper wall and opens onto the upper face at the outside peripheral edge of the upper partition fitting 40. At the other circumferential end of tunnel-like passage there is formed a lower connecting passage 70 that passes through the lower wall and opens onto the lower face at the outside peripheral edge of the lower partition fitting 42. Thus, at the outside peripheral edge of the partition member 38 there will be formed an orifice passage 72 that extends in a helical shape for a prescribed distance and interconnects the pressure receiving chamber 64 and the equilibrium chamber 66.

In this embodiment, through appropriate setting of the passage length and passage cross sectional area of the orifice passage 72 with attention to the wall spring rigidity of the pressure receiving chamber 64, the passage will be tuned so as to exhibit vibration damping effect (based on flow action of the fluid) against vibration of about 10 Hz, corresponding to engine shake of an automobile.

In the diametrical center section of the partition member 38, the lower communication windows 58 that were formed in the lower partition fitting 42 are placed in communication with the equilibrium chamber 66. The lower communication windows 58 are placed in communication with the pressure receiving chamber 64 through the housing space 62 and the upper communication windows 48. The pressure receiving chamber 64 and the equilibrium chamber 66 thereby communicate with each other through the lower communication windows 58. In this embodiment, the upper communication windows 48, the housing space 62, and the lower communication windows 58 constitute a short-circuit passage 73 that interconnects the pressure receiving chamber 64 and the equilibrium chamber 66.

Figure 3:
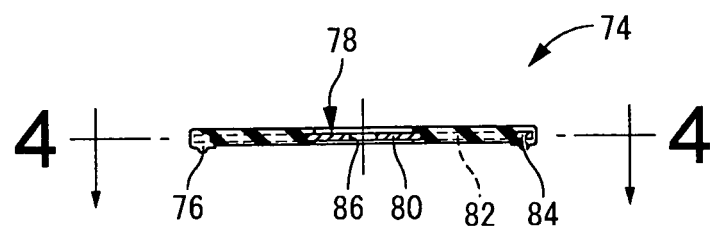
FIG. 3 is a moveable rubber film of the engine mount of FIG. 1, taken along line 3-3 of FIG. 4.
Figure 4:
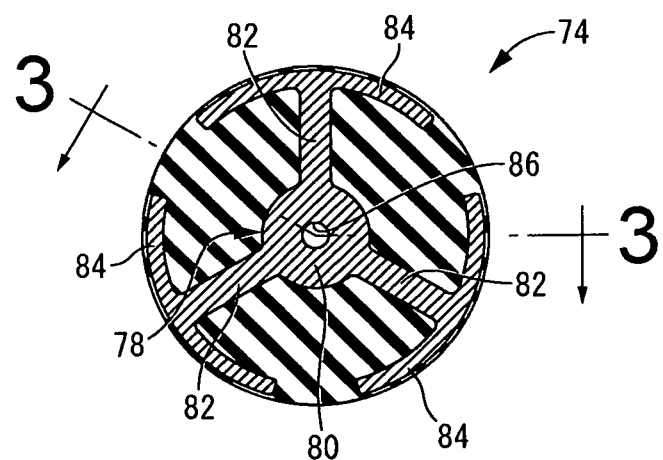
FIG. 4 is the moveable rubber film, taken along line 4-4 of FIG. 3.

As the obstructing rubber elastic plate, a moveable rubber film 74 is arranged in the housing space 62 that was formed in the center section of the partition member 38. As depicted in FIGS. 3 and 4, the moveable rubber film 74 is formed by a rubber elastic body having generally circular disk shape, with a contact projection 76 integrally formed so as to project downward at its outer peripheral section.

The moveable rubber film 74 is positioned accommodated at the diametrical center of the housing space 62, and is juxtaposed from the pressure receiving chamber 64 side against the lower wall of the housing space 62 in which the lower communication windows 58 were formed. When thusly installed in the housing space 62, the outside peripheral edge of the moveable rubber film 74 will be positioned to the outside peripheral side of the lower communication windows 58 so that the lower communication windows 58 are covered and blocked off by the moveable rubber film 74.

Furthermore, with the moveable rubber film 74 thusly installed on the partition member 38, the liquid pressure of the pressure receiving chamber 64 will act upon one face of the moveable rubber film 74 through the upper communication windows 48, while the liquid pressure of the equilibrium chamber 66 will act upon the other face of the moveable rubber film 74 through the lower communication windows 58.

The moveable rubber film 74 of this embodiment also has a plate spring 78 as a reinforcing member. The plate spring 78 is a member of thin, generally plate shape made of a metal such as iron or of a hard synthetic resin. As depicted in FIG. 4, it includes a central constraining portion 80; spoke-shaped spring portions 82 as spoke-shaped portions; and split rim portions 84. The spring constant of the plate spring 78 has been set to a higher level than the rubber elastic body that forms the moveable rubber film 74, making it more resistant to deformation.

To describe in detail, as depicted in FIG. 4, the central constraining portion 80 has a small-diameter, generally circular disk shape, with a circular insertion hole 86 formed in its center section. This insertion hole 86 is of shape and size corresponding to the contour of the insert projection 52 that was provided to the upper partition fitting 40.

The spoke-shaped spring portions 82, which extend linearly towards the outside peripheral side, are integrally formed with the central constraining portion 80. As depicted in FIG. 4, the spoke-shaped spring portions 82 extend radially from the central constraining portion 80. In this embodiment, three spoke-shaped spring portions 82 are formed spaced apart at equidistant intervals from one another in the circumferential direction.

The split rim portions 84 are integrally formed at the distal ends of the spoke-shaped spring portions 82. As depicted in FIG. 4, the split rim portions 84 are of curving elongated shape extending a prescribed distance in the circumferential direction. In this embodiment, the split rim portions 84 are respectively disposed at the distal ends of the spoke-shaped spring portions 82, and positioned spaced apart a prescribed distance from one another in the circumferential direction.

The plate spring 78 of construction as described above is attached to the rubber elastic body of the moveable rubber film 74. Specifically, the plate spring 78 is attached with its diametrical center section exposed to the outside from the rubber elastic body of the moveable rubber film 74, and with its outer peripheral section inclusive of the spoke-shaped spring portions 82 and the split rim portions 84 embedded in the interior of the rubber elastic body of the moveable rubber film 74. In other words, the outside peripheral edge of the central constraining portion 80, the spoke-shaped spring portions 82, and the split rim portions 84 are each attached embedded in the interior of the rubber elastic body that constitutes the moveable rubber film 74, while the center section of the central constraining portion 80 is exposed to the outside through the circular hole which has been formed in the center section of the rubber elastic body. In this embodiment, the moveable rubber film 74 is provided as an integrally vulcanization molded component that incorporates the plate spring 78.

Here, when the moveable rubber film 74 that incorporates the plate spring 78 is positioned at the diametrical center within the housing space 62, the central constraining portion 80 constituting the center section of the moveable rubber film 74 will be positioned between the opposed pair of lower communication windows 58. The center section of the central constraining portion 80 which lies exposed to the outside will be retained clasped between the support projection 50 and the lower wall face of the housing space 62, and the insert projection 52 that was integrally formed at the distal end of support projection 50 will fit inserted within the insertion hole 86 that perforates the center of the central constraining portion 80. In this embodiment, the plate spring 78 is fastened to the partition member 38 at the diametrical center section of the moveable rubber film 74 in this way.

Furthermore, in this embodiment, a downwardly projecting contact projection 76 is integrally formed on the moveable rubber film 74, in the section thereof that is situated to the outside peripheral side of the lower communication windows 58. For this reason, when the diametrical center section of the moveable rubber film 74 is clasped between the support projection 50 and the lower wall face of the housing space 62, the center section of the moveable rubber film 74 will be pushed downward by the support projection 50 by a distance equivalent to the height of the contact projection 76. Thus, urging force directed axially downward based on the elastic force of the plate spring 78 will act on the moveable rubber film 74 on the section thereof to which the plate spring 78 is attached, thus serving to push the section of the moveable rubber film 74 in which the plate spring 78 is attached against the lower wall of the housing space 62.

In this way, the constraining member in this embodiment is realized by utilizing the urging force of the plate spring 78. In the stationary state in the absence of any external load, the outer peripheral section of the moveable rubber film 74 will be retained in the partition member 38 at multiple locations on its circumference to which the split rim portions 84 have been vulcanization bonded.

In this embodiment, in the stationary state in the absence of any external load, zones of the outer peripheral section of the moveable rubber film 74 that are situated away from sections in which the split rim portions 84 are attached will be held in a state of contact against the partition member 38 on the basis of the elastic force of the rubber elastic body which constitutes the moveable rubber film 74.

Furthermore, with the moveable rubber film 74 attached to the partition member 38, the elastic force of the plate spring 78 will be set at a higher level than the elastic force of the rubber elastic body which constitutes the moveable rubber film 74, and the urging force acting on the outer peripheral section of the moveable rubber film 74 in the retained sections to which the plate spring 78 is anchored will be set at a higher level than the urging force acting on zones away from the retained sections. Thus, the retained sections to which the plate spring 78 is anchored in the outer peripheral section of the moveable rubber film 74 will be pushed more strongly against the partition member 38 than are zones away from the retained sections.

With the automotive engine mount 10 constructed as above installed in an automobile, when engine shake or other vibration in the low-frequency range that can be a problem during driving is input, relatively large pressure fluctuations will be produced in the pressure receiving chamber 64. Due to a relative pressure fluctuation differential arising between the pressure receiving chamber 64 and the equilibrium chamber 66, sufficient flow of fluid through the orifice passage 72 will be effectively assured and effective vibration damping action (high damping action) against engine shake or other vibration of a low frequency range will be produced based on flow action, e.g. the resonance action, of the fluid.

In this embodiment, the moveable rubber film 74 is juxtaposed against the lower partition fitting 42 from the pressure receiving chamber 64 side, and when positive pressure acts on the pressure receiving chamber 64 due to input of vibration targeted for damping, the moveable rubber film 74 will be pushed against the lower partition fitting 42, thereby holding the lower communication windows 58 in the closed off state. Thus, liquid pressure of the pressure receiving chamber 64 will be prevented from escaping to the equilibrium chamber 66 through the short-circuit passage 73, and the desired high damping action can be effectively achieved.

Furthermore, at times of input of ordinary vibration, the moveable rubber film 74 remains pushed against the lower partition fitting 42 to an extent such that the moveable rubber film 74 and the lower partition fitting 42 will not be released from their state of contact. Thus, at times of input of ordinary vibration, the liquid pressure of the pressure receiving chamber 64 will be prevented from escaping to the equilibrium chamber 66 through the short-circuit passage 73, and vibration damping action based on fluid flow through the orifice passage 72 can be effectively achieved.

Moreover, in this embodiment, the plate spring 78 is attached to the moveable rubber film 74, and the plate spring 78 includes spoke-shaped spring portions 82 that extend radially. Thus, the free length of the rubber-only section (which to deform relatively easily) in the moveable rubber film 74 can be kept to a minimum, and liquid pressure absorbing action produced by elastic deformation of the moveable rubber film 74 can be limited. Pressure fluctuations of the pressure receiving chamber 64 can thus be assured, and the desired vibration damping action can be obtained.

Moreover, with the automotive engine mount 10 installed in an automobile, when idling vibration, driving rumble, or other such vibration in a medium- to high-frequency range is input, the orifice passage 72 will become substantially closed off through antiresonance-like action, and zones away from the section where the plate spring 78 is attached to the moveable rubber film 74 will experience miniscule deformation due to the relative pressure fluctuation differential arising between the pressure receiving chamber 64 and the equilibrium chamber 66 so that liquid pressure of the pressure receiving chamber 64 is absorbed through escape to the equilibrium chamber 66. Thus, effective vibration damping action (low dynamic spring action) against idling vibration, driving rumble, or other such vibration in a medium- to high-frequency range will be produced based on this liquid pressure-absorbing action.

When sudden impact load, such as may occur when the automobile drives over a bump, is input to the engine mount 10, excessive negative pressure will arise in the pressure receiving chamber 64. If liquid pressure of the pressure receiving chamber 64 drops precipitously in this way, the moveable rubber film 74 will be suctioned towards the pressure receiving chamber 64 side due to the relative pressure differential between the pressure receiving chamber 64 and the equilibrium chamber 66. Under the action of this suction force, the moveable rubber film 74 will undergo elastic deformation and be drawn towards the pressure receiving chamber 64 side so that the outside peripheral edge of the moveable rubber film 74 separates from the lower wall of the housing space 62 in the partition member 38 and moves towards the pressure receiving chamber 64 side, thereby placing the lower communication windows 58 in the communicating state.

The pressure receiving chamber 64 and the equilibrium chamber 66 will thus be placed in communication with one another through the upper communication windows 48, the housing space 62, and the lower communication windows 58 (i.e. the short-circuit passage 73), and the sealed fluid will be induced to flow from the equilibrium chamber 66 to the pressure receiving chamber 64 through the short-circuit passage 73, which includes the lower communication windows 58. Excessive negative pressure in the pressure receiving chamber 64 may be reduced or eliminated as rapidly as possible through the flow of fluid through the short-circuit passage 73 (which has lower flow resistance than the orifice passage 72) taking place in this way.

In the engine mount 10 according to this embodiment, the moveable rubber film 74 in its diametrical center section is held in contact against the partition member 38; while its outer peripheral section includes both sections that are retained by the split rim portions 84 of the plate spring 78, and sections constituted by the rubber elastic body only and which are situated between the split rim portions 84 in the circumferential direction. Thus, the aperture area of the lower communication windows 58 (i.e. the substantial passage cross sectional area of the short-circuit passage 73) will vary depending on the extent of negative pressure arising in the pressure receiving chamber 64.

Specifically, where the pressure receiving chamber 64 experiences negative pressure of an extent such that bubble formation through cavitation could become a problem, the zones situated away from the retained sections where the split rim portions 84 are anchored will undergo elastic deformation in opposition to the retention force, but the retained sections where the split rim portions 84 are anchored will be held in their initial state through retention force. This is because the rubber-only sections situated away from the retained sections (the sections where the split rim portions 84 are anchored) will experience relatively low retention force based on the elastic force of the rubber elastic body, while the retained sections to which are anchored the sprit rim portions 84 that make up part of the plate spring 78 will experience relatively high retention force due to the elasticity of the plate spring 78, as compared with the rubber-only sections.

Figure 5:
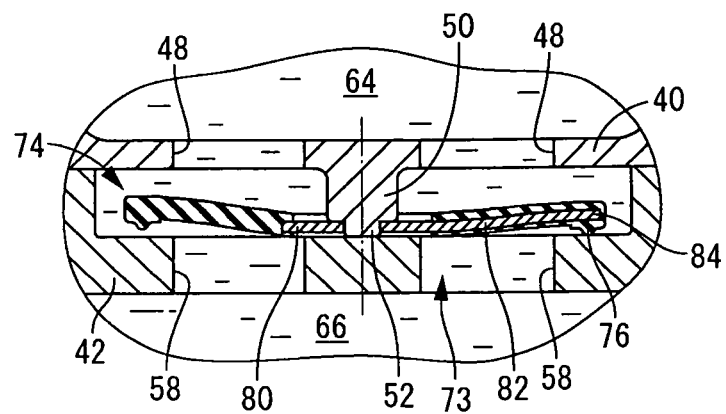
FIG. 5 is a fragmentary enlarged view showing one state of deformation of the moveable rubber film of the engine mount of FIG. 1.

That is, if negative pressure of an extent possibly causing noise due to cavitation should arise in the pressure receiving chamber 64, as depicted in FIG. 5, first, the relatively narrow zones that are situated circumferentially between the split rim portions 84 at the outside peripheral edge of the moveable rubber film 74 will partially separate from the partition member 38, so that the lower communication windows 58 open up with relatively small aperture area. The negative pressure of the pressure receiving chamber 64 can then be effectively reduced or eliminated by inflow of sealed fluid from the equilibrium chamber 66 to the pressure receiving chamber 64, through the lower communication windows 58 which now lie partially open at several locations along the circumference of the moveable rubber film 74.

Figure 6:
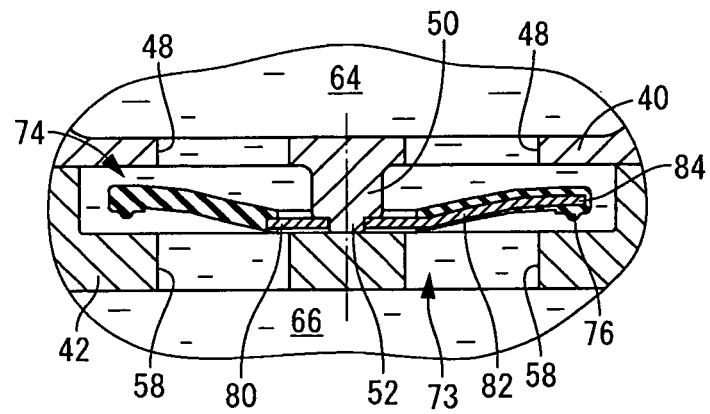
FIG. 6 is a fragmentary enlarged view showing another state of deformation of the moveable rubber film of the engine mount of FIG. 1.

Once an even higher level of negative pressure has arisen in the pressure receiving chamber 64, considerable suction force based on the negative pressure will act on the moveable rubber film 74. When such large suction force acts on the moveable rubber film 74, as depicted in FIG. 6, the rubber-only sections situated away from the split rim portion 84 anchoring sections in the outer peripheral section of the moveable rubber film 74 will experience even greater elastic deformation and move a greater distance apart from the partition member 38.

Furthermore, the action of such a high level of suction force on the moveable rubber film 74 as described above will also induce the split rim portion 84 anchoring sections in the moveable rubber film 74 to undergo elastic deformation in opposition to the elastic force of the plate spring 78. Specifically, as depicted in FIG. 6, the plate spring 78 anchoring sections of the moveable rubber film 74 will undergo elastic deformation, causing the retaining sections where the split rim portions 84 are anchored to the outer peripheral section of the moveable rubber film 74 to now separate from the partition member 38.

In this embodiment, in the plate spring 78, the spoke-shaped spring portions 82 that extend radially from the central constraining portion 80, as well as the split rim portions 84 that are integrally formed with the outside peripheral distal ends of the spoke-shaped spring portions 82, are both thin and narrow in width. Thus, the plate spring 78 may undergo elastic deformation relatively easily in its spoke-shaped spring portions 82 and split rim portions 84.

With the moveable rubber film 74 now separated about its entire circumference from the partition member 38 in this way, a large aperture area of the lower communication windows 58 will be assured. For this reason, the amount of fluid inflowing from the equilibrium chamber 66 to the pressure receiving chamber 64 through the short-circuit passage 73 inclusive of the lower communication windows 58 can be increased, and negative pressure can more effectively be eliminated from the pressure receiving chamber 64.

In the engine mount 10 according to this embodiment, the aperture area of the lower communication windows 58 will vary depending on the level of negative pressure of the pressure receiving chamber 64. Thus, cavitation-inhibiting effect afforded by fluid flow through the short-circuit passage 73 can be effectively obtained commensurate with any particular level of negative pressure that may occur.

As will appreciated from the description above, in the engine mount 10 according to this embodiment, the opening/closing control member, which is adapted to hold the lower communication windows 58 in the closed off state in instances where positive pressure acts on the pressure receiving chamber 64 while opening up the lower communication windows 58 in instances where a high level of negative pressure acts on the pressure receiving chamber 64, may be realized by virtue of the elasticity of the moveable rubber film 74. Herein, negative pressure acting on (arising in) the pressure receiving chamber 64 refers to a condition in which, with the engine mount 10 installed in an automobile, the internal pressure of the pressure receiving chamber 64 filled with non-compressible fluid drops to a level below that in the stationary state.

As mentioned above, in the engine mount 10 according to this embodiment, the aperture area of the lower communication windows 58 will adjust according to the level of negative pressure acting on the pressure receiving chamber 64. Fluid flow through the short-circuit passage 73 is regulated even when the lower communication windows 58 are open. Thus, even with the lower communication windows 58 in the open state, fluid flow will take place through the orifice passage 72 and vibration damping effect based on high damping will be achieved.

Moreover, with the lower communication windows 58 in the open state, the wall spring rigidity of the pressure receiving chamber 64 will be lower, thereby shifting the tuning frequency of the orifice passage 72 further towards the low-frequency end. Consequently, in the engine mount 10 according to this embodiment, effective vibration damping effect can be obtained against vibration of a wider frequency range that includes a lower frequency range than the original tuning frequency.

Figure 7:
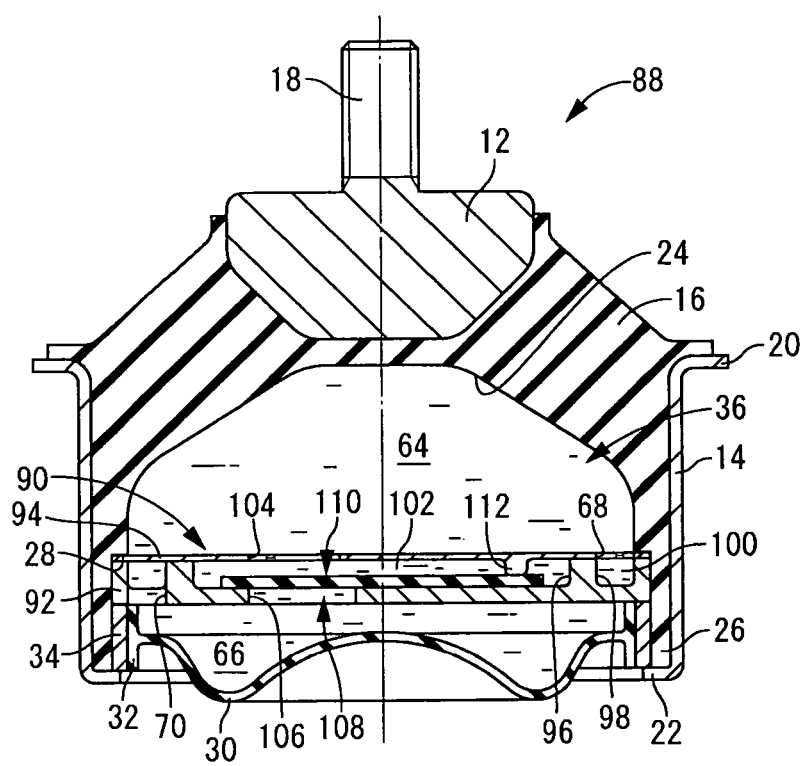
FIG. 7 is an engine mount of construction according to a second embodiment of the present invention, taken along line 7-7 of FIG. 8.

Next, an automotive engine mount 88 will be described by way of a second embodiment of the fluid filled type vibration damping device according to the present invention, depicted in FIG. 7. In the description hereinbelow, elements substantially identical to those in first embodiment are assigned like symbols and are not described in detail.

The engine mount 88 is provided with a partition member 90. This partition member 90 is a high-rigidity member formed from iron, aluminum alloy or the like of thick, large-diameter generally circular disk shape. The partition member 90 includes a partition member main body 92 and a cover fitting 94.

The partition member main body 92 presents a generally circular disk shape overall, and in its center section has a housing recess 96 of circular shape that opens upward. A circumferential groove 98 that opens onto the upper end face and that extends for a prescribed length short of full circle in the circumferential direction is formed in the outer peripheral section of the partition member main body 92.

The cover fitting 94 is a high-rigidity member of thin, generally circular disk shape having approximately the same outside diameter as the partition member main body 92, and is arranged on the same center axis as the partition member main body 92 and juxtaposed against the upper end face thereof, to constitute the partition member 90.

In this embodiment, the juxtaposed partition member main body 92 and cover fitting 94 are attached fitting to the inner peripheral side of the second mounting member 14 while clasped in the axial direction between the shoulder portion 28 that was formed at the lower end of the main rubber elastic body 16, and the fastener fitting 34 that was attached to the outside peripheral face of the diaphragm 30; and is thereby secured in the axial direction between the partition member main body 92 and the cover fitting 94.

As in the first embodiment described previously, the partition member 90 will be fastened supported with its outside peripheral face in intimate contact against the second mounting member 14, by being inserted within the second mounting member 14, and in this state subjecting the second mounting member to a diameter reduction process.

With the partition member 90 installed in the second mounting member 14, the opening of the circumferential groove 98 that was formed at the outside peripheral edge of the partition member main body 92 will be covered by the cover fitting 94. A tunnel-like passage that extends in the circumferential direction through the outer peripheral section of the partition member 90 is formed thereby. Furthermore, at locations corresponding to the circumferential ends of the circumferential groove 98, an upper connecting passage 68 is formed in the cover fitting 94, while a lower connecting passage 70 is formed in the partition member main body 92. The circumferential ends of the circumferential groove 98 communicate with the pressure receiving chamber 64 and with the equilibrium chamber 66 through the upper and lower connecting passages 68, 70, and this circumferential groove 98 is utilized to form an orifice passage 100 that interconnects the pressure receiving chamber 64 and the equilibrium chamber 66.

A housing space 102 is formed in the center section of the partition member 90. The housing space 102 is formed when the opening of the housing recess 96 that was formed in the partition member main body 92 is covered with the cover fitting 94.

Figure 8:
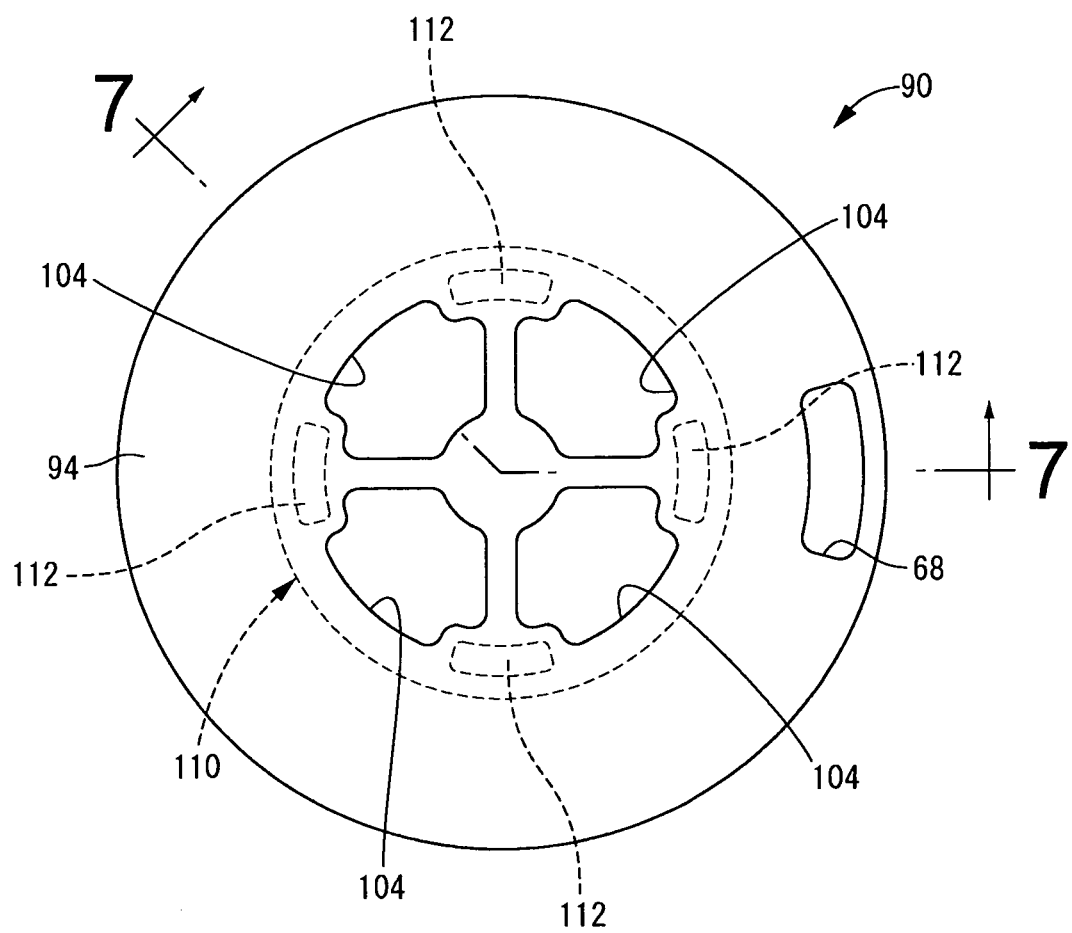
FIG. 8 is a top plane view of a partition member of the engine mount of FIG. 7.

Furthermore, upper communication windows 104 have been formed perforating the diametrically medial section of the cover fitting 94 that constitutes the upper wall face of the housing space 102. As depicted in FIG. 8, these upper communication windows 104 have fan-shaped appearance with a center angle of approximately 90° viewed in the axial direction. Four of these upper communication windows 104 are formed at equidistant intervals in the circumferential direction. The housing space 102 communicates with the pressure receiving chamber 64 through these upper communication windows 104.

Moreover in addition, lower communication windows 106 serving as communication passages have been formed perforating the diametrically medial section of the partition member main body 92 that constitutes the lower wall face of the housing space 102. The lower communication windows 106 are of shape corresponding generally to that of the upper communication windows 104 viewed in the axial direction. Four of these lower communication windows 106 are formed on the circumference at locations corresponding to the upper communication windows 104. The housing space 102 communicates with the equilibrium chamber 66 through these lower communication windows 106.

The housing space 102 communicates with the pressure receiving chamber 64 through the upper communication windows 104, and communicates with the equilibrium chamber 66 through the lower communication windows 106. A short-circuit passage 108 that interconnects the pressure receiving chamber 64 and the equilibrium chamber 66 and that includes the lower communication windows 106 is constituted thereby. From the above discussion it will be appreciated that the short-circuit passage 108 is formed so as to connect the pressure receiving chamber 64 and the equilibrium chamber 66 at a location different from the orifice passage 100.

Within the housing space 102, a moveable rubber film 110 is disposed as the obstructing rubber elastic plate. The moveable rubber film 110 is formed by a rubber elastic body having generally round disk shape of outside diameter smaller than the inside diameter of the housing space 102, and of size so as to extend outwardly beyond the outside peripheral edges of the lower communication windows 106. The moveable rubber film 110, arranged thusly within the housing space 102, will be acted upon at a first face thereof by liquid pressure of the pressure receiving chamber 64 and at the other face by liquid pressure of the equilibrium chamber 66.

In this embodiment, the outer peripheral section of the moveable rubber film 110 is constrained by clasping projections 112 that function as constraining members. As depicted in FIGS. 7 and 8, the clasping projections 112 have been integrally formed so as to project downward from the diametrical center section of the cover fitting 94 and into the outer peripheral section of the housing space 102. As depicted in FIG. 7, the outer peripheral section of the moveable rubber film 110 is constrained by being held clasped between the distal end faces of the clasping projections 112 and the lower wall of the housing space 102. In this embodiment, the clasping projections 112 are formed at four locations along the circumference as shown by the broken lines in FIG. 8, with each clasping projection 112 extending a prescribed length in the circumferential direction.

With the moveable rubber film 110 arranged thusly within the housing space 102 with its outside peripheral portion constrained in this way, the lower communication windows 106 through which the housing space 102 communicates with the equilibrium chamber 66 will be blocked off by the moveable rubber film 110, so that short-circuit passage is cut off by the moveable rubber film 110.

With the engine mount 88 of the above construction installed in a vehicle, when low-frequency, large-amplitude vibration corresponding to engine shake is input, vibration damping effect will be produced on the basis of the resonance effect etc. of non-compressible fluid induced to flow through the orifice passage 100. When medium- to high-frequency, small-amplitude vibration such as idling vibration or driving rumble is input, liquid pressure-absorbing action will be effectively produced through miniscule deformation of the moveable rubber film 110 based on the pressure differential between the pressure receiving chamber 64 and the equilibrium chamber 66, so vibration damping action through low dynamic spring action can be obtained.

When positive pressure acts on the pressure receiving chamber 64, the moveable rubber film 110 will be pressed against the lower wall of the housing space 102, thereby holding the lower communication windows 106 in the closed state. Thus, sufficient liquid pressure of the pressure receiving chamber 64 will be assured, and fluid flow through the orifice passage will be effectively produced. Consequently, the desired vibration damping effect may be effectively achieved.

If excessive negative pressure should act on the pressure receiving chamber 64 due to a sudden impact load input to the engine mount 10 such as may occur, for example, when the automobile drives over a bump, the moveable rubber film 110 will be suctioned towards the pressure receiving chamber 64 side due to the relative pressure differential between the pressure receiving chamber 64 and the equilibrium chamber 66. Thus, zones away from the portions retained by the clasping projections 112 in the outside peripheral edge of the moveable rubber film 110 will undergo elastic deformation due to the action of the negative pressure of the pressure receiving chamber 64. In these zones away from the retained portions, the outside peripheral edge of the moveable rubber film 110 will separate from the partition member 90 so that the short-circuit passage 108 is released from the cut off state, and the pressure receiving chamber 64 and the equilibrium chamber 66 will now communicate with one another through the short-circuit passage 108.

When the pressure receiving chamber 64 and the equilibrium chamber 66 are placed in communication with one another through the short-circuit passage 108 in the above manner and fluid sealed therein is induced to flow between the chambers 64, 66, the negative pressure in the pressure receiving chamber 64 will be quickly dispelled so as to prevent cavitation bubbles that may form due to excessive negative pressure exerted on the pressure receiving chamber 64, thus effectively preventing the noise and vibration associated with bursting of such bubbles.

Moreover, because the outer peripheral section of the moveable rubber film 110 is constrained at several locations on its circumference by the clasping projections 112, at times of input of large jarring load sufficient for bubbles to form through cavitation, the short-circuit passage 108 will open up. At time of input of load posing no risk of bubbles forming through cavitation, the short-circuit passage 108 will be held in the cutoff state, thereby effectively affording high damping effect by fluid flow through the orifice passage 100 as well as the desired vibration damping action on the basis of low spring effect produced by miniscule deformation of the moveable rubber film 110.

Figure 9:
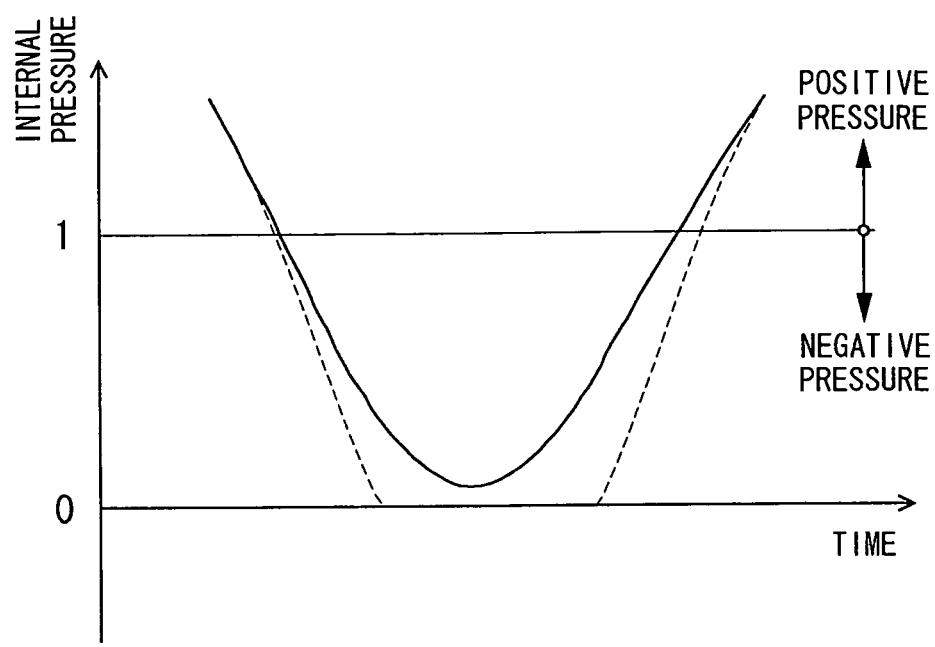
FIG. 9 is a graph demonstrating vacuum canceling effect of the engine mount of FIG. 7.

The effectiveness of the fluid filled type vibration damping device according to the present invention in terms of eliminating negative pressure of the pressure receiving chamber may be appreciated from the graph of measurements depicted in FIG. 9.

Specifically, as indicated by the broken line in FIG. 9, measurements for Comparative Example 1, which lacks a structure by which liquid pressure may escape from the pressure receiving chamber, show that extremely high levels of negative pressure may arise in the pressure receiving chamber in some instances. Under conditions of such extreme negative pressure, in other words, a state of vacuum with the internal pressure of the pressure receiving chamber at zero, noise and vibration due to bubbles forming from the liquid may occur. Thus, in Comparative Example 1, there is a risk of the problem of noise and vibration due to cavitation.

On the other hand, as indicated by the solid line in FIG. 9, measurements for an example in which a fluid filled type vibration damping device according to the present invention was employed show that negative pressure of the pressure receiving chamber is more effectively eliminated, and the internal pressure of the pressure receiving chamber never reaches zero, i.e. a state of vacuum. Thus, in the example, formation of bubbles out of the liquid due to a drop in internal pressure of the pressure receiving chamber will be limited, so as to reduce or avoid noise caused by cavitation. The ability of the fluid filled type vibration damping device according to the present invention to effectively prevent noise and vibration from occurring due to cavitation is clearly demonstrated by these measurements.

Figure 10:
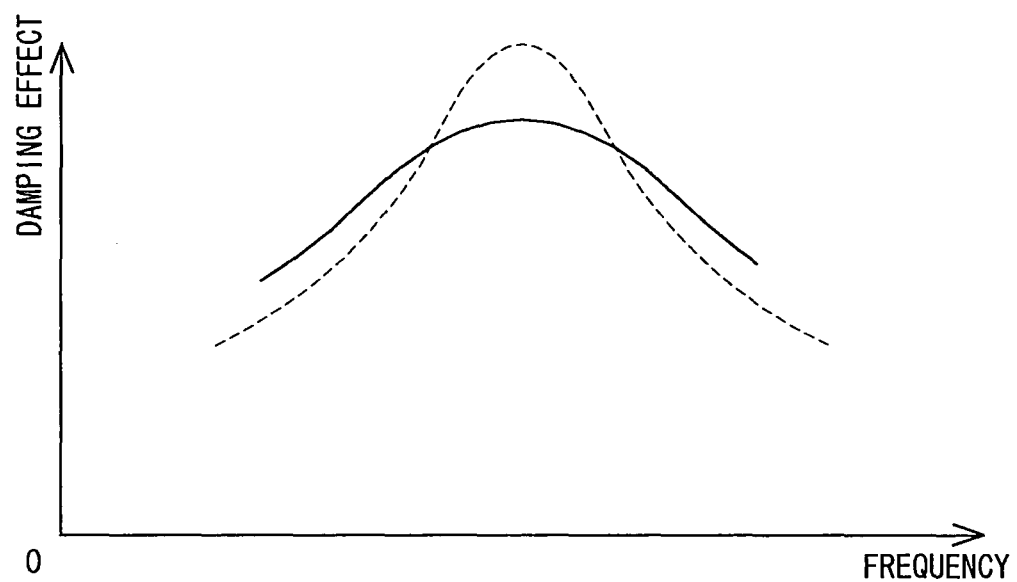
FIG. 10 is a graph demonstrating vibration damping capability of the engine mount of FIG. 7.
Figure 11:
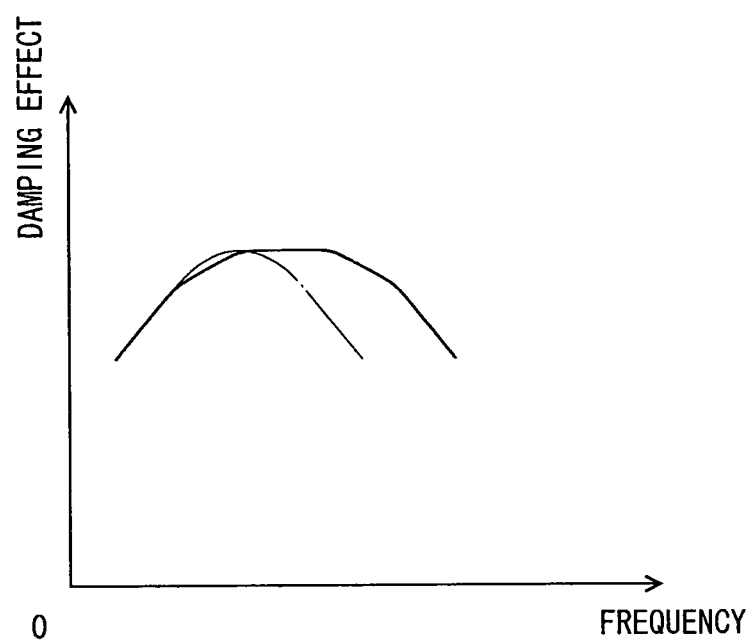
FIG. 11 is a graph demonstrating vibration damping capability of the engine mount of FIG. 7.

Additionally, the ability of the fluid filled type vibration damping device according to the present invention to exhibit vibration damping effect against a wider frequency range based on the flow action of fluid flowing through the orifice passage will be apparent from the measurements shown in FIGS. 10 and 11.

Specifically, as compared to measurements (indicated by the broken line in FIG. 10) of Comparative Example 1 obtained using a fluid filled type vibration damping device of conventional construction lacking a liquid pressure escape mechanism, measurements (indicated by the solid line in FIG. 10) for an example in which a fluid filled type vibration damping device of construction according to the present invention was employed show effective high damping effect over a wider frequency range. Also, as shown in FIG. 10, while the maximum value of damping force observed in the measurements of the example was smaller than the maximum value of damping force observed in the measurements for Comparative Example 1, in the example, damping force sufficient to produce the desired vibration damping effect could be achieved over a wider frequency range, so the lower damping force posed substantially no problem.

According to FIG. 11, as compared to measurements (indicated by the dot-and-dashed line in the drawing) of Comparative Example 1 obtained using a fluid filled type vibration damping device of construction lacking a mechanism to adjust the aperture area of the communicating passage (i.e. lacking a constraining member for constraining the outside peripheral edge of the obstructing rubber elastic plate), the measurements (indicated by the solid line in the drawing) for an example according to the present invention demonstrate effective high damping effect over a wider frequency range. It will therefore be appreciated from the above measurements that the fluid filled type vibration damping device according to the present invention affords vibration damping effect based on fluid flow through the orifice passage, over a wider frequency range.

While the present invention has been shown hereinabove in terms of certain preferred embodiments, these are merely illustrative and should in no wise be construed as limiting the invention to the specific disclosure herein.

For example, the main moveable rubber film 74 shown in the first and second embodiments is merely exemplary of the obstructing rubber elastic plate according to the present invention, and the specific construction of the obstructing rubber elastic plate should not be construed as limited to the specific construction taught in the first and second embodiments.

Figure 12:
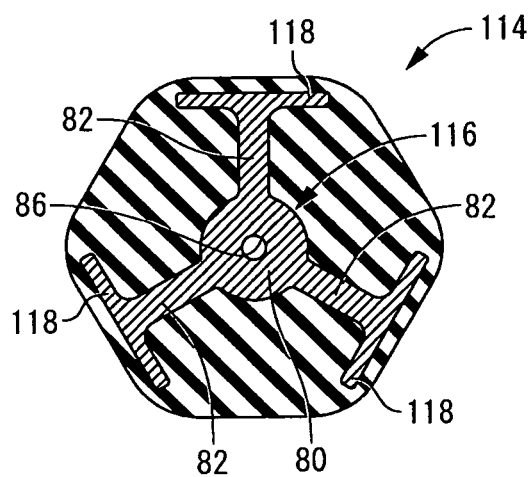
FIG. 12 is a moveable rubber film of another arrangement employed in the present invention.

As a specific example, the moveable rubber film 114 depicted in FIG. 12 could be employed as the obstructing rubber elastic plate. Specifically, this moveable rubber film 114 is provided with a plate spring 116 that is formed by a rubber elastic body of generally hexagonal shape viewed in the axial direction (i.e. perpendicular to the plane of the page in FIG. 12).

Like those in the first and second embodiments, the plate spring 116 is made of metal or synthetic resin, and is of plate shape integrally incorporating a central constraining portion 80, spoke-shaped spring portions 82, and split rim portions 118. The split rim portions 118 are linear in shape and perpendicular to the spoke-shaped spring portions 82, and have been integrally formed at the outside peripheral distal ends of the spoke-shaped spring portions 82 so as to extend along the contours of the moveable rubber film 114.

The plate spring 116 having the above construction is anchored to the rubber elastic body of generally hexagonal shape viewed in the axial direction, to form the moveable rubber film 114. By employing the moveable rubber film 114 of this construction as the obstructing rubber elastic plate it will be possible to achieve both the desired effect of eliminating noise caused by cavitation, as well as the orifice effect over a wide frequency range.

The obstructing rubber elastic plate may of course have a polygonal shape other than hexagonal. Also, the obstructing rubber elastic plate may utilize a rubber elastic body that has been pre-molded to hexagonal or other polygonal shape. Alternatively, a rubber elastic body that has been pre-molded to circular shape may be subjected to post-molding shrinkage etc. to produce a final shape having a contour section of polygonal or linear chord shape. That is, no particular limitation is imposed on the shape of the obstructing rubber elastic plate.

Figure 13:
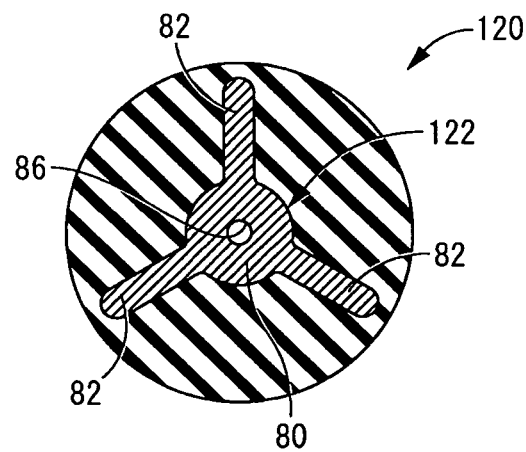
FIG. 13 is a moveable rubber film of another arrangement employed in the present invention.

For example, it would be possible to employ as the obstructing rubber elastic plate one like the moveable rubber film 120 depicted in FIG. 13, having a structure in which a plate spring 122 composed of a central constraining portion 80 and spoke-shaped spring portions 82 is anchored by being embedded in a rubber elastic body of circular disk shape. By employing a plate spring 122 of this structure from which the split rim portions 84 extending in the circumferential direction have been omitted, zones situated away from sections where the plate spring 122 is anchored at the outside peripheral edge of the moveable rubber film 120 will have greater free length, thus allowing elastic deformation to take place more easily at the outside peripheral edge. Consequently, a larger aperture area will be possible for the lower communication windows 58 in those zones situated away from the plate spring 122 anchoring sections.

Where the moveable rubber film 74 is one like that shown in the first and second embodiments having a plate spring 78 provided with split rim portions 84, by appropriately establishing the length of the split rim portions 84 in the circumferential direction it will be possible to adjust the aperture area of the lower communication windows 58 in the absence of deformation of the plate spring 78, as well as the aperture area of the lower communication windows 58 with deformation of the plate spring 78.

Figure 14:
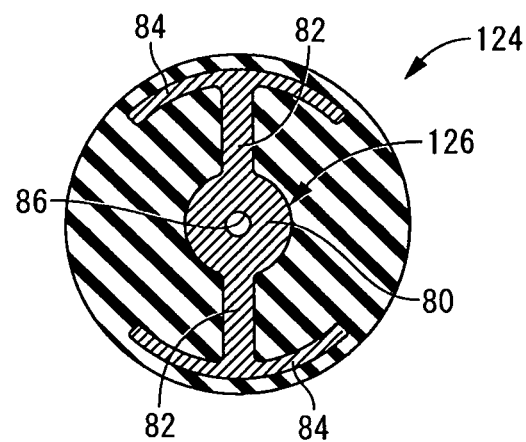
FIG. 14 is a moveable rubber film of another arrangement employed in the present invention.

If, as in the moveable rubber film 124 depicted in FIG. 14 for example, a plate spring 126 having a structure in which spoke-shaped spring portions 82 extend to either side along an axis lying in the axial-perpendicular direction and in which split rim portions 84 are integrally formed respectively at the circumferential distal ends of the spoke-shaped spring portions 82 could also be employed as the obstructing rubber elastic plate. Thus, the number, shape etc. of the spoke-shaped spring portions or of split rim portions is not limited in any particular way and can be established appropriately according to the required vibration damping characteristics.

Figure 15:
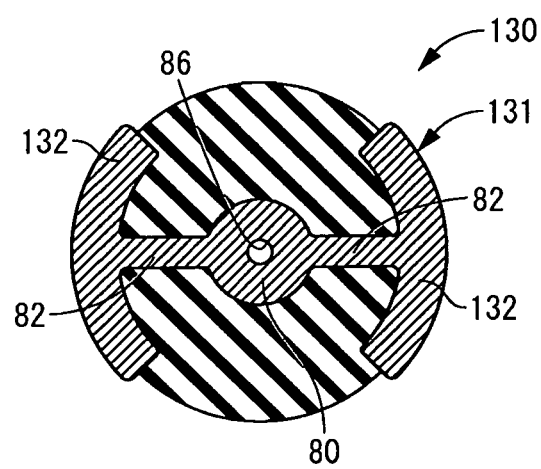
FIG. 15 is a moveable rubber film of another arrangement employed in the present invention.

In the moveable rubber film 74 taught in the first and second embodiments above, the split rim portions 84 provided at the outside peripheral edge of the plate spring 78 have a structure entirely embedded in the rubber elastic body. However, a film in which the split rim portions 132 of the plate spring 131 lie exposed at the outside peripheral face of the moveable rubber film 130, as with the moveable rubber film 130 depicted in FIG. 15, could also be employed as the obstructing rubber elastic plate. The split rim portions may also lie partially exposed in the circumferential direction. Additionally, some or all of the split rim portions may lie exposed to one or both sides of the obstructing rubber elastic plate in its thickness direction.

The plate spring need not necessarily be anchored to the obstructing rubber elastic plate in a state of embedment within the rubber elastic body. For instance, an obstructing rubber elastic plate furnished with a constraining member could also be achieved by affixing the plate spring so as to be juxtaposed against one face of a rubber elastic body of circular disk shape.

While the moveable rubber film 74 taught in the first and second embodiments above employs a constraining member of a structure having a plate spring 78 of metal or hard synthetic resin attached, even where the obstructing rubber elastic plate consists of a rubber elastic body only, a constraining member therefor could be realized by attaching a reinforcing member of a rubber elastic body constituted as a separate element, or by appropriate modifications to thickness, shape etc.

Figure 16:
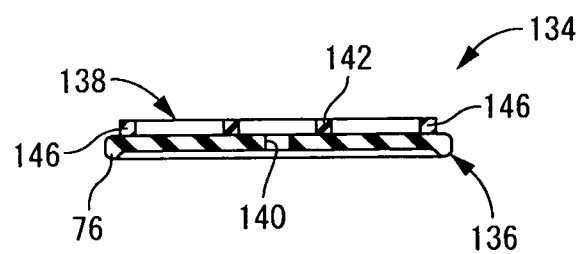
FIG. 16 is a moveable rubber film of another arrangement employed in the present invention, taken along line 16-16 of FIG. 17.
Figure 17:
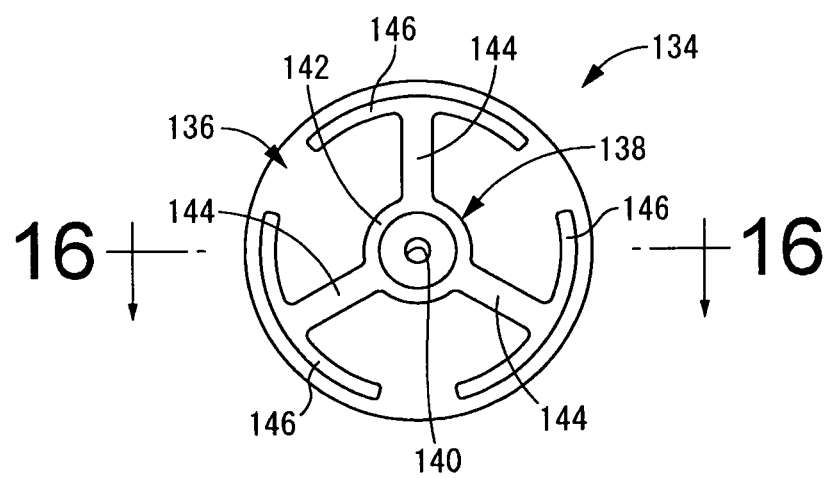
FIG. 17 is a top plane view of the moveable rubber film of FIG. 16.

Specifically, as with the moveable rubber film 134 depicted in FIGS. 16 and 17 for example, the constraining member for attachment to the rubber elastic main body 136 could consist of a reinforcing body 138 as a reinforcing member formed of a rubber elastic body. The rubber elastic main body 136 is a rubber elastic body of generally circular disk shape having an integrally formed contact projection 76 projecting downward at is outside peripheral edge, and having a circular through-hole 140 formed in its center part.

As depicted in FIG. 17, the reinforcing body 138 is formed by a rubber elastic body and has a central annular portion 142, spoke-shaped spring portions 144, and split rim portions 146. In plan view, it is similar in shape to the plate spring 78 taught in the preceding first and second embodiments. The central annular portion 142 is a small-diameter, generally circular ring shape, and constitutes the center section of the reinforcing body 138. The elongated spoke-shaped spring portions 144 are integrally formed with the central annular portion 142 and extend radially towards the outside peripheral side. The split rim portions 146 are integrally formed respectively at the outside peripheral distal ends of the spoke-shaped spring portions 144, and extend for prescribed length in the circumferential direction. The reinforcing body 138 will have a spring constant that is higher than the spring constant of the rubber elastic main body 136.

With the moveable rubber film 134 composed of a reinforcing body 138 of such a structure juxtaposed against and affixed to one face of the rubber elastic main body 136, the constraining member can be realized through the reinforcing body 138 formed by a rubber elastic body and having relatively high spring constant. Thus, it is not always necessary to employ a separate member such as a plate spring made of metal or hard synthetic resin as the constraining member, and the constraining member could also be implemented using a rubber elastic body.

The reinforcing body 138 may also be integrally formed with the rubber elastic main body 136. Specifically, a constraining member can be realized by making the moveable rubber film 134 partially thicker so as to increase the spring constant in the thicker section. The number of parts can be minimized thereby, and an operation to attach the reinforcing body 138 and the rubber elastic main body 136 will not be necessary. Separate or unified reinforcing bodies 138 may be disposed on both sides of the rubber elastic main body 136 as well.

While the preceding second embodiment teaches a structure in which the outer peripheral section of the moveable rubber film 110 is constrained by the partition member 90, in this sort of structure wherein the outer peripheral section of the obstructing rubber elastic plate is constricted by a partition member, the constraining member is not limited to the structure shown in the second embodiment.

Figure 18:
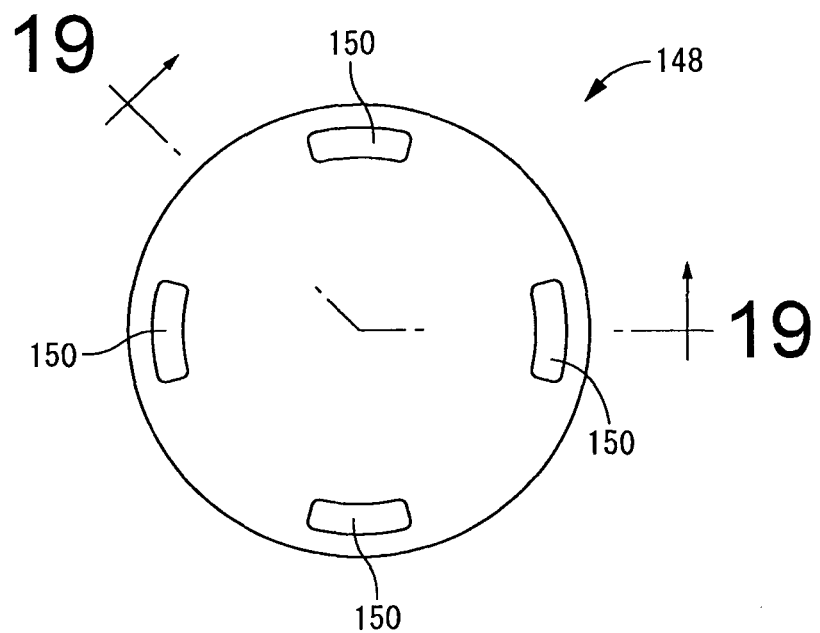
FIG. 18 is a top plane view of a moveable rubber film of another arrangement employed in the present invention.

For example, there could be employed a structure like that of the moveable rubber film 148 depicted in FIG. 18, having constraining projections 150 serving as constraining members integrally formed in the outer peripheral section of the moveable rubber film 148. Specifically, constraining projections 150 of block shape projecting upward are formed at four locations along the circumference of the outer peripheral section of the moveable rubber film 148 of circular disk shape.

The moveable rubber film 148 is arranged housed within a housing space 102 of the partition member 152. The partition member 152 includes a partition member main body 92 and a cover fitting 154. The cover fitting 154 has a thin, large-diameter, generally circular disk shape, with an upper communication window 104 formed in its diametrical center section, and an upper connecting passage 68 formed in its outer peripheral section. The diametrical center section of the cover fitting has been subjected to a pressing process etc. in order to jut it downward, thereby forming a support projection 156. The partition member main body 92 and the cover fitting 154 are juxtaposed against one another in the axial direction, with the housing space 102 being formed in the diametrical center section between the partition member main body 92 and the cover fitting 154.

Figure 19:
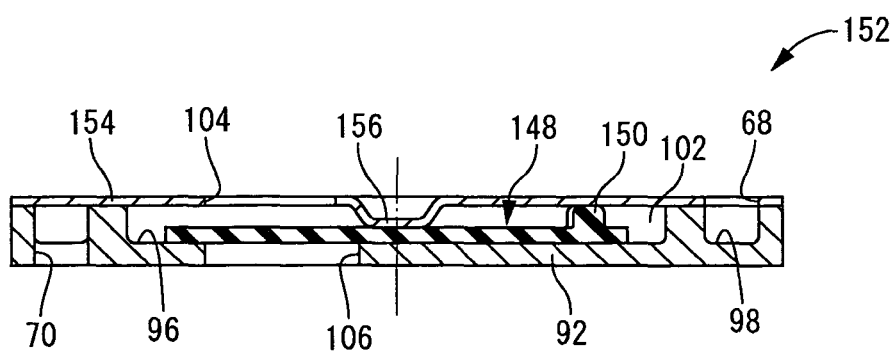
FIG. 19 is a cross sectional view showing the moveable rubber film of FIG. 18 accommodated within the partition member, taken along line 19-19 of FIG. 18.

Then, with the moveable rubber film 148 arranged in the housing space 102 as depicted in FIG. 19, the upper end faces of the constraining projections 150 will be positioned in contact against the upper wall face of the housing space 102, and the lower face of the outer peripheral section of the moveable rubber film 148 will be positioned in contact against the lower wall face of the housing space 102. Thus, sections where the constraining projections 150 have been formed in the outer peripheral section of the moveable rubber film 148 will be clasped between the partition member main body 92 and the cover fitting 154 so as to be constrained by the partition member 152. Thus, a constraining member for constraining the outer peripheral section of the moveable rubber film 148 can be realized through the structure depicted in FIGS. 18 and 19 as well. In the mode depicted in FIGS. 18 and 19, the center section of the moveable rubber film 148 is secured clasped between the partition member main body 92 and the support projection 156 which has been provided to the cover fitting 154.

Figure 20:
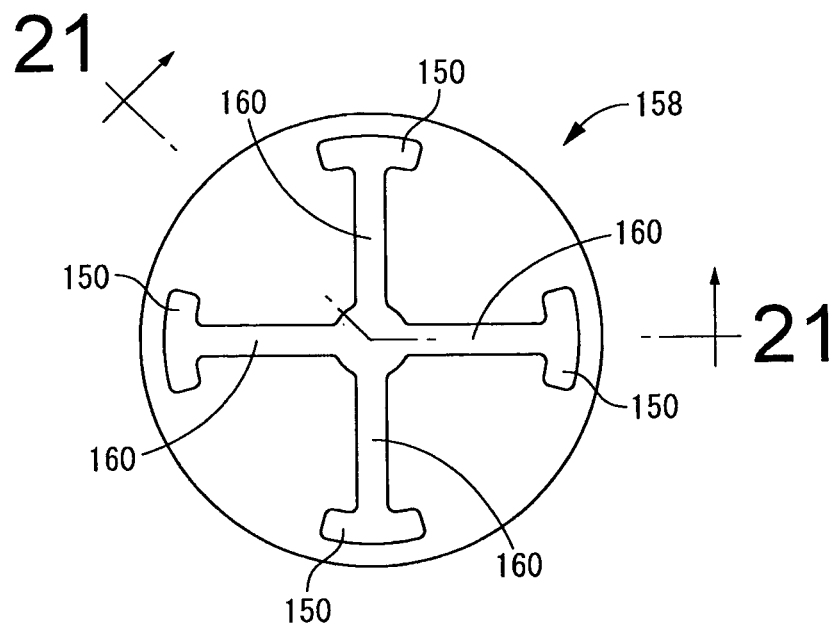
FIG. 20 is a top plane view of a moveable rubber film of another arrangement employed in the present invention.
Figure 21:
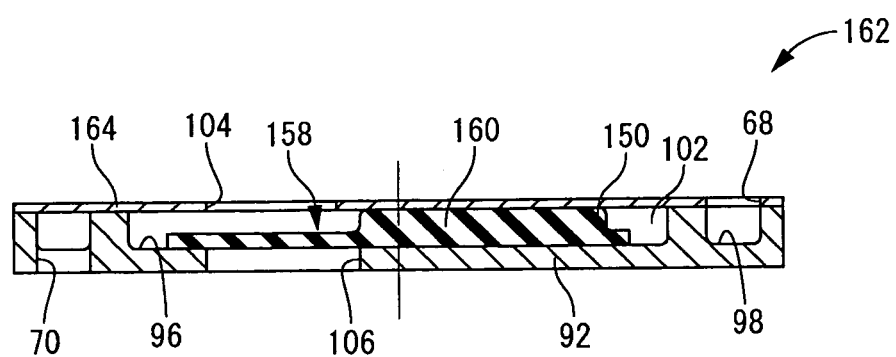
FIG. 21 is a cross sectional view showing the moveable rubber film of FIG. 20 accommodated within the partition member, taken along line 21-21 of FIG. 20.

There might also be employed a structure whereby constraining projections 150 that have been formed in the outer peripheral section of a moveable rubber film 158 are linked by spoke-shaped spring portions 160 that extend radially as depicted in FIGS. 20 and 21. In the moveable rubber film 158 according to this mode, the diametrical center section of the moveable rubber film 158 will jut up at substantially identical height to the constraining projections 150, and thus in the partition member 162 on which the moveable rubber film 158 has been arranged, the diametrical center section of the cover fitting 164 constituting part of the member will have a flat shape devoid of features (e.g. the support projection 156). Also, in this mode, the spoke-shaped spring portions 160 will be formed with substantially identical projecting height as the constraining projections 150, and all sections of the moveable rubber film 158 that are constituted by the spoke-shaped spring portions 160 will be constrained by the partition member 162.

Figure 22:
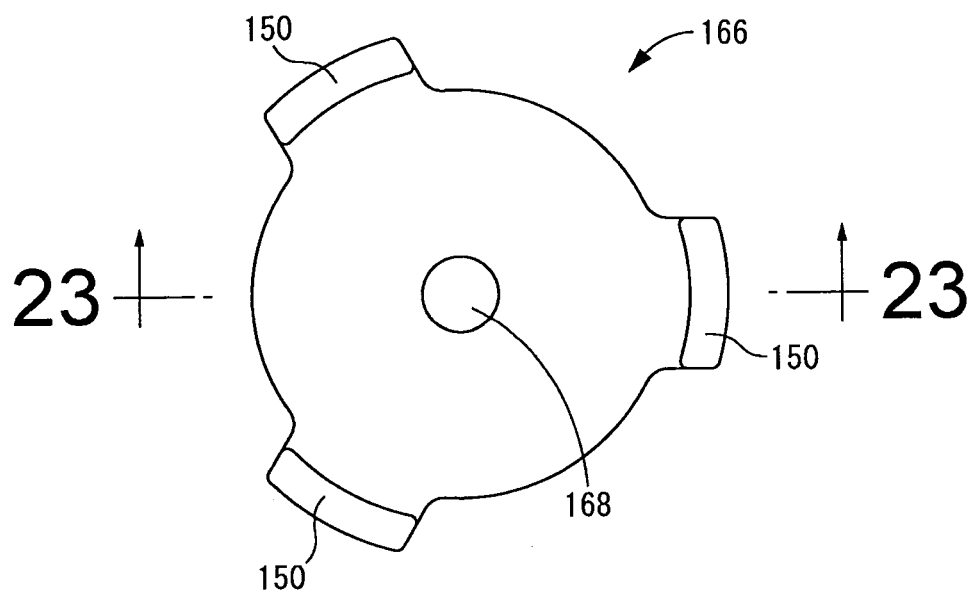
FIG. 22 is a top plane view of a moveable rubber film of another arrangement employed in the present invention.
Figure 23:
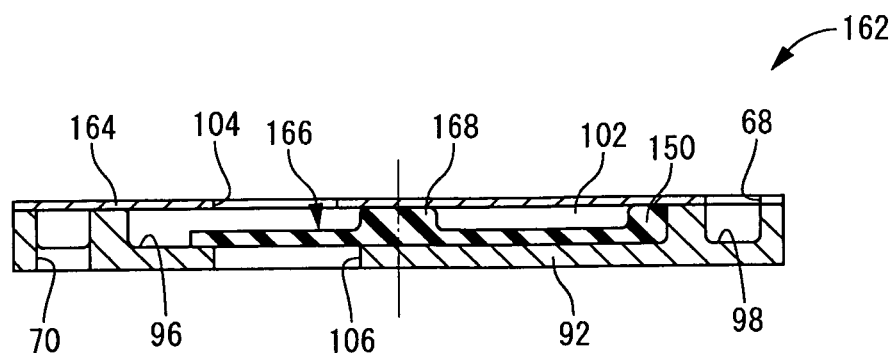
FIG. 23 is a cross sectional view showing the moveable rubber film of FIG. 22 accommodated within the partition member, taken along line 23-23 of FIG. 22.

There may also be employed a structure whereby a moveable rubber film 166 of generally round circular shape extends peripherally outward at several locations about its circumference, with constraining projections 150 being integrally formed with these extended sections as depicted in FIGS. 22 and 23. With such a structure, the outside peripheral edges of the moveable rubber film 166 situated between the constraining projections 150 in the circumferential direction will be located further inward from the constraining projections 150, and thus the moveable rubber film 166 will be able to more easily undergo elastic deformation in zones away from the sections where the constraining projections 150 are formed. In this mode, a center projection 168 of circular block shape is integrally formed in the diametrical center section of the moveable rubber film 166, and projects upwards.

Figure 24:
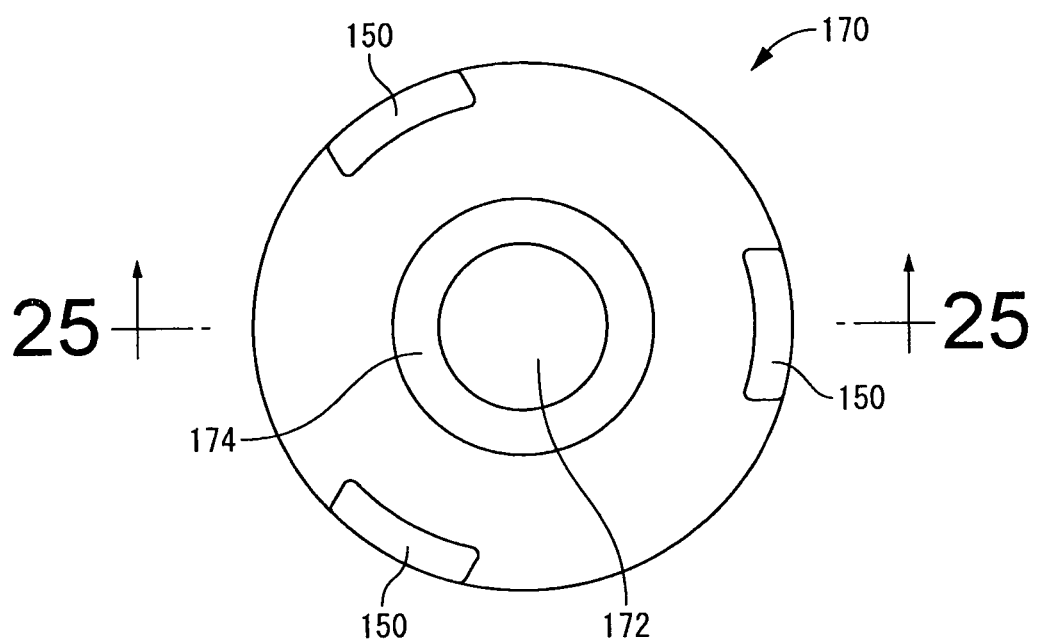
FIG. 24 is a top plane view of a moveable rubber film of another arrangement employed in the present invention.
Figure 25:
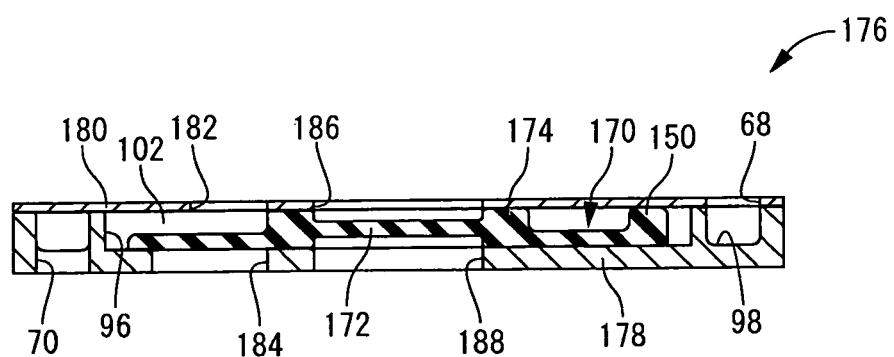
FIG. 25 is a cross sectional view showing the moveable rubber film of FIG. 24 accommodated within the partition member, taken along line 25-25 of FIG. 24.

A structure having a center film portion 172 in its center section, like the moveable rubber film 170 depicted in FIGS. 24 and 25, could also be employed as the obstructing rubber elastic plate for example. In more detail, in the moveable rubber film 170 having a plurality of constraining projections 150 spaced apart in the circumferential direction at its outside peripheral edge, a center tubular portion 174 of round tube shape projecting upward will be integrally formed in the diametrical center section of the film. Additionally, in the axial center section to the inner peripheral side of the center tubular portion 174 there will be formed a thin center film portion 172 that extends in the axial-perpendicular direction, with the center hole of the center tubular portion 174 being sealed off by the center film portion 172.

The moveable rubber film 170 having the above structure will be arranged housed within a housing space 102 of a partition member 176. The partition member 176 has a thick, large-diameter, generally circular disk shape, and includes a partition member main body 178 and a cover fitting 180. The partition member main body 178 and the cover fitting 180 have structures in accordance with those of the partition member main body 92 and the cover fitting 94 taught in the second embodiment. The diametrically medial section of the cover fitting 180 is perforated by an upper communication window 182 that extends for a prescribed length in circumferential direction, while a lower communication window 184 that extends for a prescribed length in circumferential direction and serves as a communication passage is formed in the diametrically medial section of the partition member main body 178. Also, the diametrical center section of the cover fitting 180 is perforated by an upper through-hole 186 of circular shape, while the diametrical center section of the partition member main body 178 is perforated by a lower through-hole 188 corresponding in shape to the upper through-hole 186.

The moveable rubber film 170 will then be arranged within the housing space 102 defined between the juxtaposed faces of the partition member main body 178 and the cover fitting 180. At this point, the center tubular portion 174 of the moveable rubber film 170 will be positioned diametrically between the communication windows 182, 184 and the through-holes 186, 188, and clasped between the partition member main body 178 and the cover fitting 180; while the constraining projections 150 will be positioned peripherally outward from the communication windows 182, 184, and clasped between the partition member main body 178 and the cover fitting 180. The diametrically medial section of the partition member main body 178 will thereby be secured to the partition member 176, and the outside peripheral edge will be partially constrained by the partition member 176.

Pressure of the pressure receiving chamber 64 will bear on the diametrically medial section of a first face of the moveable rubber film 170 through the upper communication window 182, while pressure of the equilibrium chamber 66 will bear on the other face through the lower communication window 184. Furthermore, the pressure of the pressure receiving chamber 64 will bear on one face of the center film portion 172 of the moveable rubber film 170 through the upper through-hole 186, while the pressure of the equilibrium chamber 66 will bear on the other face through the lower through-hole 188.

With the engine mount incorporating the moveable rubber film 170 of the above construction installed in an automobile, if jarring large impact load, such as may occur when driving over a bump, is input and causes excessive negative pressure to arise in the pressure receiving chamber 64, the moveable rubber film 170 will undergo elastic deformation in those zones in the outer peripheral section thereof that are situated away from the sections where the constraining projections 150 have been formed. Thus, the sealed fluid will be induced to flow through the open short-circuit passage 108 so as to prevent noise and vibration caused by cavitation.

Further, when high-frequency, small-amplitude vibration such as idling vibration or driving rumble is input, the center film portion 172 will experience miniscule deformation up and down in a state with its outside peripheral edge constrained. On the basis of liquid pressure-absorbing action produced through this miniscule deformation of the center film portion 172, vibration damping action through low dynamic spring action will be obtained.

Figure 26:
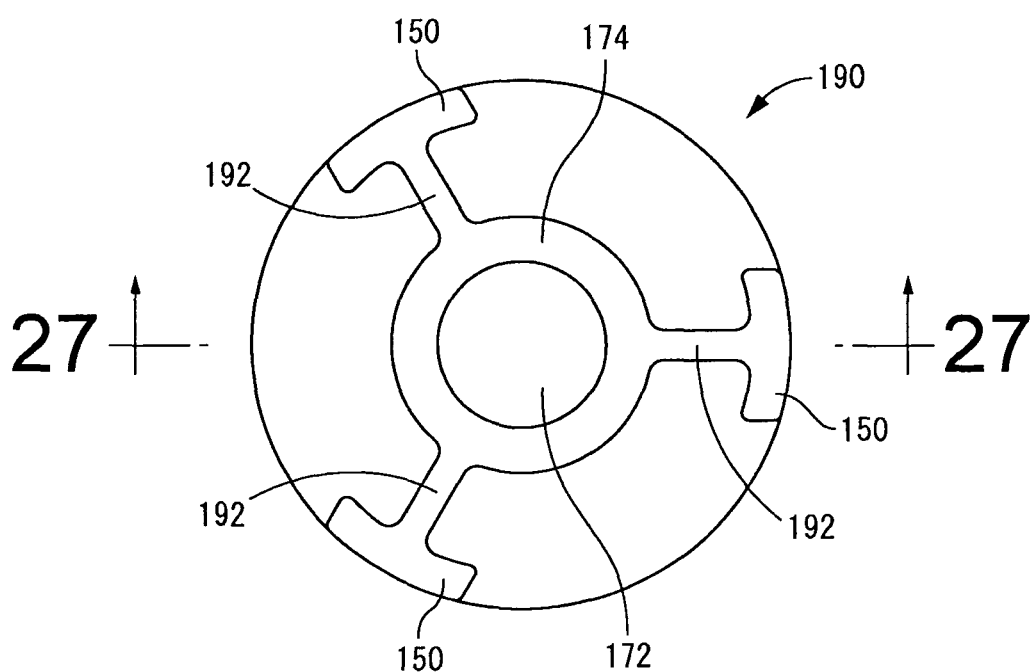
FIG. 26 is a top plane view of a moveable rubber film of another arrangement employed in the present invention.
Figure 27:
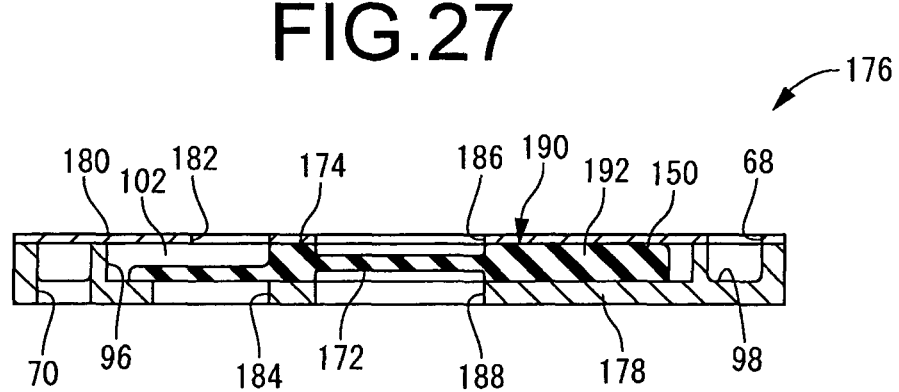
FIG. 27 is a cross sectional view showing the moveable rubber film of FIG. 26 accommodated within the partition member, taken along line 27-27 of FIG. 26.

A structure whereby the center tubular portion 174 and the constraining projections 150 are connected by spoke-shaped spring portions 192 that extend radially, as in the moveable rubber film 190 depicted in FIGS. 26 and 27, could also be employed. By so doing, the rigidity of the moveable rubber film 190 in the outer peripheral section of the moveable rubber film 190 can be adjusted.

In the preceding first embodiment, the diametrical center section of the moveable rubber film 74 was clasped between the lower wall face of the housing space 62 and the support projection 50 in order to fasten it to the partition member 38. However, where a structure in which the diametrical center section of the moveable rubber film 74 is fastened to the partition member 38 is employed, the fastening member is not limited in any particular way.

Figure 28:
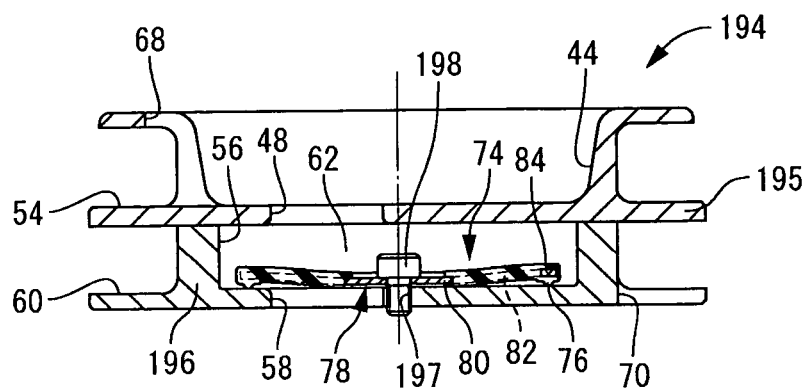
FIG. 28 is a partition member of another arrangement employed in the present invention.

Specifically, the diametrical center section of the obstructing rubber elastic plate may be screw-fastened to the partition member. As a specific example, a structure like that of the partition member 194 depicted in FIG. 28 could be employed. To describe in detail, the partition member 194 is composed of an upper partition fitting 195 and a lower partition fitting 196. The upper partition fitting 195 has a structure in accordance with the upper partition fitting 40 in the first embodiment, and its diametrical center section is a flat shape lacking the support projection 50. Meanwhile, the lower partition fitting 196 has a structure in accordance with the lower partition fitting 42 in the first embodiment, and is perforated in its diametrical center section by a bolt hole 197. The bolt hole 197 is a small-diameter circular hole that extends in the axial direction through the base wall of the housing space 62, and has a screw thread formed on its inside peripheral face.

The moveable rubber film 74 is then arranged within the housing space 62 of the partition member 194. At this point, a fastening bolt 198 will be passed through an insertion hole 86 that has been formed in the plate spring 78 of the moveable rubber film 74, and the fastening bolt 198 will be screwed into the bolt hole 197 that was formed in the lower partition fitting 196. The diametrical center section of the moveable rubber film 74 will thereby be fastened to the lower partition fitting 196.

Figure 29:
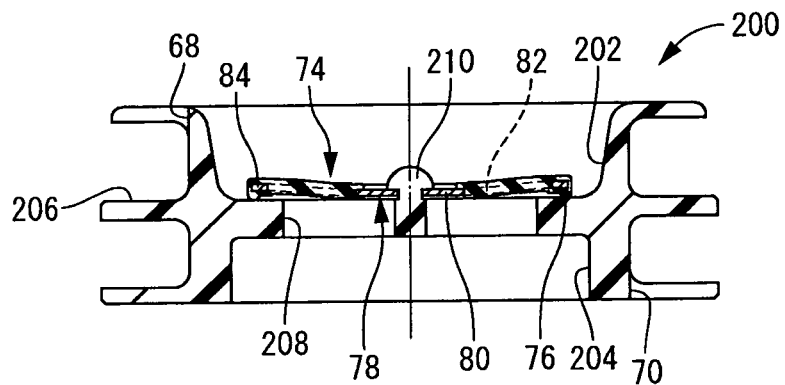
FIG. 29 is a partition member of another arrangement employed in the present invention.

In another example, in a partition member made of hard synthetic resin, the center section of the obstructing rubber elastic plate can be fastened by welding it to the partition member. In more detail, as depicted in FIG. 29, such a partition member 200 will have a thick, generally disk shape overall, in whose diametrical center section there is formed a housing space 202 that opens onto the upper face, and a circular recess 204 that opens onto the lower face. Additionally, at the outside peripheral edge of the partition member 200 there is formed a spiral circumferential groove 206 that opens onto the outside peripheral face and that extends for a length short of twice around the circumference. The partition member 200 will then be attached to the inner peripheral side of the second mounting member 14 in the same way as in the first embodiment, so that the housing space 202 partially defines the pressure receiving chamber 64 and the circular recess 204 partially defines the equilibrium chamber 66, while the orifice passage 72 is formed by the circumferential groove 206.

Furthermore, communication passages 208 pass in the axial direction through the center section of the partition member 200. Viewed in the axial direction, the communication passages 208 have a generally fan-shaped contour with a center angle of approximately 120°. Three such communication passages 208 are spaced apart at equidistant intervals on the circumference. With the partition member 200 assembled together with the second mounting member 14, the pressure receiving chamber 64 and the equilibrium chamber 66 defined to either side of the partition member 200 will communicate with each other through the communication passages 208.

A welding projection 210 is integrally formed in the diametrical center of the housing space 202 in the partition member 200. The welding projection 210 has a small-diameter rod shape, and projects upward from the base wall of the housing space 202.

The moveable rubber film 74 will then be arranged in the housing space 202. Specifically, the welding projection 210 will be passed through the insertion hole 86 of the plate spring 78 that makes up part of the moveable rubber film 74. The distal end section of the welding projection 210 will then be melted with ultrasound, heat etc. and worked to give it larger diameter, as well as affixing it to the center section of the plate spring 78 that lies exposed to the outside. The moveable rubber film 74 is thereby arranged within the housing space 202, with its center section fastened to the partition member 200. Thus, in this way it is possible to fasten the center section of the obstructing rubber elastic plate to the partition member.

Figure 30:
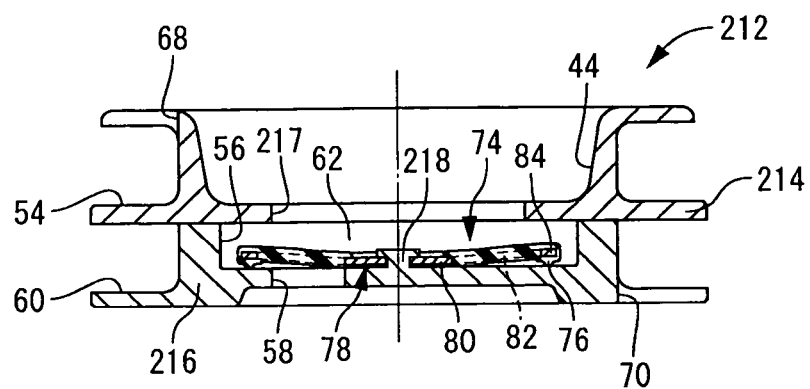
FIG. 30 is a partition member of another arrangement employed in the present invention.

In yet another example, the partition member can be provided with a mating portion that mates with the obstructing rubber elastic plate, and the center section of the obstructing rubber elastic plate fastened to the partition member through the mating action of the mating portion. As a specific example, a structure like that of the partition member 212 depicted in FIG. 30 could be employed. Specifically, this partition member 212 includes an upper partition fitting 214 and a lower partition fitting 216. The upper partition fitting 214 has a structure in accordance with the upper partition fitting 40 taught in the first embodiment, and in its diametrical center section there is formed an upper communication window 217 of circular shape that passes through the base wall of the center recess 44.

Meanwhile, the lower partition fitting 216 has a structure in accordance with the lower partition fitting 42 taught in the first embodiment, and in its diametrical center section there is integrally formed a clinching projection 218 as a mating portion that projects towards the inside of the housing space 62. This clinching projection 218 has a small-diameter rod shape corresponding in shape to an insertion hole 86 which has been formed in the plate spring 78.

During installation of the moveable rubber film 74 in the housing space 62, the clinching projection 218 will be passed through the insertion hole 86 which has been formed in the plate spring 78. The clinching projection 218 will then be subjected to outside force in the axial direction so as to deform the distal end section of the clinching projection 218 that projects up through the plate spring 78 and make it larger in diameter than the inside diameter of the insertion hole 86. By so doing, the center section of the plate spring 78 lying exposed to the outside will be retained by the clinching projection 218, thereby fastening the center section of the moveable rubber film 74 to the partition member 212. In the above manner, the diametrical center section of the moveable rubber film 74 may be fastened to the partition member 212 by clinching.

Figure 31:
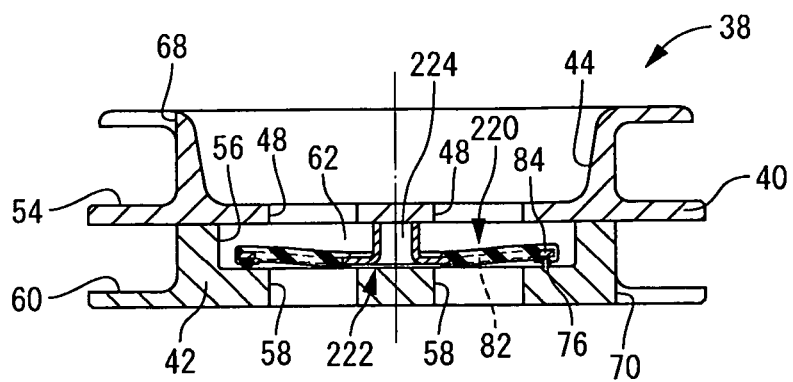
FIG. 31 is a partition member of another arrangement employed in the present invention.

Fastening member could also be provided on the obstructing rubber elastic plate side. As a specific example, it would be possible to employ a structure like that of the moveable rubber film 220 depicted in FIG. 31. Specifically, in the moveable rubber film 220 there is integrally formed a clasp-retained portion 224 of generally round tubular shape extending in the axial direction in the center section of a plate spring 222. The upper end face of the clasp-retained portion 224 is pressed against the upper wall face of the housing space 62, while the center lower end face of the moveable rubber film 220 is pressed against the lower wall face of the housing space 62, thereby fastening the center section of the moveable rubber film 220 with respect to the partition member 38.

Figure 32:
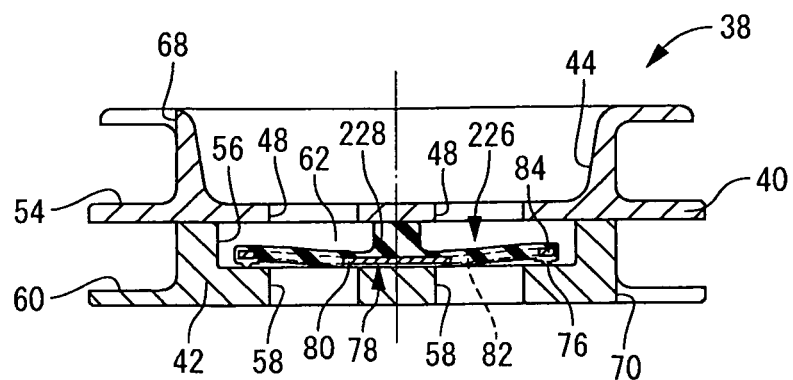
FIG. 32 is a partition member of another arrangement employed in the present invention.

Furthermore, the fastening member provided on the obstructing rubber elastic plate side could be formed by a rubber elastic body, for example. Specifically, in an obstructing rubber elastic plate constituted by a moveable rubber film 226 as depicted in FIG. 32, a clasped rubber elastic body 228 of circular block shape that projects upward and that is anchored to the upper face of the central constraining portion 80 of the plate spring 78 will be integrally formed with the rubber elastic body that constitutes the moveable rubber film 226. The upper end face of the clasped rubber elastic body 228 is pressed against the upper wall face of the housing space 62, while the center lower end face of the moveable rubber film 226 is pressed against the lower wall face of the housing space 62, thereby fastening the center section of the moveable rubber film 226 with respect to the partition member 38. In this embodiment, the diametrical center section of the moveable rubber film 226 is clasped somewhat elastically with respect to the partition member 38.

Figure 33:
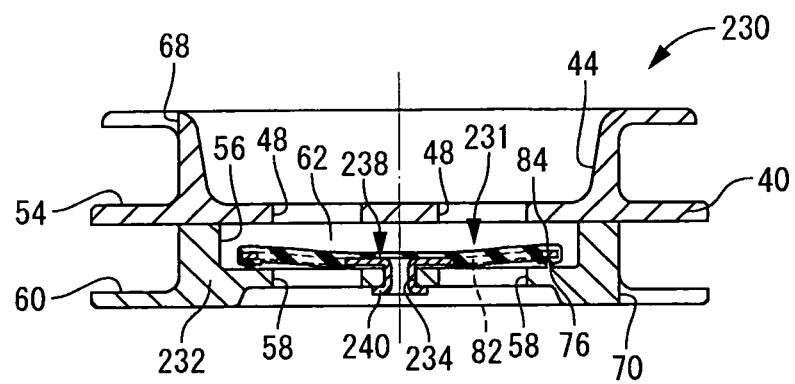
FIG. 33 is a partition member of another arrangement employed in the present invention.

It would also be possible to provide a mating portion to the center section of the obstructing rubber elastic plate, and to then fasten the center portion of the obstructing rubber elastic plate to the partition member through engagement of this mating portion with the partition member. As a specific example, a partition member 230 and a moveable rubber film 231 of structure like those depicted in FIG. 33 could be employed. Specifically, in the partition member 230 there has been made a mating hole 234 that perforates the diametrical center section of a lower partition fitting 232 which is part of the partition member 230. In the moveable rubber film 231, there has been integrally formed a clinching tube portion 240 that projects downward from the diametrical center section of the plate spring 238.

After passing the clinching tube portion 240 through the mating hole 234 that perforates the center portion of the lower partition fitting 232, the distal end of the clinching tube portion 240 will be subjected to external force to induce expansive deformation. The center section of the lower partition fitting 232 will thereby be clamped between the distal end of the clinching tube portion 240 and the center section of the plate spring 238, thus fastening the diametrical center section of the moveable rubber film 231 to the partition member 230.

Figure 34:
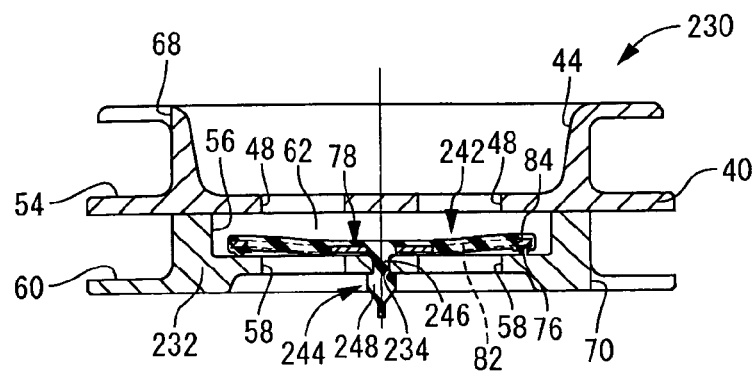
FIG. 34 is a partition member of another arrangement employed in the present invention.

Alternatively, as depicted in FIG. 34, fastening of the moveable rubber film 242 at its center section to the partition member 230 could be accomplished through a design whereby a detent rubber 244 that has been integrally formed with the diametrical center section of the moveable rubber film 242 is passed through and detained in a mating hole 234 that has been formed in the center of the lower partition fitting 232.

In more detail, the detent rubber 244 is of generally rod shape projecting downward from the diametrical center section of the moveable rubber film 242. It has a structure that includes a basal end portion 246 approximately equal in outside diameter to the mating hole 234, and a detent portion 248 integrally formed below the basal end portion 246 and larger in diameter than it. The detent portion 248 gradually decreases in diameter towards its distal end (downward in FIG. 34).

The detent rubber 244 is inserted into the mating hole 234 so that its basal end portion 246 passes through the mating hole 234, and the detent portion 248 projects out to the lower side of the partition member 230 through the mating hole 234. Thereby, the shoulder which has been formed between the basal end portion 246 and the detent portion 248 of the detent rubber 244 will be detained by the partition member 230, thereby fastening the moveable rubber film 242 at its center section to the partition member 230.

Figure 35:
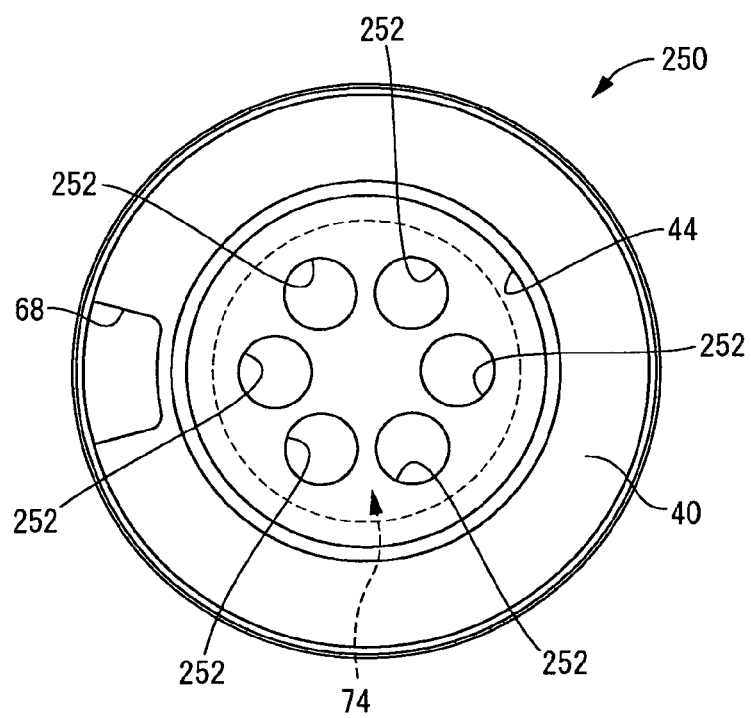
FIG. 35 is a partition member of another arrangement employed in the present invention.

Moreover, the shape of the communication passages (the lower communication windows 58) taught in the first and second embodiments is merely exemplary, and the size, shape etc. of the upper communication windows 48 and the lower communication windows 58 may be set appropriately according to the desired vibration damping characteristics and so on. As a specific example, the sections of the partition member 250 that constitute the upper wall and the lower wall of the housing space 62 could be perforated by a plurality of communication windows 252 having circular cross section, as depicted in FIG. 35.

Furthermore, besides communication windows 48, 58 of generally semicircular cross section split along an axis in the diametrical direction as taught in the first and second embodiments, there could also be employed communication windows of generally fan-shaped cross section with a center angle of 90° split along two mutually perpendicular diametrical axes; communication windows of generally fan-shaped cross section with a center angle of 120° positioned on the circumference; a set of communication windows extending in the circumferential direction and positioned in opposition along a diametrical axis, or the like.

The reinforcing member provided to the obstructing rubber elastic plate can also be realized through a member that is a rigid body, having generally identical shape and size to the plate spring 78 taught in the first embodiment. In a obstructing rubber elastic plate having a reinforcing member that is a rigid body substantially incapable of deformation, the outer peripheral section of the obstructing rubber elastic plate will be retained in a more stable state of contact against the partition member 38. Consequently, at times of input of ordinary vibration, there will be effectively attained vibration damping effect based on fluid flow through the orifice passage 72.

Moreover, by giving the reinforcing member radial spoke-shaped spring portions 82, the sections that experience deformation due to negative pressure of the pressure receiving chamber 64 will be limited to those sections composed of the rubber elastic body only, which have progressively smaller free length in the circumferential direction moving towards the inner peripheral side. Consequently, it will be possible to adjust the aperture area of the short-circuit passage 73 with high accuracy depending on the magnitude of negative pressure acting on the obstructing rubber elastic plate so as to achieve effective cavitation-dispelling action and obtain the desired vibration damping characteristics based on fluid flow through the orifice passage 72; as well as to exhibit vibration damping effect effectively against a vibration of a wider frequency range, through automatic adjustments of the tuning of the orifice passage 72.

Where the reinforcing member is a rigid body, the reinforcing member may differ in shape and size from the plate spring 78 that was taught in the first embodiment, and the member may be designed appropriately depending on the desired vibration damping capabilities, effect of dispelling cavitation noise, and so on.

In the first embodiment depicted in FIGS. 1 to 6, the plate spring 78 was fastened at its center section to the partition member 38, and uniform elastic deformation of each of the spoke-shaped spring portions 82 was allowed. However, the mode of fastening of the plate spring 78 to the partition member 38, inclusive of the fastening location and the fastening structure, is not limited thereby. For example, the plate spring 78 could be fastened to the partition member 38 at two points on a pair of rim portion 84, 84 that are situated in opposition in the diametrical direction on the plate spring 78; or the plate spring could be provided with four spoke-shaped spring portions formed at equal intervals in the circumferential direction, and pairs of these spoke-shaped spring portions situated in opposition in the diametrical direction fastened respectively at their diametrical distal end sections to the partition member. By fastening the plate spring to the partition member at one or several locations on the partition member in this way, in a state such the plate spring is permitted to elastically deform, it will be possible for elastic deformation of the moveable rubber film 74 to take place with two different spring characteristics, i.e. characteristics in a low-pressure action state based on elastic deformation of the rubber only, and characteristics in a high-pressure action state with concomitant elastic deformation of the plate spring, and to thereby effective achieve working effects comparable to those of the plate spring 78 fastened at its center section of the partition member 38 as taught in the first embodiment.

The present invention is not limited to engine mounts only, and is adaptable to implementation in various kinds of fluid filled type vibration damping devices such as suspension mounts or body mounts.

Nor it is the present invention necessarily limited to fluid filled type vibration damping devices for automotive use, and may be implemented advantageously in fluid filled type vibration damping devices for train cars, or in switchable fluid filled type vibration damping devices for any of various other applications.

Figure 36:
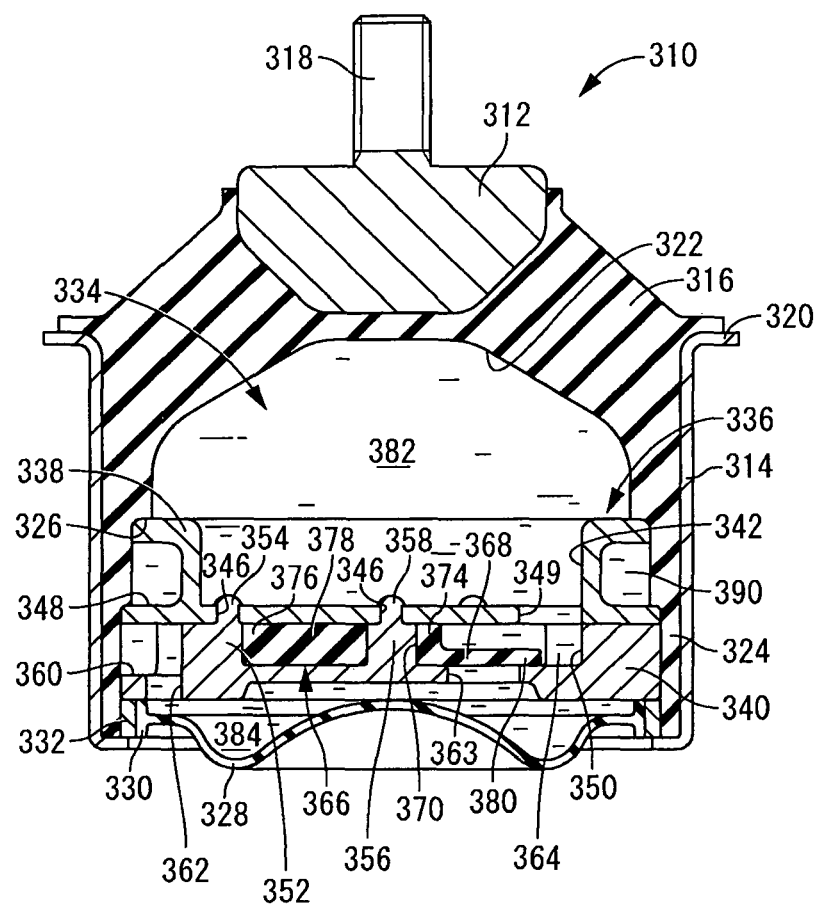
FIG. 36 is an engine mount of construction according to a third embodiment of the present invention, taken along line 36-36 of FIG. 37.

Referring first to FIG. 36, there is depicted an automotive engine mount 310 as a third embodiment of the fluid filled type vibration damping device according to the present invention. This engine mount 310 has a construction in which a first mounting member 312 of metal and a second mounting member 314 of metal are connected to one another by a main rubber elastic body 316. The first mounting member 312 is then mounted onto the power unit of the automobile, not shown, which is one of the components making up a vibration transmission system, while the second mounting member 314 is mounted onto the body of the automobile, not shown, which is the other component making up the vibration transmission system, thereby providing vibration damped linkage of the power unit and the car body via the engine mount 310. In the description hereinbelow, the vertical direction refers to the axial direction of the engine mount 310, and also to the vertical direction in FIG. 36, which is coincident with the direction of primary vibration input. In FIG. 36, the engine mount 310 is depicted prior to installation in a vehicle; through installation in a vehicle, the distributed support load of the power unit will be exerted in the axial direction of the engine mount 310.

To describe in greater detail, the first mounting member 312 is a rigid member formed from iron, aluminum alloy or the like, and has a round block shape. An upwardly projecting mounting bolt 318 is integrally formed at the upper end of the first mounting member 312. The first mounting member 312 is attached to the power unit (not shown) by screw fastening the mounting bolt 318 to the power unit.

The second mounting member 314 is a high-rigidity component made of material similar to the first mounting member 312, and has a thin, large-diameter, generally round tube shape. An annular flanged portion 320, which extends in an axis-perpendicular direction, is integrally formed at the upper end of the second mounting member 314. The second mounting member 314 will be mounted onto the vehicle body side through the agency of a bracket fitting (not shown) or the like fastened about the outside.

The first mounting member 312 and the second mounting member 314 are arranged spaced apart on the same center axis, with the first mounting member 312 situated above the second mounting member 314, and with the fittings linked together by the main rubber elastic body 316.

The first mounting member 312 is then inserted from above and vulcanization bonded to the small-diameter end of the main rubber elastic body 316, while the inside peripheral face of the second mounting member 314 is vulcanization bonded to the outside peripheral face of the large-diameter end of the main rubber elastic body 316, so that the first mounting member 312 and the second mounting member 314 are elastically linked to one another by the main rubber elastic body 316. The main rubber elastic body 316 according to this embodiment is formed as an integrally vulcanization molded component that incorporates the first mounting member 312 and the second mounting member 314.

A seal rubber layer 324 is integrally formed with the main rubber elastic body 316. The seal rubber layer 324 is a rubber elastic body of thin-walled, large diameter, generally round tubular shape extending downward from the lower end of the main rubber elastic body 316, and is anchored to the inside peripheral face of the second mounting member 314. The seal rubber layer 324 has larger inside diameter than the opening of the large-diameter recess 322, and an annular shoulder portion 326 is formed in the boundary section between the main rubber elastic body 316 and the seal rubber layer 324. The seal rubber layer 324 in this embodiment is thinner to the lower side of its axially medial section than to the upper side, with a shoulder formed in the axially medial section of the inside peripheral face of the seal rubber layer 324. The inside peripheral face of the second mounting member 314 is sheathed over substantially its entire axial length by the main rubber elastic body 316 and the seal rubber layer 324.

A diaphragm 328 provided as the flexible film is disposed at the lower end of the second mounting member 314. The diaphragm 328 is a rubber film of thin, generally round disk shape or circular dome shape having ample slack in the axial direction. A fastener portion 330 of annular shape is integrally formed at the outside peripheral edge of the diaphragm 328.

A fastener fitting 332 is juxtaposed against and anchored to the outside peripheral face of the fastener portion 330. The fastener fitting 332 is a fitting of generally round annular shape, and is a rigid body formed of material similar to the first and second mounting members 312, 314. The fastener portion 330 which has been integrally formed with the diaphragm 328 is juxtaposed against and vulcanization bonded to the inside peripheral face of the fastener fitting 332. The diaphragm 328 in this embodiment is formed as an integrally vulcanization molded component that integrally incorporates the fastener fitting 332.

This diaphragm 328 is attached to the second mounting member 314. Specifically, the fastener fitting 332 which has been anchored to the diaphragm 328 is juxtaposed, via the intervening seal rubber layer 324, against the lower end of the second mounting member 314. The second mounting member 314 is then subjected to a diameter reduction process such as 360-degree radial compression to fasten the fastener fitting 332 in a state of intimate contact against the second mounting member 314. In this embodiment, the lower end of the second mounting member 314 is bent peripherally inward to place it in abutment against the lower end face of the fastener fitting 332, thus preventing the fastener fitting 332 from becoming dislodged in the axial direction.

By thusly attaching the diaphragm 328 to the second mounting member 314 a fluid chamber 334 that is isolated from the outside and that is filled with a non-compressible fluid will be defined between the opposed faces of the main rubber elastic body 316 and the diaphragm 328 to the inside peripheral side of the second mounting member 314. While no particular limitation is imposed on the non-compressible fluid filling the fluid chamber 334, it would be favorable to use water, an alkylene glycol, a polyalkylene glycol, a silicone oil, a some mixture of these for example. In order to effectively achieve vibration damping effect based on flow action of the fluid (discussed later) a low-viscosity fluid having viscosity of 0.1 Pa·s or lower is preferred.

Figure 37:
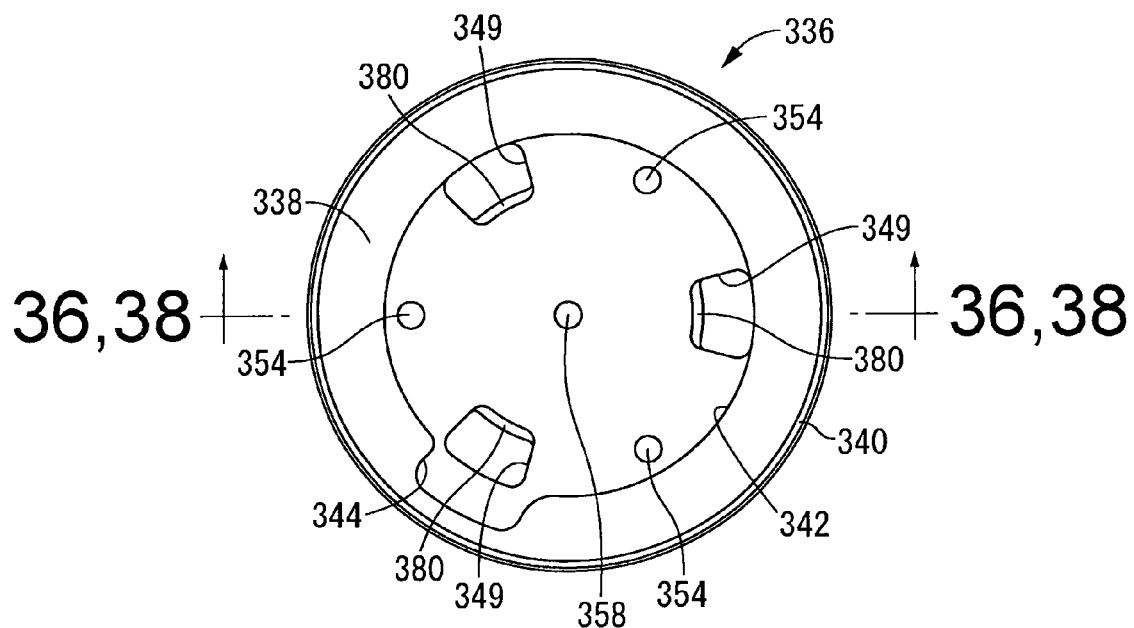
FIG. 37 is a top plane view of a partition member of the engine mount of FIG. 36.
Figure 38:
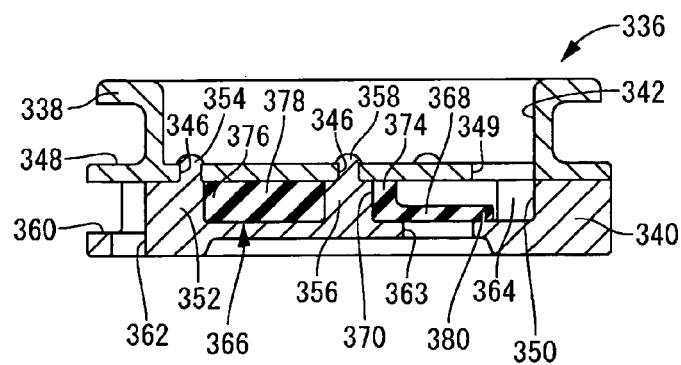
FIG. 38 is a cross sectional view taken along line 38-38 of FIG. 37.

Additionally, as depicted in FIG. 36, a partition member 336 is disposed housed within the fluid chamber 334. As depicted in FIGS. 37 and 38, the partition member 336 in this embodiment has a thick, generally round disk shape overall, and includes an upper partition member 338 and a lower partition member 340.

The upper partition member 338 is made of metal such as aluminum alloy or of hard resin material, and has a generally round disk shape overall. A center recess 342 is formed in the diametric center section of the upper partition member 338. This center recess 342 is a recess of circular shape that opens upward, and at one location on its circumference has enlarged diameter due to a communication portion 344 that extends diametrically outward. A plurality of lock holes 346 are formed perforating the base wall of the center recess 342. The lock holes 346 are circular holes of small diameter formed at the diametric center and at several locations in the outside peripheral section of the center recess 342. The lock holes 346 are formed at locations corresponding to outside peripheral locking projections 354 and a center locking projection 358, discussed later.

An upper circumferential groove 348 is formed in the upper partition member 338 in the section thereof situated to the outside peripheral side of the center recess 342. The upper circumferential groove 348 is a slot that opens onto the outside peripheral face of the upper partition member 338, and that extends for a prescribed length short of full circle in the circumferential direction. A first circumferential end of the upper circumferential groove 348 communicates with the center recess 342 through the communication portion 344.

Upper communication windows 349 that provide the open windows are formed in the base wall of the center recess 342 of the upper partition member 338. The upper communication windows 349 are formed in the base wall of the center recess 342 at its outside peripheral edge in the diametrical direction, and pass in the axial direction through the base wall. The upper communication windows 349 are formed such that, with a moveable rubber film 366 (discussed later) attached to the partition member 336, the windows will extend to the outside peripheral side beyond the outside peripheral edge of the moveable rubber film 366. In this embodiment, as depicted in FIG. 37, three upper communication windows 349 are formed prescribed distances apart in the circumferential direction. The upper communication windows 349 are formed at locations away from the lock holes 346.

Figure 39:
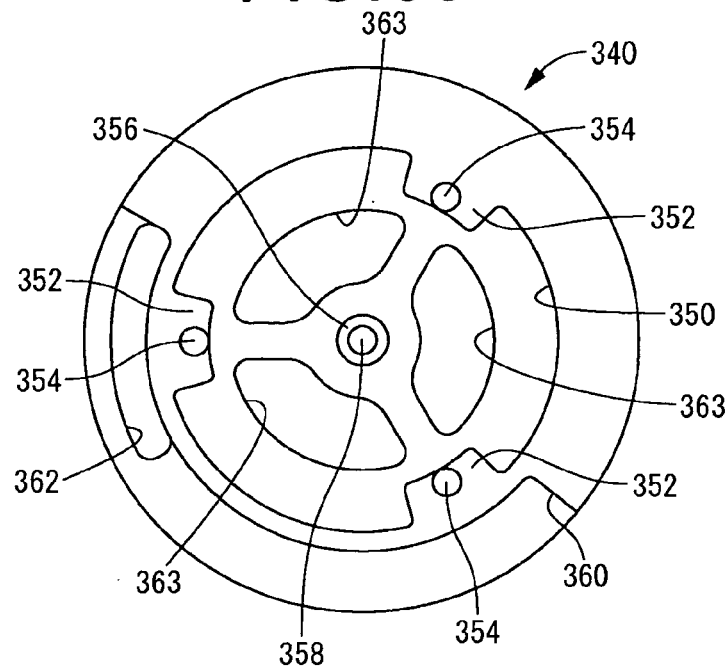
FIG. 39 is a top plane view of a lower partition member of the partition member of FIG. 37.

Meanwhile, the lower partition member 340, like the upper partition member 338, is made of metal such as aluminum alloy or of hard resin material, and has a thick, generally round disk shape overall. As depicted in FIGS. 38 and 39, a housing recess 350 is formed in the diametric center section of the lower partition member 340. This housing recess 350 is a recess of circular shape overall, and is formed so as to open upward.

As depicted in FIG. 39, the peripheral wall of the housing recess 350 juts peripherally inward in localized zones at several locations on the circumference, with these jutting sections defining a plurality of outside peripheral grip projections 352. The outside peripheral grip projections 352 are integrally formed with the peripheral wall and the base wall of the housing recess 350 of the lower partition member 340, and jut diametrically inward from several locations along the circumference. Thus, housing recess 350 will have localized zones of small diameter at those locations where the outside peripheral grip projections 352 have been formed along the circumference. The edge faces of the outside peripheral grip projections 352 that lie towards the inside peripheral side will be defined by curving faces that correspond to the outside peripheral face of the moveable rubber film 366 (discussed later). These inside peripheral faces of the plurality of outside peripheral grip projections 352 will be positioned along the same given circumference. In this embodiment, three outside peripheral grip projections 352 are formed at equidistant intervals on the circumference.

The outside peripheral locking projections 354 are formed on the outside peripheral grip projections 352 so as to project upward therefrom. The outside peripheral locking projections 354 are composed of a small-diameter insertion shaft of round post shape, and a locking portion integrally formed at the upper end of the insertion shaft and having generally semispherical shape of larger diameter than the diameter of the insertion shaft. The outside peripheral locking projections 354 are respectively formed in the circumferential center section of the outside peripheral grip projections 352.

In this embodiment, a center support projection 356 is formed in the diametric center section of the housing recess 350. The center support projection 356 is of generally round post shape and juts up from the base wall of the housing recess 350. In this embodiment, it is integrally formed with the base wall of the housing recess 350. The center locking projection 358 is integrally formed on the center support projection 356. The center locking projection 358 is generally identical in construction to the outside peripheral locking projections 354, and juts upward from the diametric center section of the center support projection 356.

A lower notched portion 360 is formed at the outside peripheral edge of the lower partition member 340. This lower notched portion 360 opens onto the outside peripheral face and the upper face of the lower partition member 340, and extends for a prescribed length about equal to halfway around the circumference. Additionally, a lower communication hole 362 that passes through the base wall of the lower notched portion 360 is formed at a first circumferential end of the lower notched portion 360.

Figure 40:
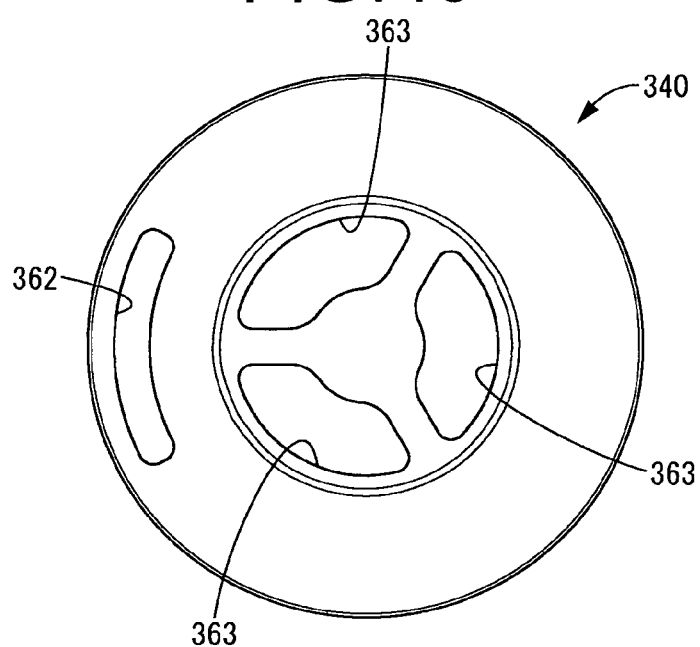
FIG. 40 is a bottom plane view of the lower partition member of FIG. 39.

As depicted in FIGS. 38 to 40, lower communication windows 363 are provided as communication openings in the base wall of the housing recess 350 of the lower partition member 340. The lower communication windows 363 extend for a prescribed length in the circumferential direction. In this embodiment, three independent lower communication windows 363 are spaced apart from one another by prescribed distances in the circumferential direction.

The upper partition member 338 and the lower partition member 340 having the construction described above are juxtaposed top to bottom along the same center axis. The outside peripheral locking projections 354 and the center locking projection 358 that were formed on the lower partition member 340 will be respectively slipped through the lock holes 346 that were formed in the upper partition member 338, and locked to the base wall of the center recess 342. By so doing, the upper and lower partition members 338, 340 will be fastened together to define the partition member 336 of this embodiment. The upper partition member 338 and the lower partition member 340 will be positioned in the circumferential direction with respect to one another, and the ends of the upper circumferential groove 348 and the ends of the lower notched portion 360 will be positioned so as to overlap in axial projection view.

Also, with the upper partition member 338 and the lower partition member 340 assembled juxtaposed together, the upper face opening of the lower notched portion 360 that was formed in the lower partition member 340 will be covered by the outside peripheral edge part of the upper partition member 338, giving the lower notched portion 360 a grooved contour that opens towards the outside peripheral side. Additionally, at mutually aligned first circumferential ends of the upper circumferential groove 348 and of lower notched portion 360, a connecting passage is formed in the lower face of the upper circumferential groove 348. The upper circumferential groove 348 and the lower notched portion 360 are thereby connected in series to form a circumferential groove of helical shape that extends for a prescribed length equivalent to between about once and once-and-a-half the distance around the circumference.

Furthermore, by assembling together the upper partition member 338 and the lower partition member 340, the opening of the housing recess 350 that was formed in the center section of the lower partition member 340 will be covered by the base wall part of the center recess 342 that was formed in the upper partition member 338, thus defining a housing space 364 that serves as a housing zone between the upper partition member 338 and the lower partition member 340.

Figure 41:
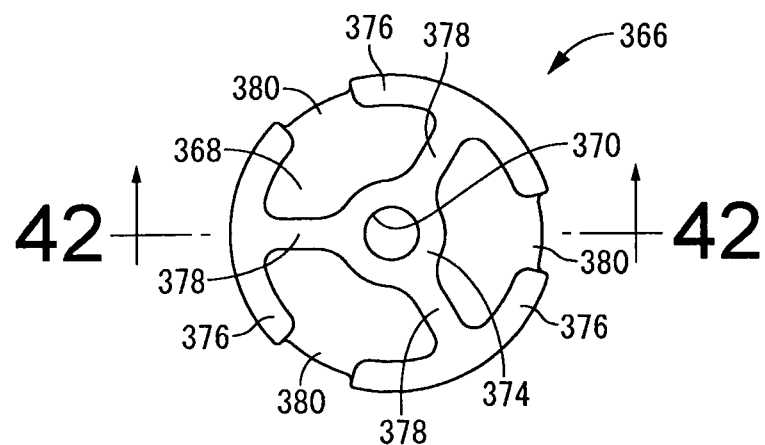
FIG. 41 is a top plane view of a moveable rubber film to be accommodated within the partition member of FIG. 37.
Figure 42:
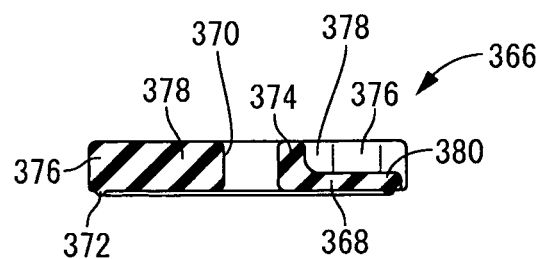
FIG. 42 is a cross sectional view taken along line 42-42 of FIG. 41.

A moveable rubber film 366 provided as the obstructing rubber elastic plate is arranged in the housing space 364 that was formed in the center section of the partition member 336. The moveable rubber film 366 has a generally circular planar shape overall, and in this embodiment is made of a rubber elastic body only. As depicted in FIGS. 41 and 42, the moveable rubber film 366 has a rubber film portion 368 of thin, generally circular disk shape. A mounting hole 370 passes through the diametric center section of the rubber film portion 368, and a contact projection 372 is integrally formed so as to project downward at its outside peripheral section.

As elastic retaining portion 374 provided as the center retaining portion is integrally formed in the diametric center section of the rubber film portion 368. The elastic retaining portion 374 has a small-diameter, generally round tube shape, and projects upward at the peripheral edge of the mounting hole 370 that was formed in the center section of the moveable rubber film 366. By forming the elastic retaining portion 374, the diametric center section of the rubber film portion 368 will constitute a localized zone of increased thickness.

Retaining rim portions 376 provided as thick retaining portions are integrally formed on the outside peripheral edge of the rubber film portion 368. The retaining rim portions 376 are shaped so as to jut out upward from the outside peripheral edge of the moveable rubber film 366, and extend for prescribed length in the circumferential direction. Three retaining rim portions 376 spaced apart from one another in the circumferential direction are formed on the outside peripheral edge of the rubber film portion 368. By forming these retaining rim portions 376, the outside peripheral edge of the moveable rubber film 366 will be provided with localized zones of increased thickness at multiple locations on its circumference where the retaining rim portions 376 have been formed. Furthermore, the outside peripheral section of the retaining rim portions 376 juts diametrically outward beyond the outside peripheral edge of the rubber film portion 368, so that the moveable rubber film 366 will be provided with localized zones of increased diameter in sections where the retaining rim portions 376 have been formed.

Furthermore, as reinforcing ribs, retaining spoke portions 378 are formed diametrically between the elastic retaining portion 374 and the retaining rim portions 376. The retaining spoke portions 378 are narrower in width than the circumferential length of the retaining rim portions 376, and are defined by rubber elastic elements extending in straight lines in the diametrical direction. The rubber film portion 368, the elastic retaining portion 374, and the retaining rim portions 376 are integrally formed. The retaining spoke portions 378 are formed so as to connect the elastic retaining portion 374 with the retaining rim portions 376 in their circumferential center sections in the diametrical direction. The diametric medial section of the moveable rubber film 366 in the sections thereof where the retaining rim portions 376 are formed will have thickness equal to that of the elastic retaining portion 374 and the retaining rim portions 376. The thin section of the diametric medial section of the moveable rubber film 366 (i.e. diametric medial section of the rubber film portion 368) is split into multiple parts in the circumferential direction by the retaining spoke portions 378.

Further, as elastic deformation zones, elastic valve portions 380 are formed circumferentially between the retaining rim portions 376 at the outside peripheral edge of the moveable rubber film 366. The elastic valve portions 380 are defined by the outside peripheral edge of the rubber film portion 368 and are thinner than the sections where the retaining rim portions 376 are formed. In this embodiment, the circumferential edge sections of the elastic valve portions 380 have arcuate shape sloping gradually outward in the diametrical direction, and connect smoothly with the circumferential ends of the retaining rim portions 376.

Figure 43:
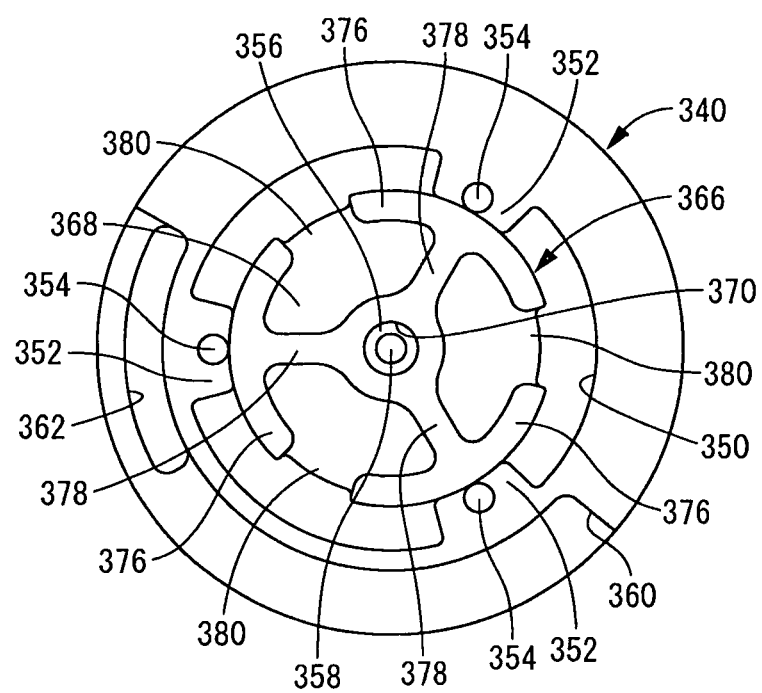
FIG. 43 is a top plane view of the moveable rubber film mounted on the lower partition member.

The moveable rubber film 366 of the above construction will be attached to the partition member 336. Specifically, as depicted in FIG. 43, the moveable rubber film 366 will be inserted into the housing recess 350 of the lower partition member 340 and juxtaposed onto the base wall of the housing recess 350, and the upper partition member 338 will then be juxtaposed from above so that the moveable rubber film 366 is accommodated positioned with respect to the housing space 364 that is defined between the upper and lower partition members 338, 340. The center support projection 356 which juts up from the diametric center portion of the housing recess 350 is then passed through the mounting hole 370 which has been formed in the diametric center section of the moveable rubber film 366, thus positioning the moveable rubber film 366 in the diametrical direction with respect to the partition member 336.

With the moveable rubber film 366 thusly installed in the housing recess 350, the locations at which the plurality of retaining rim portions 376 have been formed on the moveable rubber film 366 will be aligned in the circumferential direction with the outside peripheral grip projections 352 that jut out from the peripheral wall of the housing recess 350, and the outside faces of the retaining rim portions 376 will be disposed in pressure contact against the inside peripheral faces of the outside peripheral grip projections 352. The moveable rubber film 366 will thereby be positioned in the diametrical direction with the retaining rim portions 376 that have been formed at its outside peripheral edge gripped by the plurality of outside peripheral grip projections 352. In zones away from the sections where the outside peripheral grip projections 352 are formed, the housing recess 350 is larger in diameter than the moveable rubber film 366, and gaps are formed between the outside peripheral faces of the elastic valve portions 380 and the inside peripheral face of the housing recess 350.

The thickness of the moveable rubber film 366 in the sections where the retaining rim portions 376 are formed is greater than the depth dimension of the housing recess 350. The upper edge faces of the retaining rim portions 376 are positioned in contact against the upper wall face (top wall face) of the housing space 364, while their lower edge faces are positioned in contact against the lower wall face (base wall face) of the housing space 364, so that the retaining rim portions 376 are held clasped from either side in the axial direction by the upper and lower partition members 338, 340. The diametrical outside peripheral section of the moveable rubber film 366 is thereby supported in localized zones by the partition member 336, at the multiple locations on the circumference where the retaining rim portions 376 have been formed.

Further, in this embodiment, the sections of the moveable rubber film 366 in which the elastic retaining portion 374 and the retaining spoke portions 378 have been formed are approximately equal in thickness to the thickness of the sections where the retaining rim portions 376 are formed. The upper edge faces of the elastic retaining portion 374 and of the retaining spoke portions 378 will be positioned in contact against the upper wall face of the housing space 364, while their lower edge faces will be positioned in contact against the lower wall face of the housing space 364, so that the elastic retaining portion 374 and the retaining spoke portions 378 are held clasped from either side in the axial direction by the upper and lower partition members 338, 340. The moveable rubber film 366 will thereby be supported at its diametric center section by the partition member 336, and at its diametric medial section will be supported by the partition member 336 in localized zones at multiple locations on the circumference. However, the elastic retaining portion 374 and the retaining spoke portions 378 need not necessarily be held clasped between the upper and lower partition members 338, 340. Instead, prescribed gaps could be present between the upper edge faces of the elastic retaining portion 374 and of the retaining spoke portions 378, and the lower end face of the upper partition member 338.

In the above manner, the retaining rim portions 376 that were formed on the outside peripheral edge of the moveable rubber film 366 are held clasped in the axial direction (which is also the thickness direction of the moveable rubber film 366) by the upper and lower partition members 338, 340, while the outside peripheral grip projections 352 which have been formed on the lower partition member 340 are positioned in contact against the outside peripheral faces of the retaining rim portions 376 so that the retaining rim portions 376 are held positioned in the diametrical direction. The grip portions in this embodiment are defined in the outside peripheral section of the housing space 364 by sections of the upper partition member 338 that have been positioned in contact against the upper edge faces of the retaining rim portions 376, and by sections of the lower partition member 340 that have been positioned in contact against the lower edge faces and outside peripheral faces of the retaining rim portions 376.

Further, by arranging the moveable rubber film 366 in the housing space 364 with the moveable rubber film 366 juxtaposed in intimate contact against the base wall of the housing space 364 so as to cover the lower communication windows 363, the upper communication windows 349 will be positioned away from the moveable rubber film 366 and placed in the communicating state, while the lower communication windows 363 will be held in the state obstructed by the moveable rubber film 366. In this embodiment in particular, the elastic valve portions 380 of the moveable rubber film 366 will be positioned in the circumferential direction with respect to the plurality of lower communication windows 363 which have been formed in localized zones at several locations on the circumference, with the elastic valve portions 380 positioned to the outside peripheral side of the lower communication windows 363.

In this embodiment, due to the positioning action in the diametrical direction afforded by contact between the outside peripheral faces of the retaining rim portions 376 and the outside peripheral grip projections 352, and to the positioning action in the diametrical direction afforded by passing the center support projection 356 through the mounting hole 370 of the moveable rubber film 366, the moveable rubber film 366 will be positioned at a location at which the moveable rubber film 366 covers the lower communication windows 363. Also, by virtue of the retaining rim portions 376 of the moveable rubber film 366 being clasped between the upper and lower partition members 338, 340, the elasticity of the moveable rubber film 366 will be utilized to keep the moveable rubber film 366 in intimate contact against the openings of the lower communication windows 363. Further, in this embodiment, the annular contact projection 372 which has been integrally formed in the outside peripheral section of the moveable rubber film 366 will be positioned in pressure contact against the base wall of the housing recess 350 to the outside peripheral side from the lower communication windows 363 so that the lower communication windows 363 are advantageously placed in the obstructed state.

Furthermore, in this embodiment, the elastic valve portions 380 which have been formed circumferentially between adjacent retaining rim portions 376 in the circumferential direction of the moveable rubber film 366 are positioned in the circumferential direction with respect to the upper communication windows 349. The upper communication windows 349 open into the sections of the partition member 336 that cover the axial upper side of the elastic valve portions 380, and extend to the outside peripheral side beyond the elastic valve portions 380. The plurality of grip portions are formed circumferentially between adjacent upper communication windows 349 on the circumference.

The partition member 336 with the moveable rubber film 366 attached in the above manner will be positioned housed within the fluid chamber 334 as discussed above. Specifically, the partition member 336 will be inserted into the second mounting member 314 (to which the diaphragm 328 has not yet been attached) by inserting it from the opening on the side opposite the opening to which the main rubber elastic body 316 has been anchored (the opening on the lower side in FIG. 36). The diaphragm 328 will then be inserted into the second mounting member 314 from below the partition member 336. The second mounting member 314 will then be subjected to a diameter reduction process so that the partition member 336 and the diaphragm 328 are supported by the second mounting member 314.

With the partition member 336 thusly installed in the second mounting member 314, the outside peripheral face of the partition member 336 will be positioned in intimate contact against the second mounting member 314 via the intervening seal rubber layer 324, thus dividing the fluid chamber 334 into upper and lower parts to either side of the partition member 336. Specifically, to one side of the partition member 336 (the upper side in FIG. 36) there will be formed a pressure receiving chamber 382 whose wall is partly defined by the main rubber elastic body 316 and that gives rise to pressure fluctuations at times of input of vibration. Meanwhile, to the other side of the partition member 336 (the lower side in FIG. 36) there will be formed an equilibrium chamber 384 whose wall is partly defined by the diaphragm 328 and that is adapted to readily change in volume. A non-compressible fluid that has been sealed in the fluid chamber 334 fills the pressure receiving chamber 382 and the equilibrium chamber 384.

The opening at the outside peripheral of the circumferential groove that has been formed on the outside peripheral edge of the partition member 336 is blocked off by the second mounting member 314 via the intervening seal rubber layer 324, thereby forming a tunnel-like passage. One circumferential end of the tunnel-like passage communicates with the pressure receiving chamber 382 through a communication portion 344 formed at the outside peripheral edge of the upper partition member 338, while the other circumferential end of the tunnel-like passage communicates with the equilibrium chamber 384 through the lower communication hole 362 which has been formed at the outside peripheral edge of the lower partition member 340. Thus, at the outside peripheral edge of the partition member 336 there will be formed an orifice passage 390 that extends in a helical shape for a prescribed distance and that interconnects the pressure receiving chamber 382 and the equilibrium chamber 384.

In this embodiment, through appropriate setting of the passage length and passage cross sectional area of the orifice passage 390 with attention to the wall spring rigidity of the pressure receiving chamber 382, the passage will be tuned so as to exhibit vibration damping effect, based on flow action of the fluid, against vibration of about 10 Hz, corresponding to engine shake of an automobile.

Additionally, the housing space 364 communicates with the pressure receiving chamber 382 through the upper communication windows 349 which have been formed in the upper partition member 338, and communicates with the equilibrium chamber 384 through the lower communication windows 363 which have been formed in the lower partition member 340. Thus, pressure of the pressure receiving chamber 382, via the upper communication windows 349, will act on one face of the moveable rubber film 366 which has been arranged housed in the housing space 364, while pressure of the equilibrium chamber 384, via the lower communication windows 363, will act on the other face of the moveable rubber film 366. The moveable rubber film 366 will be juxtaposed and positioned in intimate contact from the pressure receiving chamber 382 side against the openings of the lower communication windows 363.

In the automotive engine mount 310 constructed as above, when low-frequency, large-amplitude vibration corresponding to engine shake or other vibration in the range that can be a problem during driving is input during driving, a relative pressure differential will arise between the pressure receiving chamber 382 and the equilibrium chamber 384. On the basis of this pressure differential, fluid flow will be produced through the orifice passage 390 between the pressure receiving chamber 382 and the equilibrium chamber 384. The desired vibration damping action (high damping action) will thereby be afforded on the basis of the flow action of the fluid induced to flow through the orifice passage 390, which has been tuned to low frequency.

At times of input of vibration in the low frequency range to which the orifice passage 390 has been tuned, the lower communication windows 363 will be kept obstructed by the moveable rubber film 366 so that the liquid pressure of the pressure receiving chamber 382 is prevented from escaping to the equilibrium chamber 384 through the upper and lower communication windows 349, 363 and the housing space 364. Thus, a sufficient level of fluid flow through the orifice passage 390 can be efficiently assured, and it will be possible to advantageously achieve vibration damping effect.

On the other hand, when the automobile is at a stop for example, if vibration in a medium- to high-frequency range corresponding to idling vibration is input to the engine mount 310, miniscule deformation of the rubber film portion 368 of the moveable rubber film 366 will take place based on the relative pressure differential arising between the pressure receiving chamber 382 and the equilibrium chamber 384. The desired vibration damping action (low dynamic spring action) will then be obtained based on the liquid pressure-absorbing action produced by the miniscule deformation of the rubber film portion 368. In this embodiment in particular, the aperture area and axial length of the upper communication windows 349 have been set appropriately so that the upper communication windows 349 will function as high frequency wave orifice passages that are tuned to medium- to high-frequency range corresponding to idling vibration.

When vibration in a medium- to high-frequency range, i.e. vibration of a higher frequency than the tuning frequency, is input, the orifice passage 390 will become substantially closed off through antiresonance-like action, thus preventing liquid pressure of the pressure receiving chamber 382 from escaping to the equilibrium chamber 384 through the orifice passage 390.

Thus, in the engine mount 310 constructed according to this embodiment, at times of input of low-frequency vibration, high damping effect will be obtained utilizing the flow action of fluid in the orifice passage 390, while at times of input of high-frequency vibration, liquid pressure-absorbing action will be obtained utilizing miniscule deformation of the moveable rubber film 366, thereby affording vibration damping effect over a wider frequency range.

Meanwhile, if a sudden impact load input is to the engine mount 310 such as may occur, for example, when the automobile drives over a bump, there may be an appreciable drop in pressure of the pressure receiving chamber 382. Accordingly, in this embodiment, during such an appreciable drop in pressure of the pressure receiving chamber 382, the pressure fluctuation will cause the elastic valve portions 380 of the moveable rubber film 366 to be suctioned towards the pressure receiving chamber 382 side and experience elastic deformation. Thus, gaps will form between the elastic valve portions 380 and the base wall of the housing space 364, whereupon the lower communication windows 363 will be placed in the communicating state through these gaps. The pressure receiving chamber 382 and the equilibrium chamber 384 will thus communicate with one another through the upper communication windows 349, the housing space 364, and the lower communication windows 363 so that the negative pressure in the pressure receiving chamber 382 is dispelled as rapidly as possible. From the above discussion it will be appreciated that in this embodiment, in the event of a marked drop in pressure of the pressure receiving chamber 382 a relief passage will be formed utilizing the upper and lower communication windows 349, 363 and the housing space 364. Moreover, in this embodiment, due to elastic deformation of the elastic valve portions 380, the cross sectional area of the gaps forming between the elastic valve portions 380 and the housing space 364 will be smaller than the area of the upper communication windows 349.

By providing such a relief passage for the purpose of preventing marked pressure drops in the pressure receiving chamber 382, it will be possible to prevent cavitation bubbles from forming due to negative pressure acting on the pressure receiving chamber 382, so that noise and vibration caused by cavitation bubbles can be reduced or avoided.

In particular, the elastic valve portions 380 allow deformation and displacement in the up and down direction; while the outside peripheral faces of the elastic valve portions 380 are positioned spaced apart diametrically inward from the peripheral wall face of the housing space 364. Thus, when acted upon by excessive negative pressure, the relief passage will consistently form through elastic deformation of the elastic valve portions 380, and the effect of dispelling negative pressure on the pressure receiving chamber 382 will be consistently produced.

In the engine mount 310 described here, retaining rim portions 376 are provided in the outside peripheral section of the moveable rubber film 366. The retaining rim portions 376 are supported by the partition member 336, with the retaining rim portions 376 clasped in the axial direction by the partition member 336 and with the outside peripheral faces of the retaining rim portions 376 positioned contacting the inside peripheral faces of the outside peripheral grip projections 352. Thus, if the pressure of the pressure receiving chamber 382 has dropped, since the moveable rubber film 366 is held constrained at the locations where the retaining rim portions 376 have been formed, the moveable rubber film 366 will be prevented from shifting out of position in the diametrical direction, as well as avoiding problems such as friction noise produced by sliding contact of the outside peripheral wall of the moveable rubber film 366 and the inside peripheral wall face of the housing space 364, or noise due to stick slip.

Furthermore, in this embodiment, the elastic retaining portion 374 and the retaining spoke portions 378 that jut upward to approximately the same height as the retaining rim portions 376 are integrally formed with the retaining rim portions 376. Thus, the elastic retaining portion 374 which has been formed in the diametric center section of the moveable rubber film 366, and the retaining spoke portions 378 which have been formed in the diametric medial section, will be held clasped by the partition member 336 together with the retaining rim portions 376 which have been formed at the outside peripheral edge, thus more effectively preventing the moveable rubber film 366 from shifting out of position etc. during input of large jarring load. In particular, as it will be possible to attain a sufficient level of retention force in the moveable rubber film 366 made of a rubber elastic body alone, the desired vibration damping performance and effect of preventing cavitation noise can be obtained despite the absence of anchored reinforcing members made of metal, hard synthetic resin, or the like.

In this embodiment, the upper communication windows 349 which constitute part of the relief passage extend to the outside peripheral side beyond the outside peripheral edge of the elastic valve portions 380 in the moveable rubber film 366. For this reason, it will be possible to prevent the upper communication windows 349 from becoming blocked by the elastic valve portions 380, even if the elastic valve portions 380 have experienced appreciable elastic deformation due to negative pressure acting on the pressure receiving chamber 382, and thus the effect of dispelling negative pressure will be consistently achieved.

Figure 44:
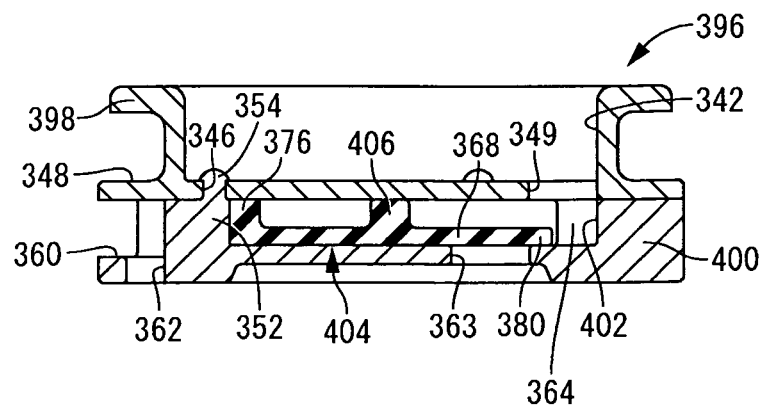
FIG. 44 is a partition member of an engine mount of construction according to a fourth embodiment of the invention, taken along line 44-44 of FIG. 45.
Figure 45:
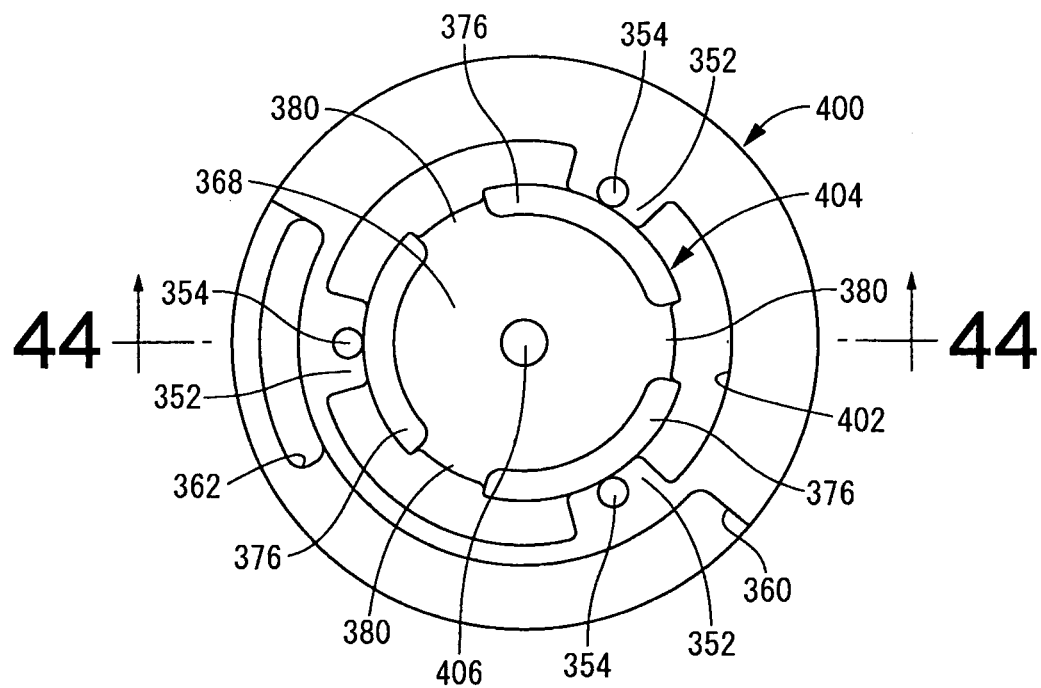
FIG. 45 is a top plane view of a moveable rubber film mounted a lower partition member of the partition member of FIG. 44.

Next, a partition member 396 adapted to be employed in an automotive engine mount is depicted in FIGS. 44 and 45 by way of a fourth embodiment of the fluid filled type vibration damping device according to the present invention. In this embodiment and in a fifth and a sixth embodiment to be described later, sections other than the partition member are substantially identical in construction to the engine mount 310 that was shown in the third embodiment, and as such will not be discussed in any detail. With respect to the partition member 396 as well, elements that are substantially identical to those shown in the preceding embodiment have been assigned like symbols in the drawings and will not be discussed in any detail.

Specifically, the partition member 396 depicted in FIG. 44 includes an upper partition member 398 and a lower partition member 400. While the upper partition member 398 has an overall structure pursuant to the upper partition member 338 in the preceding third embodiment, in the base wall of the center recess 342 the lock holes 346 have been formed at several locations in the outside peripheral section only. The lower partition member 400 has an overall structure pursuant to the lower partition member 340 in the preceding third embodiment, but with a circular housing recess 402 the opens upward formed in its diametric center section. Additionally, in the lower partition member 400, the diametric center section of the base wall of the housing recess 402 has been given a flat shape. In other words, the lower partition member 400 in this embodiment has a structure equivalent to eliminating the center support projection 356 in the lower partition member 340 that was shown in the third embodiment.

A moveable rubber film 404 provided as the obstructing rubber elastic plate has been arranged housed in the housing space 364 that has been formed utilizing the housing recess 402 between the upper partition member 398 and the lower partition member 400. This moveable rubber film 404 includes a rubber film portion 368 of thin, generally circular disk shape. An elastic retaining portion 406 provided as a center retaining portion of small-diameter, generally round post shape that is integrally formed in the diametric center section of the rubber film portion 368; and retaining rim portions 376 that are integrally formed at the outside peripheral edge of the rubber film portion 368.

As depicted in FIG. 45, the moveable rubber film 404 is housed in the housing recess 402 of the lower partition member 400. As in the preceding third embodiment, the outside peripheral faces of retaining rim portions 376 that have been formed on the moveable rubber film 404 will be positioned in contact against the inside peripheral faces of outside peripheral grip projections 352 that have been formed in the inside peripheral wall of the housing recess 402, thus positioning the moveable rubber film 404 in the diametrical direction within the housing recess 402, as well as preventing the film from becoming dislodged from the housing recess 402 by virtue of the frictional force of contact, etc.

With the moveable rubber film 404 inserted into the housing recess 402, the upper partition member 398 will be juxtaposed against the lower partition member 400 from the upper side in the axial direction, and the moveable rubber film 404 will be positioned housed within the housing space 364 of the partition member 396. In this embodiment, as in the third embodiment described previously, with the moveable rubber film 404 installed in the housing space 364 the elastic retaining portion 406 and the retaining rim portions 376 of the moveable rubber film 404 will be clasped between the upper and lower partition members 398, 400 and compressed in the axial direction. The moveable rubber film 404 will be thereby elastically supported at its center section and outside peripheral section by the partition member 396, and the grip portions in this embodiment will be defined utilizing the outside peripheral section of the moveable rubber film 404. Additionally, with the moveable rubber film 404 installed in the housing space 364, the lower communication windows 363 that have been formed in the lower partition member 400 will be covered and blocked by the moveable rubber film 404. In this embodiment as in the third embodiment described previously, the upper communication windows 349 will be aligned in the circumferential direction with respect to elastic valve portions 380 that have been formed circumferential between the retaining rim portions 376, and will extend to the outside peripheral side beyond the elastic valve portions 380.

Like the partition member 396 in the third embodiment described previously, the partition member 396 provided with the moveable rubber film 404 of this design is arranged housed within the fluid chamber 334 and supported by the second mounting member 314, with a pressure receiving chamber 382 and an equilibrium chamber 384 being defined to either side of the partition member 396. Additionally, with the partition member 396 attached to the second mounting member 314, pressure of the pressure receiving chamber 382 will act on one face of the moveable rubber film 404 through the upper communication windows 349, while pressure of the equilibrium chamber 384 will act on the other face of the moveable rubber film 404 through the lower communication windows 363.

When the engine mount according to this embodiment incorporating the partition member 396 described above is installed in a vehicle, vibration damping effect will be produced on the basis of fluid flow through the orifice passage 390 in response to input of low-frequency vibration corresponding to engine shake. On the other hand, in response to input of medium- to high-frequency range corresponding to idling vibration, vibration damping effect will be produced on the basis of miniscule deformation of the moveable rubber film 404.

Moreover, in the present embodiment, the diametric medial section of the moveable rubber film 404 is constituted as a thin rubber film portion 368 that extends over a large area and lacks retaining spoke portions 378. Accordingly, liquid pressure-absorbing action will be effectively produced through miniscule deformation of the rubber film portion 368, so that the desired vibration damping effect can be advantageously achieved.

Additionally, in response to input of large jarring load to the engine mount, the elastic valve portions 380 which have been positioned circumferentially between the plurality of retaining rim portions 376 in the moveable rubber film 404 will experience appreciable elastic deformation, thus forming gaps between them and the base wall of the housing space 364. The pressure receiving chamber 382 and the equilibrium chamber 384 will thereby communicate with each other through these gaps to form the relief passage in the embodiment utilizing the upper and lower communication windows 349, 363 and the housing space 364. Then, due to the sealed fluid being induced to flow through this relief passage between the pressure receiving chamber 382 and the equilibrium chamber 384, the pressure of the pressure receiving chamber 382 can be prevented from dropping markedly due to input of the large load, and noise and vibration caused by cavitation can be effectively prevented.

In the engine mount constructed according to this embodiment, the moveable rubber film 404 is held positioned at the prescribed location inside the second mounting member 314 by the elastic retaining portion 406 that has been formed in the diametric center section of the moveable rubber film 404, and by the retaining rim portions 376 that have been formed at its outside peripheral edge. The moveable rubber film 404 can thus be prevented from shifting out of position in response to input of a large jarring load.

Furthermore, the outside peripheral face of the rubber film portion 368 is positioned spaced apart diametrically inward from the peripheral wall face of the housing space 364. Thus, noise due to friction between the rubber film portion 368 and the peripheral wall face of the housing space 364 can be prevented from occurring during elastic deformation of the rubber film portion 368 (elastic valve portions 380).

Figures 46, 47:
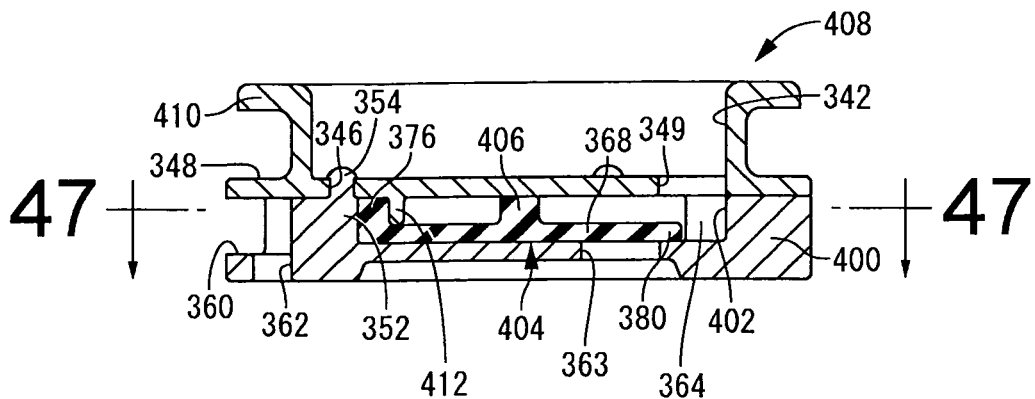
FIG. 46 is a partition member of an engine mount of construction according to a fifth embodiment of the invention, taken along line 46-46 of FIG. 47.
FIG. 47 is a cross sectional view taken along line 47-47 of FIG. 46.

Next, a partition member 408 adapted to be employed in an automotive engine mount is depicted in FIGS. 46 and 47 by way of the fifth embodiment of the fluid filled type vibration damping device according to the present invention. This partition member 408 includes an upper partition member 410 and a lower partition member 400.

The upper partition member 410 has a structure generally identical to that of the upper partition member 398 shown in the preceding fourth embodiment, and also has clasp projections 412 that project downward from the base wall of the center recess 342. The clasp projections 412 extend for prescribed length in the circumferential direction at several locations on the circumference, and are formed so as to project axially downward. In this embodiment, the projecting distal end portions of the clasp projections 412 extend in the circumferential direction with a substantially unchanging semi-circular cross section so as to avoid damaging the moveable rubber film 404 due to contact with the moveable rubber film 464, discussed later.

The upper partition member 410 then will be juxtaposed from above and attached to the lower partition member 400, in which the moveable rubber film 404 has been fitted into the housing recess 402. As depicted in FIG. 46, at this point the clasp projections 412 will slip in to the inside peripheral side of the retaining rim portions 376 of the moveable rubber film 404 so as to be positioned in contact against the rubber film portion 368 at several locations on its circumference. As depicted in FIG. 47, the clasp projections 412 are positioned in the circumferential direction with respect of the outside peripheral grip projections 352 of the lower partition member 400, and the diametric medial section of the retaining rim portions 376 of the moveable rubber film 404 are gripped clasped diametrically between the outside peripheral grip projections 352 and the clasp projections 412.

The engine mount provided with the partition member 408 constructed in accordance with this embodiment effectively affords vibration damping effect and cavitation noise-reducing effect comparable to those of the engine mounts shown in the previous third and fourth embodiments.

Like the engine mounts shown in the previous third and fourth embodiments, in the engine mount according to this embodiment, the diametric center section and the outside peripheral edge of the moveable rubber film 404 are clasped at multiple locations between the upper and lower partition members 410, 400 in the axial direction, and the retaining rim portions 376 are gripped by the outside peripheral grip projections 352, thus preventing the moveable rubber film 404 from shifting out of it attached position, as well as preventing noise due to stick slip, during input of a large load.

In the engine mount according to this embodiment, the plurality of clasp projections 412 are integrally formed on the upper partition member 410. The outside peripheral section of the moveable rubber film 404 in localized zones thereof is held clasped between these clasp projections 412 and the base wall of the housing space 364. Thus, in the event that the moveable rubber film 404 is exposed to high pressure due to input of a large jarring load, the moveable rubber film 404 can be effectively prevented from shifting out of position, and stable vibration damping performance can be achieved.

Figure 48:
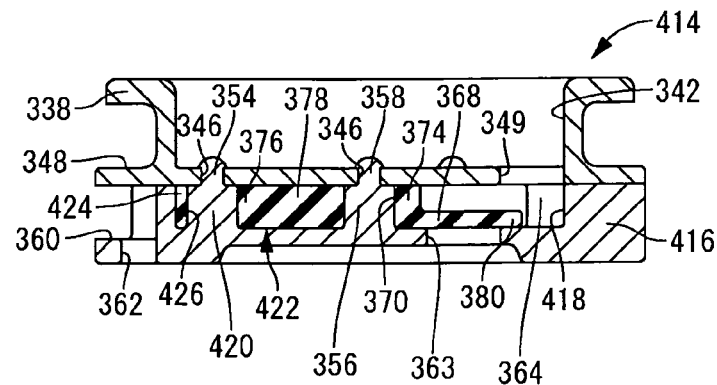
FIG. 48 is a partition member of an engine mount of construction according to a sixth embodiment of the invention, taken along line 48-48 of FIG. 49.
Figure 49:
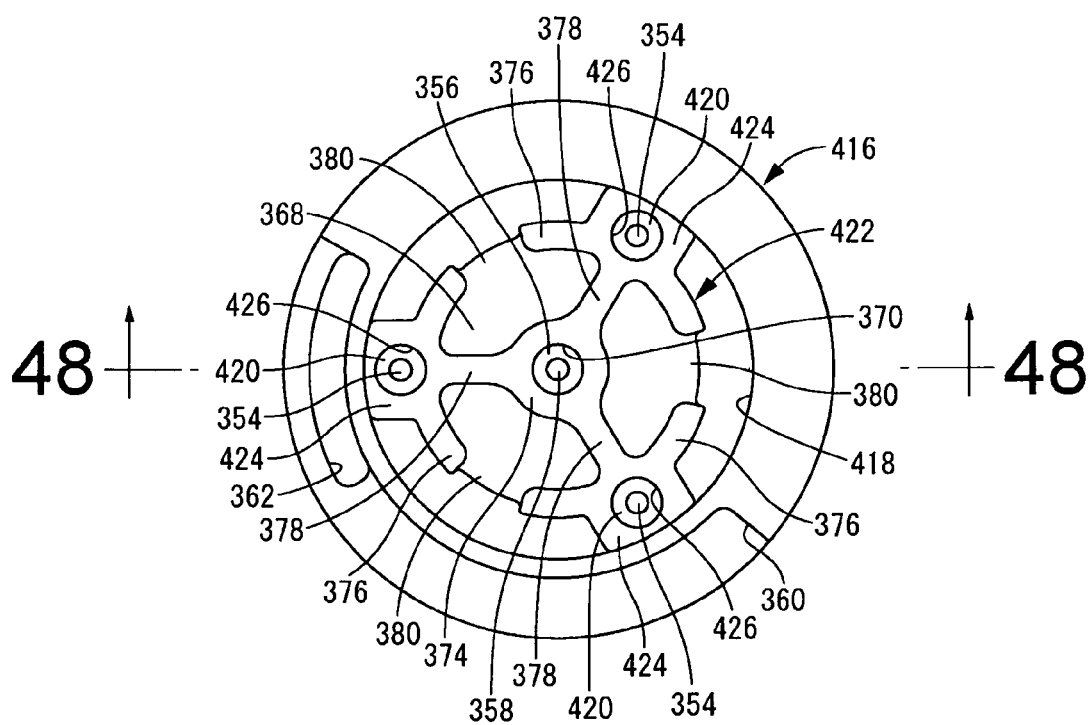
FIG. 49 is a top plane view of a moveable rubber film mounted a lower partition member of the partition member of FIG. 48.

Next, a partition member 414 adapted to be employed in an automotive engine mount is depicted in FIGS. 48 and 49 by way of the sixth embodiment of the fluid filled type vibration damping device according to the present invention. This partition member 414 includes an upper partition member 338 and a lower partition member 416.

The lower partition member 416 is provided with a housing recess 418. The housing recess 418 is a generally circular recess which opens upward in the diametric center section of the lower partition member 416. The housing recess 418 is formed with generally unchanging diameter around the entire circumference, and lacks the outside peripheral grip projections 352 formed on the peripheral wall of the housing recesses shown in the third to fourth embodiments.

In the diametric medial section of the housing recess 418 there are formed a plurality of outside peripheral support projections 420 that project upward from its base wall. The outside peripheral support projections 420 are integrally formed with the base wall of the housing recess 418 and project upward in the axial direction, and have overall construction substantially identical to the center support projection 356. Also, like the center support projection 356, outside peripheral locking projections 354 are integrally formed at the projecting distal ends of the outside peripheral support projections 420. In this embodiment, three outside peripheral support projections 420 have been formed prescribed distances apart on the circumference, with the outside peripheral locking projections 354 being respectively formed on the outside peripheral support projections 420.

A moveable rubber film 422 provided as the obstructing rubber elastic plate is fitted into the housing recess 418. Like the moveable rubber film 366 shown in the previous third embodiment, the moveable rubber film 422 is provided with a rubber film portion 368, an elastic retaining portion 374, and retaining spoke portions 378. Furthermore, contact retaining portions 424 are integrally formed on the retaining rim portions 376. As depicted in FIG. 48, the contact retaining portions 424 are formed so as to jut to the outside peripheral side from the circumferential center section of the retaining rim portions 376. Additionally, circular mounting holes 426 are formed in the center sections of the unified retaining rim portions 376 and contact retaining portions 424, so as to pass through them in the axial direction.

The moveable rubber film 422 is inserted into the housing recess 418. During insertion of the moveable rubber film 422 into the housing recess 418, a mounting hole 370 that is the center hole of the elastic retaining portion 374 will be slipped about the outside of the center support projection 356, while the circular mounting holes 426 will be slipped about the outside of the outside peripheral support projections 420. Furthermore, the outside peripheral faces of the contact retaining portions 424 of the moveable rubber film 422 will be disposed in contact against the inside peripheral face of the housing recess 418, with this contact being utilized to exert retention force on the moveable rubber film 422 in the diametrical direction and the axial direction. In this embodiment, by forming the contact retaining portions 424 at a number of localized areas on the circumference on the moveable rubber film 422 side so as to jut towards the outside peripheral side, the peripheral wall of the housing recess 418 can be utilized to constitute part of the grip portions for holding the moveable rubber film 422 in a state of contact with its outside peripheral face.

With the moveable rubber film 422 inserted into the housing recess 418, a plurality of elastic valve portions 380 formed circumferentially between the retaining rim portions 376 will each be positioned with their outside peripheral face positioned spaced apart to the inside peripheral side from the peripheral wall face of the housing recess 418.

The upper partition member 338 will then be attached juxtaposed against the lower partition member 416 in which the moveable rubber film 422 has been inserted into the housing recess 418 in this way. Specifically, locking projections 354, 358 that have been formed at the projecting distal end of the center support projection 356 and of the outside peripheral support projections 420 will be passed through and locked into a plurality of plurality of lock holes 346 that have been formed in the upper partition member 338, thereby fastening together the upper partition member 338 and the lower partition member 416.

With the upper and lower partition members 338, 416 assembled in this way, the elastic retaining portion 374, the retaining rim portions 376, the contact retaining portions 424, and the retaining spoke portions 378 of the moveable rubber film 422 will each be held clasped between the upper and lower partition members 338, 416, and the moveable rubber film 422 will be elastically clasped by the upper and lower partition members 338, 416. The grip portions of this embodiment are constituted in part utilizing zones positioned with respect to the contact retaining portions 424 on the circumference at the outside peripheral section of the wall of the housing space 364.

In the engine mount according to this embodiment provided with such a partition member 414, as in the third to fifth embodiments described previously, it will be possible to effectively achieve vibration damping effect based on fluid flow action and on liquid pressure-absorbing action etc., as well as negative pressure reducing effect for limiting the occurrence of noise and vibration at times of input of a large load.

Additionally, because the elastic retaining portion 374, the retaining rim portions 376, the contact retaining portions 424, and the retaining spoke portions 378 have been clasped in the axial direction, and the contact retaining portions 424 have been gripped at their outside peripheral face through contact with the peripheral wall of the housing space 364, the moveable rubber film 422 can be effectively preventing from shifting out from its installed position at times of input of a large load. In this embodiment in particular, the contact retaining portions 424 of the moveable rubber film 422 are positioned in the diametrical direction by fitting externally about the respective outside peripheral support projections 420. Consequently, the moveable rubber film 422 can be prevented more effectively from shifting out of position in the diametrical direction.

While the present invention has been shown hereinabove in terms of certain preferred embodiments, these are merely illustrative and should in no way be construed as limiting the invention to the specific disclosure herein.

For example, whereas in the third to sixth embodiments, the partition member is composed of upper and lower partition members assembled together, the partition member could instead be composed of a single component. As a specific example, the partition member could have a structure pursuant to the lower partition member 340 but provided with a center locking portion of flange shape at the distal end section of the center support projection 356 so as to prevent the center section of the moveable rubber film 422 from becoming dislodged from the center support projection 356; while the peripheral wall of the housing recess 350 could be provided with an outside peripheral retaining portion that extends diametrically inward from its the upper edge. Thus, the retaining rim portions 376 of the moveable rubber film 366 are clasped in the axial direction between the outside peripheral retaining portion and the peripheral wall of the housing recess 350. Open windows need not be formed in several localized areas on the circumference like the upper communication windows 349 shown in the preceding embodiments; instead, the entire face of the obstructing rubber elastic plate on the pressure receiving chamber side could be open as described above.

No particular limitation is imposed as to the number, shape etc. of the thick retaining portions. As a specific example, two thick retaining portions could be formed on the circumference, or four or more thick retaining portions could be formed. Also, their cross sectional shape could vary while extending in the circumferential direction, e.g. their width in the diametrical direction could vary gradually in the circumferential direction.

Figure 50:
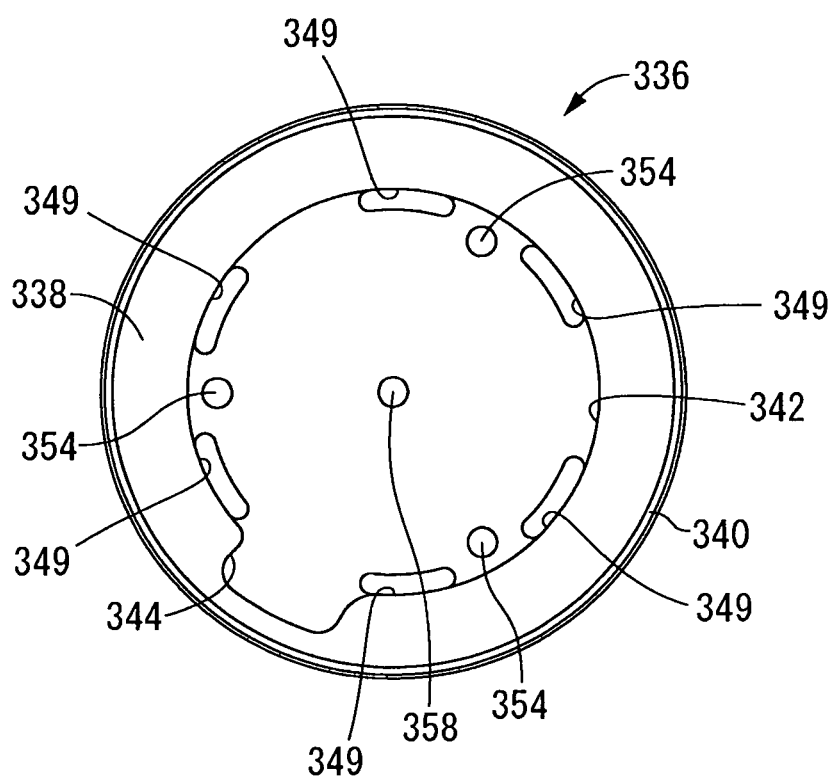
FIG. 50 is a top plane view of a partition member of another arrangement employed in the present invention.

Likewise, the number, shape etc. of the upper communication windows 349 that provide the open windows are not limited to the illustrated embodiment, but may otherwise be arranged. As a specific example, while three upper communication windows 349 are formed in the base wall of the center recess 342 of the upper partition member 338, in the illustrated embodiments, it is preferable to double the numbers of the upper communication windows 349 while reducing the size of each upper communication windows 349, as depicted in FIG. 50. According to this arrangement, the amount of fluid flowing through the upper communication windows 349 can effectively be dispersed into the total six smaller-sized upper communication windows 349, whereby generation of bubbles known as cavitation due to release and vaporization of dissolved gases from the sealed fluid may be effectively prevented or reduced.

Further, in the obstructing rubber elastic plates disclosed by way of example in the third to sixth embodiments above, the diametrical center section is clasped in the axial direction. However, it is sufficient for the obstructing rubber elastic plate to be supported with thick retaining portions clasped in the axial direction at the outside peripheral edge, and it is not always necessary for the diametric center section or diametric medial section to be clasped in the axial direction.

What is claimed is:

1. A fluid filled type vibration damping device comprising:
   a rubber elastic body elastically connecting a first mounting member and a second mounting member;
   a partition member supported on the second mounting member;
   a pressure receiving chamber whose wall is partly defined by the rubber elastic body;
   an equilibrium chamber whose wall is partly defined by a flexible film;
   the pressure receiving chamber and the equilibrium chamber being filled with a non-compressible fluid, and the pressure receiving chamber and the equilibrium chamber communicating with each other through an orifice passage,
   the partition member that partitions the pressure receiving chamber and the equilibrium chamber being provided with a communication passage that connects the pressure receiving chamber and the equilibrium chamber;
   an obstructing rubber elastic plate being juxtaposed against the communication passage from a pressure receiving chamber side, being adapted to obstruct the communication passage, and being arranged such that pressure of the pressure receiving chamber acts upon a first face of the obstructing rubber elastic plate while pressure of the equilibrium chamber acts on another face thereof; and
   a constraining member being provided for retaining an outer peripheral section of the obstructing rubber elastic plate in a state of localized contact against the partition member at multiple locations on a circumference, wherein
   the constraining member provides an opening/closing control member such that positive pressure of the pressure receiving chamber acting on the obstructing rubber elastic plate induces the obstructing rubber elastic plate to push against the partition member and close off the communication passage, whereas negative pressure of the pressure receiving chamber acting on the obstructing rubber elastic plate induces zones situated in an outer peripheral section of the obstructing rubber elastic plate but away from retained sections by the constraining member to undergo elastic deformation in a direction of separation from the partition member, and open up the communication passage, the constraining member is formed such that a plurality of thick retaining portions extending in a circumferential direction are formed at a plurality of locations on the outer peripheral section of the obstructing rubber elastic plate, and the obstructing rubber elastic plate is attached to the partition member with grip portions that are provided on the partition member and that sandwich the thick retaining portions from either side in a thickness direction and retain outside peripheral faces thereof in a state of contact,
   the opening/closing control member comprises elastic deformation zones adapted to undergo elastic deformation on a basis of pressure differential between the pressure receiving chamber and the equilibrium chamber to cause the communication passage to open up, and being defined circumferentially between the thick retaining portions that are adjacently situated in the circumferential direction, and
   open windows that extend further towards the outer peripheral section of the obstructing rubber elastic plate beyond outside peripheral edges of the elastic deformation zones are formed in the partition member in sections thereof that cover a pressure receiving chamber side of the elastic deformation zones.

2. The fluid filled type vibration damping device according to claim 1, wherein the obstructing rubber elastic plate is of circular planar shape.

3. The fluid filled type vibration damping device according to claim 1, wherein
   the orifice passage is formed so as to extend in the circumferential direction through an outside peripheral section of the partition member, while a housing space is formed in a center section of the partition member, with the obstructing rubber elastic plate being housed in the housing space;
   the grip portions for retaining the plurality of thick retaining portions of the obstructing rubber elastic plate are defined at a plurality of locations on a circumference of an outside peripheral section of the housing space; and
   the open windows are formed in a wall of a pressure receiving chamber side of the partition member at locations circumferentially between the grip portions while facing the elastic deformation zones of the obstructing rubber elastic plate.

4. The fluid filled type vibration damping device according to claim 1, wherein thick reinforcing ribs are integrally formed on the obstructing rubber elastic plate, so as to extend towards a center from the thick retaining portions.

5. The fluid filled type vibration damping device according to claim 1, wherein a thick center retaining portion is integrally formed in a center section of the obstructing rubber elastic plate, and the center retaining portion held compressed by the partition member in the thickness direction of the obstructing rubber elastic plate.

* * * * *